United States Patent [19]

Gunzberg et al.

[11] 4,408,291

[45] Oct. 4, 1983

[54] POINT-OF-MANUFACTURE DATA ACQUISITION SYSTEM

[75] Inventors: Guy W. Gunzberg, Buffalo; Lawrence G. Lippman, Clarence Center, both of N.Y.

[73] Assignee: M. Wile & Company, Inc., Buffalo, N.Y.

[21] Appl. No.: 270,003

[22] Filed: Jun. 3, 1981

Related U.S. Application Data

[63] Continuation of Ser. No. 48,704, Jun. 15, 1979, abandoned, which is a continuation-in-part of Ser. No. 947,720, Oct. 2, 1978, abandoned.

[51] Int. Cl.³ .......................... G06F 1/00; G06F 15/46
[52] U.S. Cl. ................................... 364/900; 364/470; 364/468; 340/310 R
[58] Field of Search ... 364/200 MS File, 900 MS File, 364/468, 469, 470; 235/458, 487; 340/151, 310 R, 870.01

[56] References Cited

U.S. PATENT DOCUMENTS

| | | | |
|---|---|---|---|
| 3,025,498 | 3/1962 | Blodgett | 340/147 P X |
| 3,132,329 | 5/1964 | Penter | 340/183 |
| 3,163,758 | 12/1964 | Treacy | 235/458 X |
| 3,621,265 | 11/1971 | Berler | 235/458 X |
| 3,678,512 | 7/1972 | Fergus | 340/151 X |
| 3,916,386 | 10/1975 | Teixeira et al. | 364/900 X |
| 3,938,106 | 2/1976 | Becker et al. | 364/900 |
| 3,949,196 | 4/1976 | Spalti et al. | 235/487 X |
| 3,983,364 | 9/1976 | Firehammer et al. | 235/440 X |
| 4,047,168 | 7/1977 | Fowler | 33/363 K X |
| 4,077,030 | 2/1978 | Helava | 340/183 |
| 4,079,239 | 3/1978 | Gottschalk et al. | 235/463 |
| 4,088,983 | 5/1978 | Crandall | 340/147 R |
| 4,095,739 | 6/1978 | Fox et al. | 235/382 |
| 4,097,924 | 6/1978 | Figini | 364/710 X |
| 4,108,368 | 8/1978 | Dobras | 235/463 |
| 4,139,737 | 2/1979 | Shimada et al. | 340/183 X |
| 4,146,782 | 3/1979 | Barnich | 235/472 X |
| 4,160,238 | 7/1979 | Weckenmann et al. | 340/147 R |

FOREIGN PATENT DOCUMENTS

| | | |
|---|---|---|
| 801647 | 9/1958 | United Kingdom . |
| 960391 | 6/1964 | United Kingdom . |
| 977301 | 12/1964 | United Kingdom . |
| 1051132 | 12/1966 | United Kingdom . |
| 1195459 | 6/1970 | United Kingdom . |
| 1374711 | 11/1974 | United Kingdom . |
| 1422138 | 1/1976 | United Kingdom . |
| 1466921 | 3/1977 | United Kingdom . |

OTHER PUBLICATIONS

Gellender, Learn Microprocessor Fundamentals, Microprocessor Basics, Part 20, Electronic Design 21, Oct. 11, 1977, pp. 74-79.

Primary Examiner—T. J. Sloyan
Attorney, Agent, or Firm—Kinzer, Plyer, Dorn & McEachran

[57] ABSTRACT

A point-of-manufacture data acquisition system for an industrial facility including a series of work stations through which workpiece units are transferred, comprising a multiplicity of workpiece unit identification members, which may be punched data cards, each bearing scannable workpiece unit identification data, a number of similar production operation identification members, and a plurality of similar operator identification members. There is a data terminal for each work station. Each data terminal includes a simple, manually-operated data scanner; for punched card identification members, the data scanner comprises one LED and one phototransistor. The data terminal also includes a data store, a data display, and a microprocessor which controls entry and retrieval of data in the store and processes that data; each data terminal further includes program means controlling the sequence and acceptability of all data. A central polling processor periodically interrogates all data terminals to collect and record data. Two transmission lines and a ground line connect the polling processor to the data terminals; the transmission lines transmit DC power in opposite polarities to all data terminals on a shared-time basis with digital data signals transmitted to and from the polling processor; the data signals on each line are of opposite polarity from the power.

44 Claims, 16 Drawing Figures fig. 4.

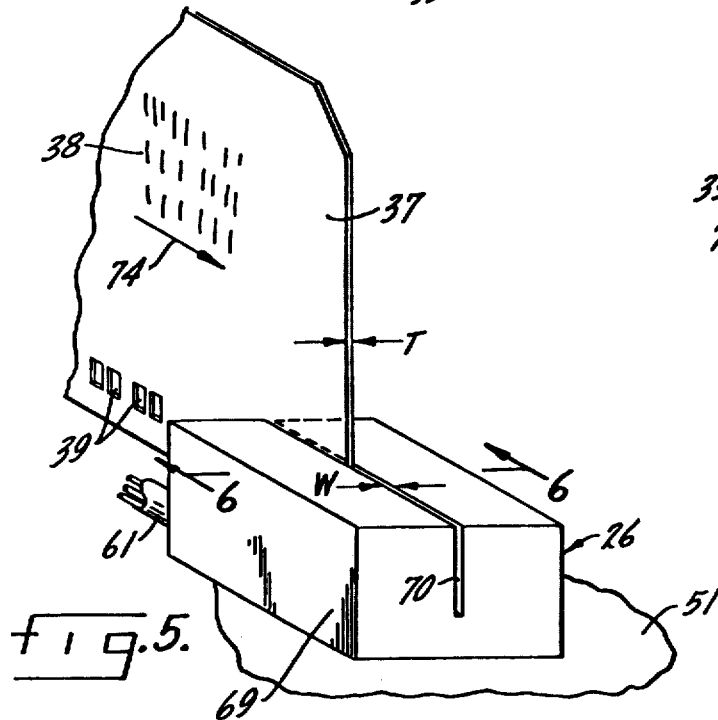

```
CUT#008712  19  45  1 TO 745  702  71102  CVP  R  O=206  B=54

THREAD-1722                          BUTTON HOLE - 1572
# SLEEVE BUTTONS- 3                  UNDERCOLLAR- 019
COLLAR DIE- RED/BLUE                 LAPEL DIE- RED/BLUE
HANGER BRAID- BLACK                  CUT 1 SIZE LARGER
BLACK-LIGHT STITCH MARKS             FUSE TOPCOLLAR
NO LAPEL STAY                        COLLAR FUSIBLE- GRAY
BUTTON- BLANCHE BROWN                FR BUTTON THREAD- 152 3
FLAP DIE- A                          SLV BUTTON THREAD- 306
FRONT DIE- BLACK/WHITE               POCKET- 1/4 TOP
EDGE SEAMS 1/16 SS                   PANT TRIM- IVORY
SEW FUSIBLE TAPE TO U.C.             PANT SCALE S
FUSE FACING                          VEST BUTTON THREAD- 306
```

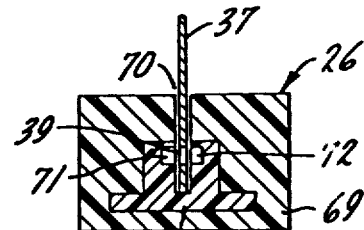

fig. 6.

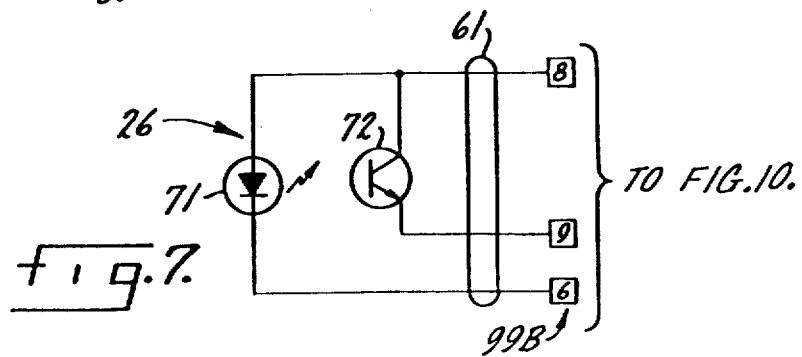

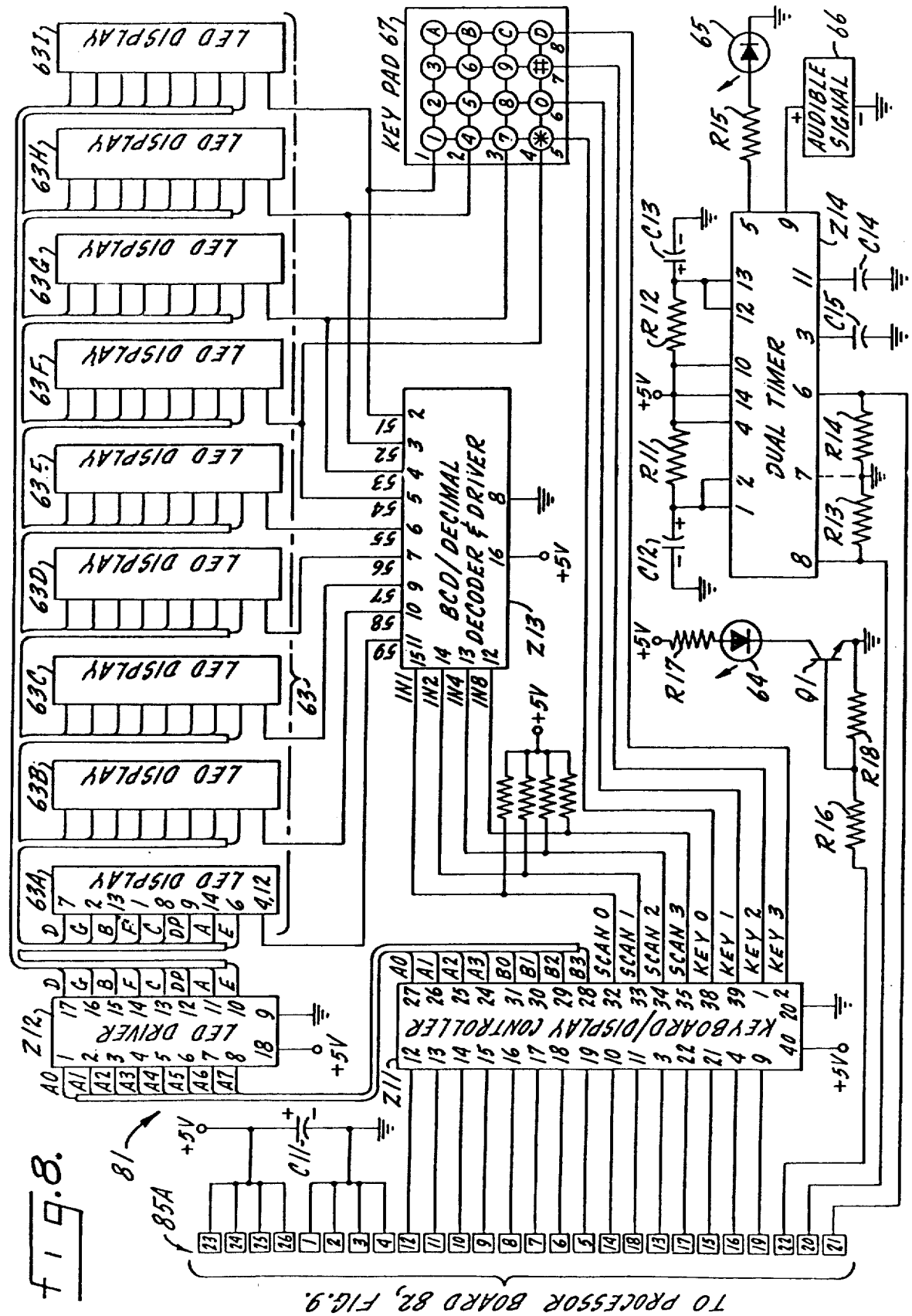

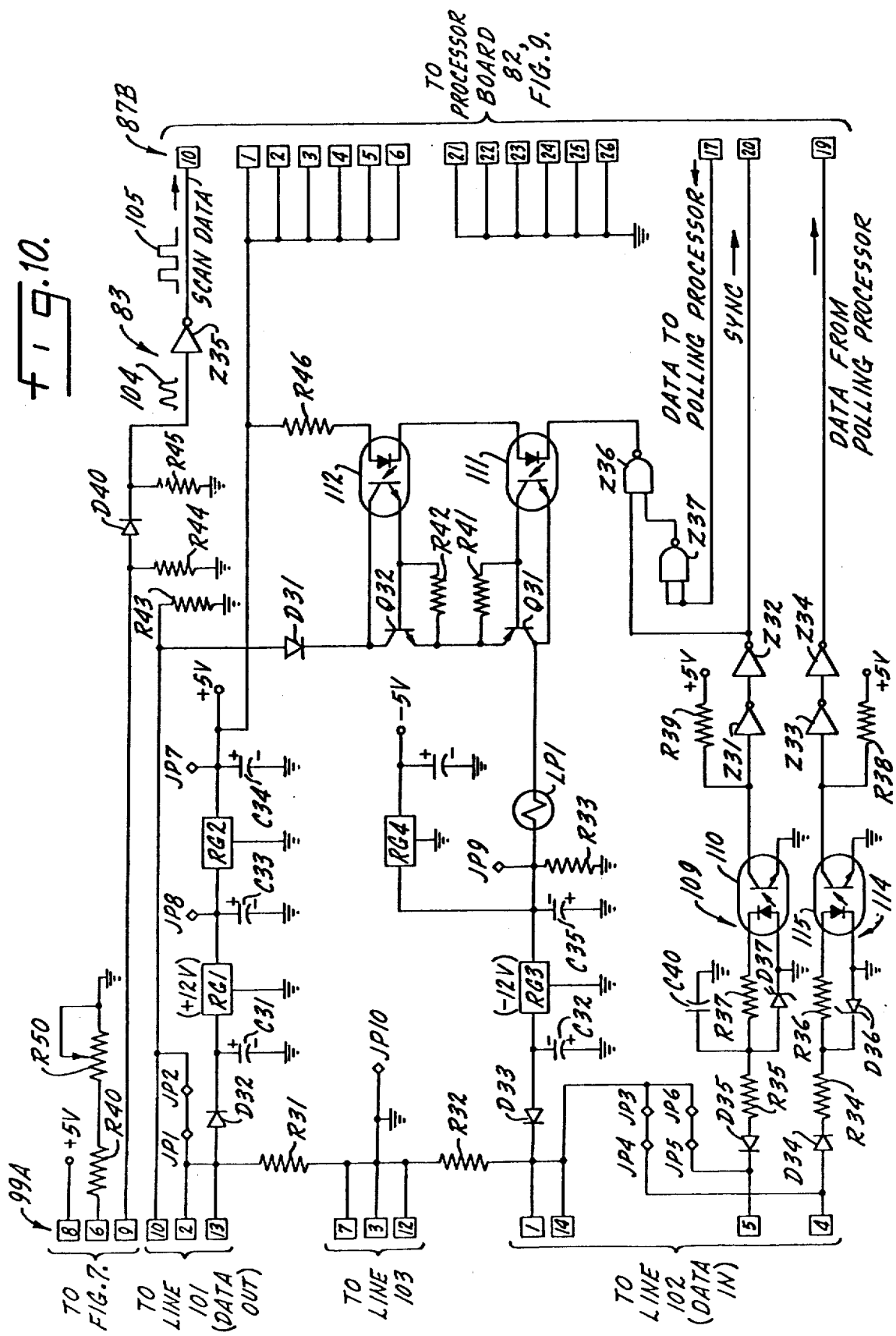

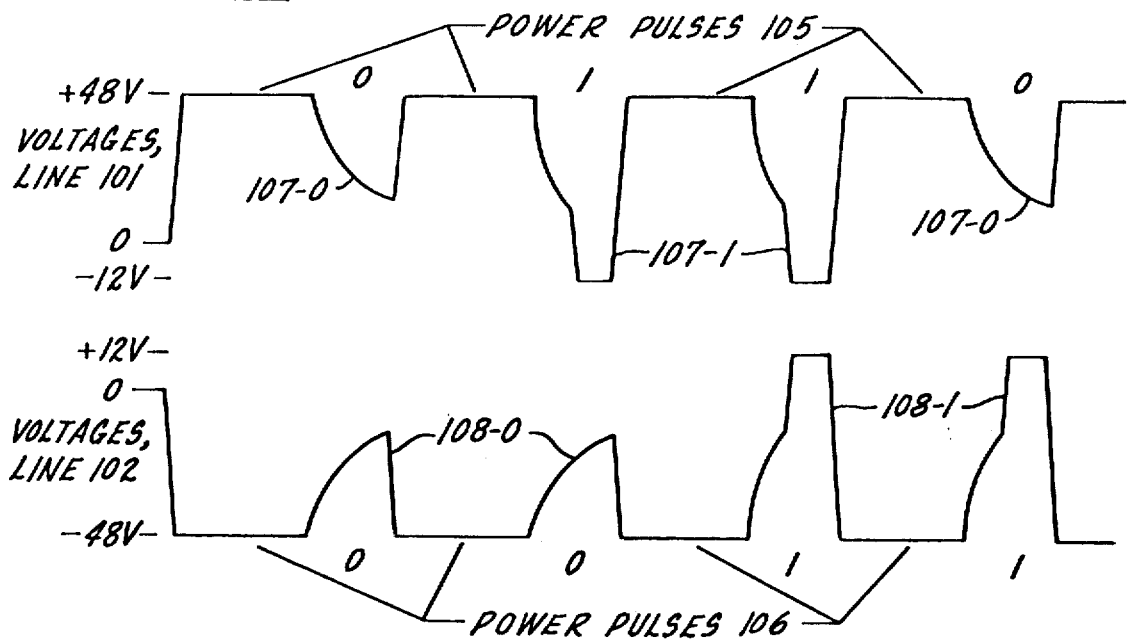
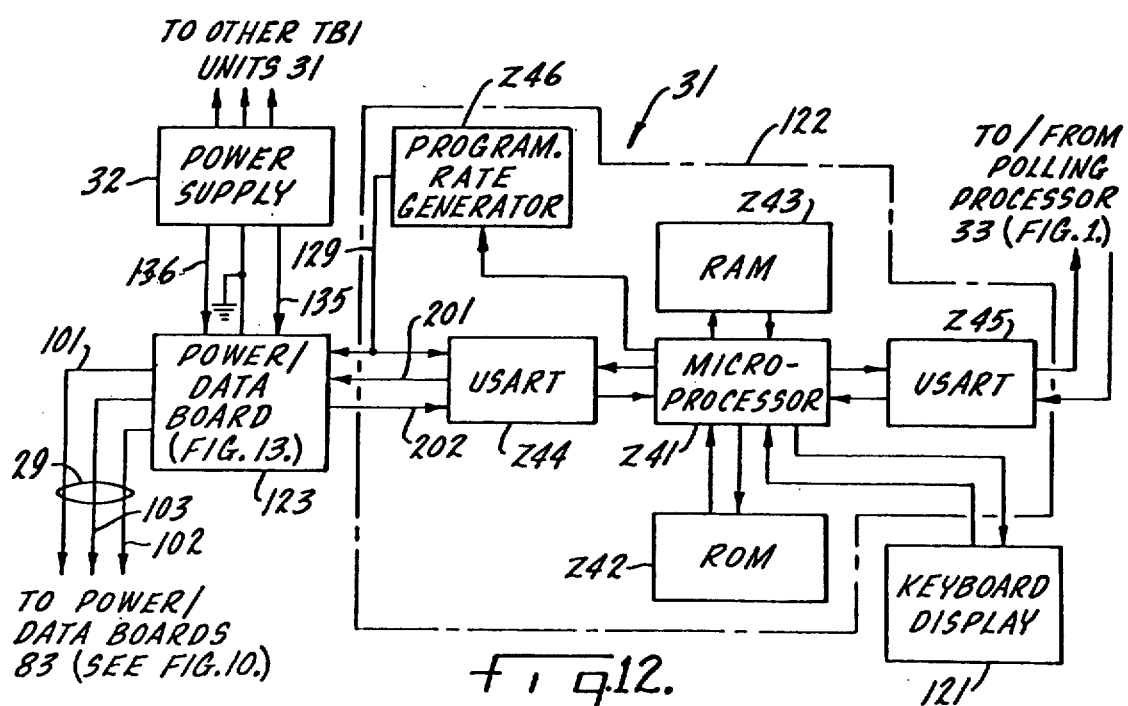

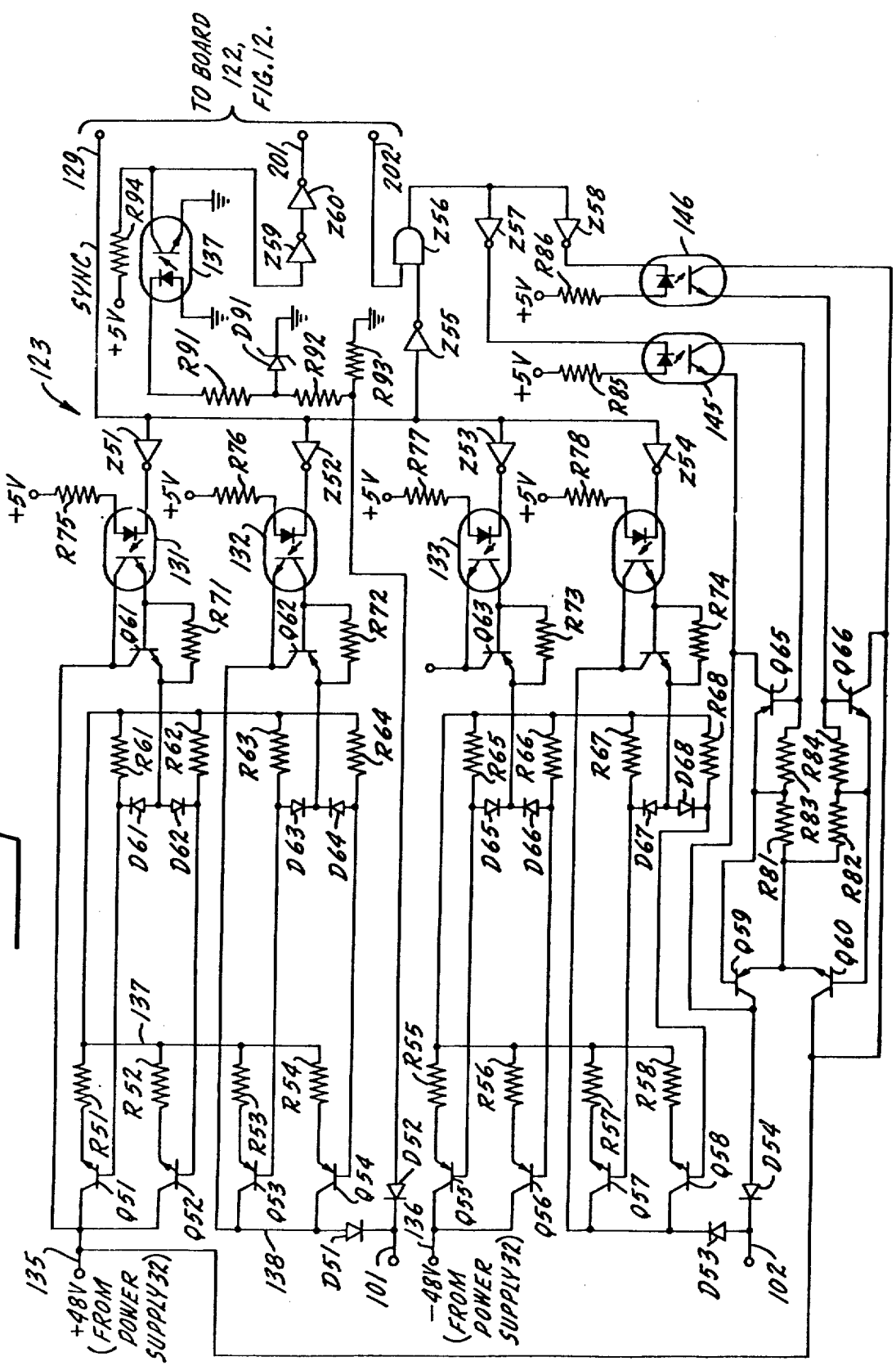

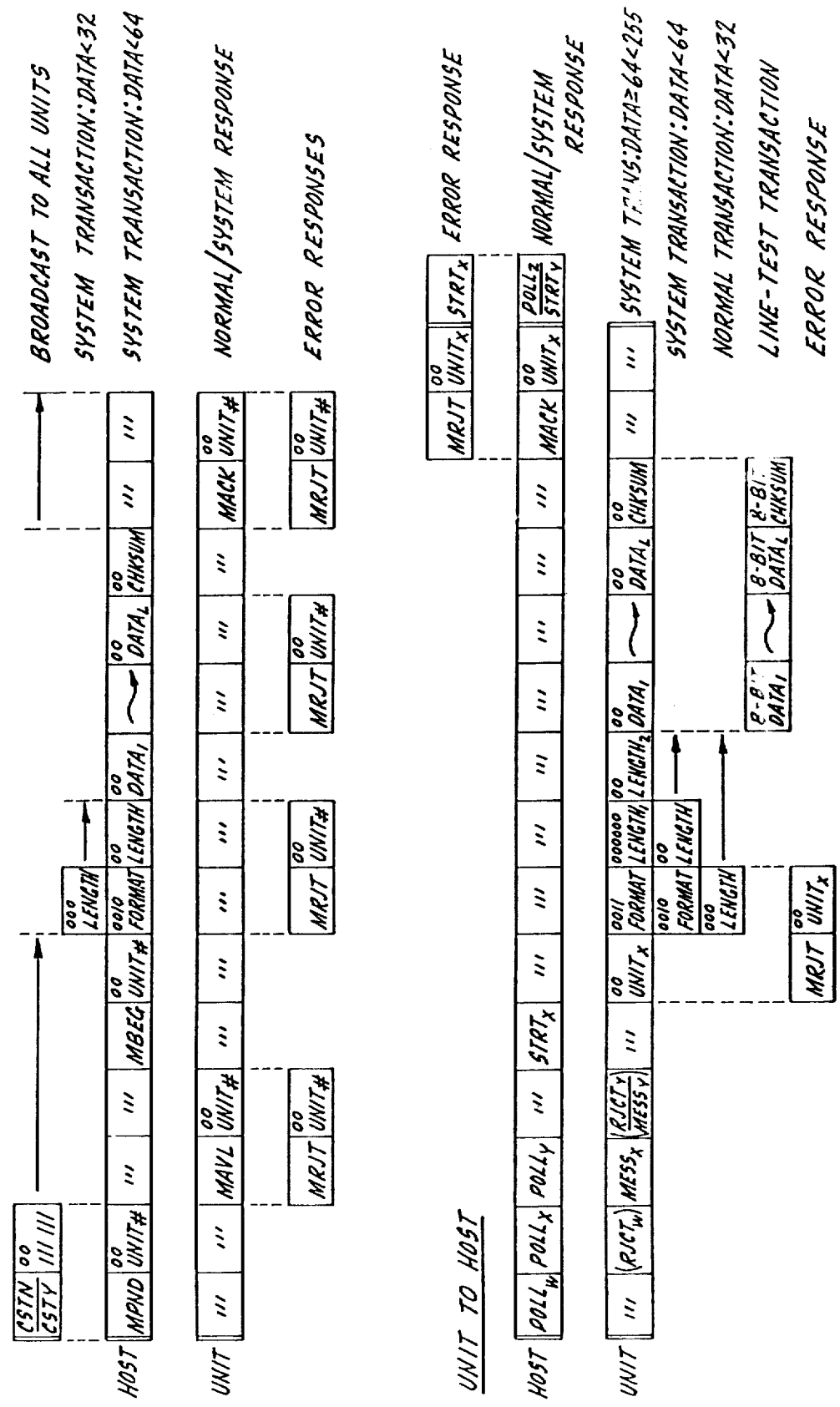

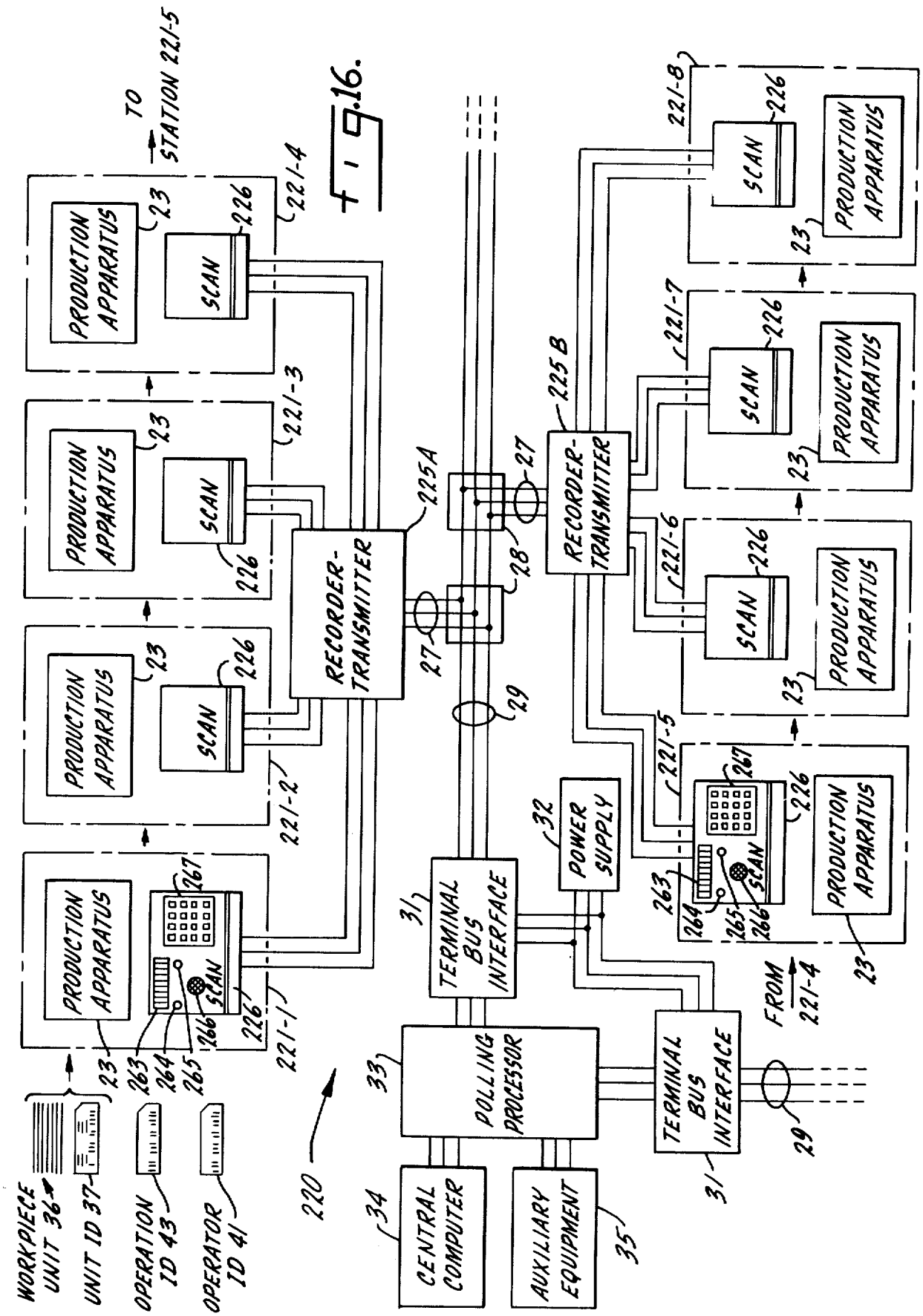

POINT-OF-MANUFACTURE DATA ACQUISITION SYSTEM

CROSS REFERENCE TO RELATED APPLICATIONS

This application is a continuation of application Ser. No. 48,704, filed June 15, 1979, which in turn was a continuation-in-part of application Ser. No. 947,720 filed Oct. 2, 1978; both of those applications have been abandoned.

BACKGROUND OF THE INVENTION

This invention relates to a data acquisition system suitable for a production facility of the kind including a large number of individual work stations through which a multiplicity of workpieces progress in the fabrication of a single article. The invention is described in the environment of a sewing plant for garment manufacture; however, the system is also applicable to other production facilities having similar general characteristics.

The manufacture of a garment usually entails many individual production operations, from cutting of the cloth to final pressing of the completed garment. For example, the manufacture of a suit jacket or sports jacket may require a total of one hundred twenty or more separate steps, including cutting, fusing, sewing, pressing, and other operations. For different styles, the number of operations may vary substantially. Thus, one jacket style may have patch pockets and another may use pocket flaps; one style can include three buttons on each sleeve, another may have two buttons per sleeve, and another may have none. There is, quite literally, no consistent, standardized set of operations. Nevertheless, a garment factory producing garments subject to style and fashion variations must provide for concurrent manufacture of a wide variety of styles, the work content of the shop shifting constantly on a day-to-day basis.

Intelligent scheduling of production in a garment sewing shop requires the compilation of a great deal of information. For effective and efficient production scheduling, management should know which operators are present and available, the skills of those operators, current production bottlenecks and the likelihood of impending bottlenecks. Of course, it is essential to know the production peculiarities of specific garment styles and the permissible trade-offs between alternative items. In some manner, data regarding all of these disparate factors should be collected and organized to allow for effective scheduling decisions, particularly in an era in which style and fashion concepts are subject to rapid and repeated change.

Traditional techniques for obtaining basic data regarding operators and their skills are essentially by-products of incentive payroll reporting schemes. For each garment, a document known as a bundle ticket is prepared; the bundle ticket identifies the cut, style, and component requirements of the garment. The bundle ticket includes a series of coupons, one for each individual operation to be performed in manufacture of the garment. There are also a series of additional similar bundle tickets for subassemblies incorporated in the complete garment. For example, for a jacket, in addition to the basic bundle ticket for the overall garment there may be separate tickets, with individual coupons, for the front, back, collar, sleeves, pocket flaps, pocket patches, yoke, and canvas portions of the garment. As each operation is performed, the related coupon for that operation is cut from the ticket and is used to record the work done and the operator identity for payroll purposes. Traditionally, the bundle tickets and coupons are the only records available to track the progress of the garment components through the shop.

A coupon-based system, in which the individual operators control the return flow of coupons, is inherently unreliable as a source of accurate production statistics. These and other known payroll reporting techniques fall far short of accurately reporting data adequate for determination of individual productivity by style, lost time, increasing or decreasing operator efficiency for new models, etc. Furthermore, the traditional recording techniques do not provide additional data essential to effective production scheduling, such as the operational status of the production equipment, the distribution of work-in-process inventory among the many operations in the plant, and the work requirements, by operation, of individual styles in process.

A production manager would be swamped in any attempt to contend manually with such an immense volume of specific detail. Some improvement is made possible by effective use of a computer in collating and summarizing the data available from a conventional coupon system or other similar systems. In general, however, the production manager of a garment sewing shop has little direct knowledge of the status of any group of garment components after it enters the shop and prior to the time the completed garments emerge. Production scheduling, therefore, is based in large part on intuition and experience.

An intelligent substitute for experience in a high-production variable-style garment shop would be a sophisticated mathematical model simulating the complete garment manufacturing process. Such a model can afford an effective guide to management in utilizing plant resources efficiently to smooth the flow of production and alleviate impending bottlenecks. Building a computer model of a style shop comprising scores of operations, hundreds of operators, and thousands of units in inventory, however, can be a truly awesome task. Only by capturing data as each operation occurs on each garment in the sewing shop can the computer model hope to achieve the precision required for effective analysis and reliable predictions.

In a sewing shop, manufacturing operations are typically of short duration and are performed by sedentary operators working on relatively low-cost equipment. Consequently, it is impractical and economically infeasible to monitor these activities with conventional data collection devices, which in many instances have a cost comparable to that of the manufacturing equipment at each work station. Thus, for an effective data acquisition system applicable to a garment sewing shop or similar production facility, low cost for each work station terminal is of critical importance. Furthermore, it is not desirable to have a single terminal serve multiple work stations because this requires the operators to leave their stations periodically to enter information in the multi-station terminal, creating unprofitable work flow interruptions and adding materially to operational costs. Thus, there is a basic need for a data acquisition terminal having a cost substantially lower than the cost of production equipment at each work station.

The requirements for source data collection in a sewing shop are quite stringent in other respects as well. To begin with, each operation should be logged as it occurs, avoiding the time delays introduced by operator reporting activities in coupon systems. A data acquisition system that signals both the start and the end of each production operation is also highly desirable, because it affords a readout of non-productive time between operations as well as productive work time.

Each production operation should also be identified completely according to style, workpieces being processed, the work performed, and operator identity. This level of detail is desirable not only as input to an effective computer model of the shop but also for subsequent production analyses. Moreover, events relating to the work status of an operator, customarily captured on time cards and work tickets, should be collected as they occur to account for the activities of each operator for payroll purposes. Finally, because sewing operators cannot be expected to possess high-level clerical skills, it is most desirable to eliminate any necessity for entry of data through the use of a keyboard or any like input device.

Another factor of substantial practical importance is adaptability to relocation. Shifting fashion trends frequently lead to work station realignments; the data acquisition system should provide for terminal relocation anyplace in the shop with minimum bother. A simple plug-it-in arrangement is most desirable.

A data acquisition system having the general characteristics noted above can provide other desirable attributes as well, particularly if each work station terminal includes a keyboard for entry of specialized information, normally not utilized for the basic data. Thus, machine breakdown and repair may be logged by supervisory personnel for use in scheduling maintenance, estimating costs of further mechanization, and tracking productivity of mechanics. Other specialized data may include authorization for an operator to work overtime or to leave the work station before the end of a shift, identification of work on a new style for which an operator is to be paid on an hourly basis rather than an incentive basis, and occurrence of an interruption in workflow to a station without fault of the operator requiring compensation on a time basis.

Thus, a data acquisition system to be used in production scheduling and general control of a garment sewing shop or like production facility should compile accurate real-time data relating to all of the disparate factors affecting production. This information should be captured at its sources, the individual work stations, through low cost equipment that is "intelligent" enough to compile all basic data through scanning of simple identification members so that no clerical skill or training is required of individual operators.

Previously proposed factory data collection systems have not met the criteria set forth above. Thus, such systems have usually employed keyboards, sometimes in combination with conventional punched card readers, bar code scanners, or like devices, for basic data entry. Previously known systems have cuustomarily used dedicated multi-pair wiring, telephone lines, or even coaxial cable for communication between data entry points and central data compilation facilities, making relocation of data entry terminals both difficult and expensive. The system terminals are generally too expensive to place at every work station. The results are not satisfactory in garment shops and other manufacturing facilities characterized by sedentary operators, low work place investment, short cycle times, and frequent physical layout revisions. Furthermore, previously known systems have not been readily adaptable to changes in data input devices and techniques (e.g. punched cards to bar code ID members) or to acquisition of disparate kinds of data (e.g. process parameters) conjointly with basic production data.

SUMMARY OF THE INVENTION

It is a primary object of the present invention, therefore, to provide a new and improved data acquisition system for a manufacturing facility comprising a series of work stations in which a multiplicity of workpiece units are processed in the course of manufacture; the system affords comprehensive data relating to manufacturing operations, the workpiece units on which those operations are performed, the identity of the work station operator, and, when desired, other factors, on a real-time basis, using low cost terminal equipment at each work station and requiring only the simplest of scanning operations by the station operator.

A particular object of the invention is to provide a new and improved data acquisition system for use in a multi-station production facility that provides for the compilation of comprehensive manufacturing data through simple scanning of inexpensive identification members, requiring no use of a keyboard or other application of clerical skills in normal operation of the system.

A specific object of the invention is to provide a new and improved scanner of simple and inexpensive construction for a production facility data acquisition system using encoded data cards as identification members.

Another object of the invention is to provide a compact, inexpensive, but highly "intelligent" data terminal for a production facility data acquisition system that can be relocated rapidly at virtually any position in a shop to accommodate reorganization, re-location, or addition of production facilities.

A further object of the invention is to provide a new and improved combined power and data transmission system for use in data acquisition in a multiple station production facility. A related object of the invention is to provide such a data transmission system that permits installation of additional data terminals at virtually any location in the plant, on a simple "plug-it-in" basis, with the terminals having the capability of monitoring different kinds of information at different locations.

Yet another object of the invention is to provide an "intelligent" data terminal for a production facility data acquisition system, which can input data from punched card, optical bar code, or magnetic bar code identification members with only minimal modification of the data terminal.

Accordingly, the invention relates to a point-of-manufacture data acquisition system for a production facility of the kind comprising a series of work stations through which a multiplicity of workpiece units are transferred for performance of a sequence of production operations, for collecting and recording data for each station, on a real-time basis, representative of operator identity and time present, and workpiece unit identity and time of processing. The system comprises a multiplicity of workpiece unit identification members, each bearing scannable data identifying an associated workpiece unit, and a plurality of operator identification members, each bearing scannable data identifying an operator. There is a series of data terminals, one for each work station, each including scanning means at the work station for scanning the data on the identification members, and recording/transmitting means comprising work station identification means and data storage means for storing the data from each identification member scan. Polling processor means are provided for repetitively polling the recording/transmitting means of all of the data terminals for data stored therein, including means for recording that data. Data transmission means, comprising only two transmission lines, connects the polling processor means to all of the data terminals. Terminal bus interface means connects the polling processor means and a central power supply to the transmission means to transmit power continuously from the central power supply to all of the data terminals on a synchronous time-share basis with the transmission of digital information signals from the data terminals to the polling processor and of digital interrogation and verification data signals from the polling processor to the data terminals. The system provides comlete compilation of the aforesaid data requirements in response to scanning of the identification members, with no additional inputs.

According to another feature of the invention, each data terminal comprises scanning means comprising a single sensor for scanning the identification data on an identification card and generating a sequence of raw data signals when the scanning means and the sensor are manually moved, one past the other, in predetermined alignment. Data storage means, connected to the photosensor, record the data signals; a microprocessor is connected to the data storage means. The data terminal further comprises program means, connected to the microprocessor, for programming the microprocessor to interpret the data signals from the photosensor over a substantial range of variations in the speed at which the card is moved through the scanning means.

According to yet another feature of the invention, a data acquisition system for a multi-station work facility comprises a series of data terminals, each data terminal comprising data input means and data storage means, and polling processor means for polling the data terminals for data stored therein. The system further comprises first and second transmission lines, each connected to all of the data terminals, the first transmission line transmitting digital interrogation data signals from the polling processor to the terminals and the second transmission line transmitting digital information data signals from the terminals to the polling processor. Terminal bus interface means are provided, connecting the polling processor to the transmission lines, including synchronizing means for continuously transmitting synchronizing signals of predetermined frequency to the data terminals on a shared-time basis with the data signals on one of the transmission lines.

In another aspect, the invention relates to a data terminal for a multi-station point-of-manufacture data acquisition system connected to a central data processor remote from the data terminals, the system being based upon a multiplicity of identification cards each bearing scannable identification data, the identification cards forming a plurality of groups with each group bearing scannable data different in significance from the other groups, complete data for normal operations being entered into the system through scanning of the cards. The data terminal comprises scanning means, comprising a single sensor, for scanning the identification data on a card and generating a sequence of raw data signals when the scanning means and the card are manually moved, one past the other, with the identification data on the card in predetermined alignment with the sensor. Data storage means, connected to the scanning means, records the data signals, the data storage means having a capacity sufficient for simultaneous storage of the data from at least two cards from different groups. There is a microprocessor, connected to the data storage means and to the scanning means, and program means, connected to the microprocessor, for programming the microprocessor, to:

a. interpret the data signals from the scanning means over a substantial range of variations in the speed at which the card traverses the scanning means, and
 b. verify validity and sequence of presentation of the scanned data and preclude continued storage of unverified data.

Signalling means are provided for signalling to a data terminal operator that effective recording of verified data from an identification card has been accomplished; and connecting circuit means are afforded for connecting the data terminal to a data transmission line for transmission of verified data in digital form from the storage means to a remote central processing location. The connecting circuit means comprises a power/data separation circuit having an input/output connection to link the terminal to a time share power and data transmission line, the power/data separation circuit interleaving the digital data transmissions with a series of constant frequency power pulses of given polarity on the line; the data transmissions are of opposite polarity from the power pulses so that data and power transmissions are separated on the basis of both polarity and timing, continuous power for operation of the data terminal being derived from the power pulses on the data transmission line.

BRIEF DESCRIPTION OF THE DRAWINGS

FIG. 4 illustrates a typical workpiece unit identification member used in the data terminal of FIGS. 2 and 3;

FIG. 5 is a perspective view of an identification member scanner incorporated in the terminal of FIG. 2;

FIG. 6 is a detail sectional view taken approximately along line 6—6 in FIG. 5;

FIG. 7 is a schematic circuit diagram for the scanner of FIGS. 5 and 6;

FIGS. 8, 9 and 10 are schematic diagrams of circuit boards incorporated in the data recording and transmission unit of FIGS. 2 and 3;

FIG. 11 shows typical waveforms for power and data transmission in the system;

FIG. 12 is a block diagram of a terminal bus interface unit used in the system;

FIG. 13 is a detailed schematic diagram of a power and data transmission circuit incorporated in the terminal bus interface unit of FIG. 11;

FIG. 14 is a chart of the data transmission protocol for the system of FIGS. 1–13;

FIG. 16 is a block diagram of a data acquisition system according to another embodiment of the invention.

DESCRIPTION OF THE PREFERRED EMBODIMENTS

Figure 1:
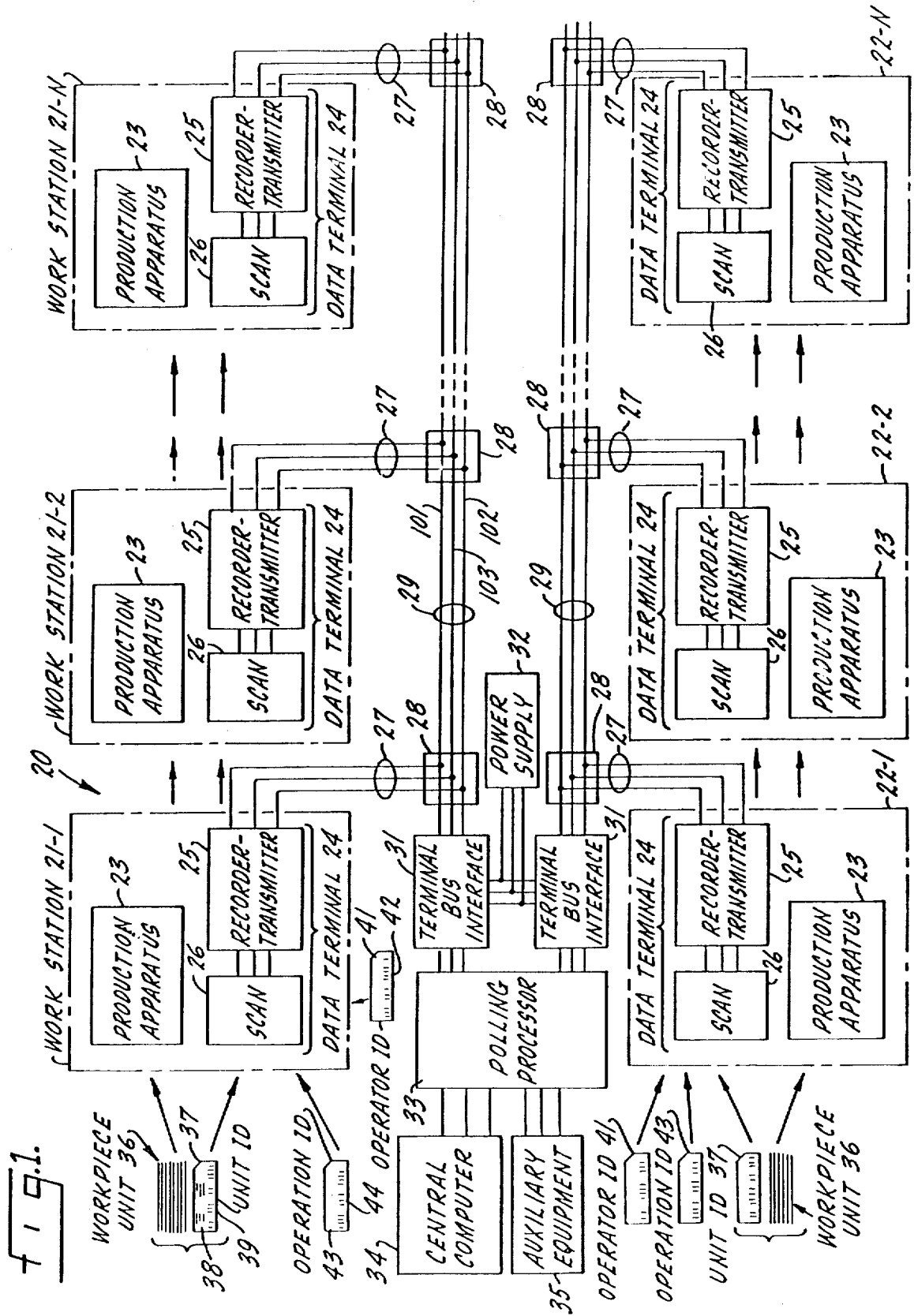
FIG. 1 is a block diagram of a multi-station factory data acquisition system constructed in accordance with one embodiment of the present invention.

FIG. 1 affords a simplified block diagram of a point-of-manufacture data acquisition system 20 constructed in accordance with the present invention. System 20 is utilized in a garment sewing shop or other production facility of the kind comprising a series of work stations through which a multiplicity of workpiece units, each including one or more individual workpieces, are transferred from station to station for performance of a sequence of manufacturing or other process operations. FIG. 1 shows two series of work stations 21-1, 21-2 . . . 21-N and 22-1, 22-2 . . . 22-N, each including a production apparatus 23. In a garment sewing shop, production apparatus 23 may be an ordinary sewing machine, a buttonhole cutting and sewing device, a specialized sewing apparatus, a press, or even a dry cleaning installation.

There is a data terminal 24 located at each work station. Each data terminal 24 includes a data recording and transmitting unit 25 electrically connected to a scanner unit 26. The recorder/transmitter units 25 for the work stations of series 21-1 through 21-N are each connected by a local three-wire power/data cable 27 and a connector plug 28 to a power/data transmission bus 29 including three conductors 101–103. Similarly, each of the recorder/transmitter units 25 for the work stations 22-1 through 22-N is connected by a local power/data cable 27 and a connector plug 28 to a second three-wire bus 29. Each of the two main buses 29 is connected to a separate terminal bus interface circuit 31, and the two interface circuits 31 are both connected to a common power supply 32. The two terminal bus interface circuits 31 are also both connected to a polling processor 33 that is in turn connected to a central or host computer 34. Auxiliary equipment 35, including a time-of-day signal source, one or more magnetic tape recorders, a keyboard, display instrumentation and the like, is also connected to processor 33. Alternatively, some of the auxiliary equipment may be connected to interface units 31.

The basic work input for the several work stations for the system illustrated in FIG. 1 includes a series of workpiece units 36. Each workpiece unit, in a garment sewing shop, constitutes a bundle of individual parts or subassemblies for garments being manufactured in the plant. As a specific example, one of the workpiece units 36 may include the facing elements for pocket flaps for a jacket, requiring finish sewing and attachment to lining and stiffener components. The nature of the workpiece units 36 depends upon the manufacturing operations conducted in the plant in which system 20 is installed.

Each workpiece unit 36 is accompanied by an identification member 37. The identification member 37 for each workpiece unit may carry printed data 38 identifying various requirements and accessories for the garments or other end products in which the workpieces are to be incorporated. For example, the printed data 38 may include identification of thread types, stitching styles, button arrangements, special display seams, trim, and the like; see FIG. 4.

For use in data acquisition system 20, each workpiece identification member 37 carries scannable workpiece unit identification data 39, data that identifies the specific workpiece unit 36. Thus, in a garment sewing shop the scannable data 39 includes identification of the basic cutting of the cloth for the garment, referred to as a cut number, and identification of a specific bundle from the cut if the cut is divided, as usual, into different bundles. The scannable data 39 also includes any additional information necessary for complete identification of workpiece unit 36; this additional data, for example, may identify workpiece unit 36 as constituting the main body of the jacket or the components for the sleeves or some other subassembly of the jacket. The prime requisite for scannable data 39 is that it affords effective identification for the associated workpiece unit 36.

The data acquisition system 20 utilizes two additional groups of identification members 41 and 43. Member 41 constitutes an individual ID card for a particular work station operator. It carries scannable data 42, which, at the minimum, constitutes an identification number individual to a specific operator. Member 43, on the other hand, carries scannable data 44 that identifies a particular shop operation. Thus, if the workpieces in unit 36 are the parts for a garment sleeve, the scannable data 44 on member 43 may refer to the sewing of one seam on a sleeve, a finishing operation on the end of a sleeve, or the like.

The scannable data 39, 42, 44 carried by the individual identification members employed in system 20 can take a variety of different forms. Thus, the scannable data may constitute an optical bar code, the data punchings in a punched tape, a magnetic bar code, specially configured characters for optical scanning, the punched holes in a conventional tabulating card, and a variety of other different forms. Perhaps the most important consideration, in selecting the form for the scannable data 39, 42, 44, is the cost of the scanner 26 that reads the data and the compatibility of the scannable data with the additional printed data on each identification member.

For system 20, the preferred identification members constitute ordinary tabulating cards and the scannable data is a single row of punched holes in each card. This has the advantage that a card of reasonable size, using only one row for scannable data, affords a substantial area for the presentation of human-readable information. In addition, the identification cards can be quickly and inexpensively prepared, in large quantities, using commercially available equipment that prints and punches the cards in a single operation. Furthermore, the punched card identification members can be scanned by a very inexpensive scanner 26, constituting an important feature of system 20 as described more fully in connection with FIGS. 4–7.

The basic operation of data acquisition system 20 can now be considered. At the beginning of a work shift, an operator arrives at work station 21-1 and starts the work day by scanning identification member 41, the personal ID card carried by the operator, in scanner 26. Scanner 26 senses the scannable data 42 on card 41 and supplies that data to recorder/transmitter unit 25 of data terminal 24 at work station 21-1, which interprets the scanned data and records the identity of the operator. At the time the operator's identification member 41 is scanned, data terminal 24 actuates a display and produces an audible signal to inform the operator that the requisite information has been recorded. The identification of the operator is maintained in storage in recorder/transmitter unit 25 throughout the subsequent work period.

The polling processor 33, through the connections provided by terminal bus interface circuits 31 and bus connections 27–29, regularly polls each of the recorder/transmitter units 25 to determine whether any data is in storage. During the next polling cycle following scanning of the operator's identification member 41 at work station 21-1, polling processor 33 determines that data is available from that terminal; it then retrieves and records the identification data for the operator together with the station identification for work station 21-1. Processor 33 also appends time-of-day information to indicate the time that the operator scanned the identification card. The programming of polling processor 33 determines that the received data from station 21-1 constitutes the identification of an operator and, since there has been no previous operator identification for that station, records the data as indicative of the beginning of a work period. The operator is not required to make any clerical entry with respect to starting time or identification of the work station or even that the action taking place is the beginning of a work shift. All of this information is derived by system 20 solely on the basis of scanning of the data 42 an operator identification card 41.

When polling processor 33 retrieved and recorded the operator identification data from terminal 24 in work station 21-1, system 20 signals to the operator that this has been accomplished. Subsequently, the data relating to the operator starting work at station 21-1 is transmitted from polling processor 33 to the central computer 34 for such subsequent data processing as may be desired for payroll and other functions.

Next, the operator beginning work at station 21-1 passes the shop operation identification member 43 through scanner 26. The shop identification members 43 for the various work stations are usually prepared by a foreman or by other supervisory personnel, and are distribution to the work stations before the shift begins. Alternatively, the operators may be required to pick up the operation identification members for their work stations at some central location as they report for work. In any event, regardless of the distribution arrangement used for the shop identification cards 43, the card for station 21-1 is scanned and the shop operation is recorded in the recorder/transmitter unit 25 of the data terminal 24 at that station. In the next succeeding poll taken by polling processor 33, this information is retrieved and recorded in the polling processor for subsequent transmission to the central computer 34. Again, the recorder/transmitter unit 25 informs the operator that the shop operation ID has been properly scanned and entered into system 20. This is important because system 20 is preferably programmed to require entry of both operator and shop identification operation data before work begins.

The operator at station 21-1 next scans the workpiece identification member 37 for the first workpiece unit 36 through scanner 26. In consequence, the identity of that particular workpiece unit is recorded in unit 25 of data terminal 24 at work station 21-1. A good scan is acknowledged to the operator by a display and an audible signal; an erroneous scan is rejected by the work station terminal. The data relating to the workpiece unit is retrieved and recorded, together with time-of-day information, in the next cycle of polling processor 33; ultimately, the data are passed on to computer 34 to identify and record the initiation of work on this particular workpiece unit. Identification of the workpiece unit 36 is also retained in storage in unit 25 of the data terminal 24 for work station 21-1.

From this point forward, the operator processes the workpieces of unit 36 in production apparatus 23 at work station 21-1 until all workpieces in the unit are processed. The operator then again passes the workpiece unit identification member 37 through scanner 26. The scanned data is recorded in unit 25 of data terminal 24 and is subsequently picked up by polling processor 33 in the form of a message indicating that work of this particular workpiece unit 36 has been completed at station 21-1. This could be accomplished by transmission of the complete data from the scan to the polling processor; in system 20, in the preferred construction described more fully hereinafter, only an abbreviated "work completed" message is actually transmitted. Abbreviation of the data transmission for completion of a workpiece unit at a given work station affords a material reduction in the total data transmission requirements, since most of the messages transmitted through system 20 constitute data identifying the beginning and end of work on individual workpiece units.

The operator then passes the completed workpiece unit 36 on to the next station 21-2 and starts work on another workpiece unit, scanning the identification card for the new workpiece unit as described above. The basic operational sequence is the same for the other work stations served by system 20.

When leaving station 21-1 for any extended period, as at the beginning of a lunch period, the operator again scans the personal identification card 41. The information from this scan is passed through the system to polling processor 33 and computer 34 as before. System 20 is programmed to recognize that this second scan of data identifying an individual operator signifies that the operator is leaving the work station. Of course, time-of-day information is again recorded to be available for payroll, productivity review, and other related purposes. When the operator returns to station 21-1, resumption of work is signalled to system 20 by again scanning the personal identification card 41. If there has been no change in the shop operation to be performed at this work station, there is no necessity for again scanning the shop operation card 43; the shop operation data is already recorded in the system. On the other hand, if a new operation is now scheduled for station 21-1, scanning of a shop operation card 43 identifying the new operation causes system 20 to supercede the previously recorded shop function data. At the end of the shift, the operator again scans the personal identification member 41 and the data from this scan is interpreted by system 20 and recorded as indicating that the operator has left the station. At the close of the shift, the data terminals 24 at all of the work stations in the system are reset for the next subsequent shift.

From the foregoing generalized operational description of system 20, it can be seen that all of the basic information relating to normal operations in the plant containing work stations 21-1 through 21-N and 22-1 through 22-N is entered into the system simply by scanning the identification members 37, 41 and 43, using the individual scanners 26 at each of the work stations. Work station operators are not required to exercise any substantial degree of clerical skill. Each operator must scan the personal and shop operation ID cards 41 and 43 before starting work. However, if this sequence requirement is not observed, system 20 alerts the operator to the necessity of completing the preliminary identification scans and rejects the out-of-sequence data.

For each workpiece unit 36, the operator is required only to scan the identification member 38 twice, once when works starts on that workpiece unit and again when work on the unit is completed. The time required for these two scanning operations is substantially less than the coupon clipping, ticket marking and coupon collecting operations associated with conventional piecework payroll systems, particularly when using the preferred identification members and scanning apparatus described in detail below. Nevertheless, despite the minimal nature of the requirements imposed on the work station operator, system 20 collects and transmits to central computer 34 complete data with respect to operator identity, operator arrival time, operator departure time, shop operations performed, workpiece unit density, time of start of workpiece processing, and time of completion of workpiece processing. This is accomplished for each work station throughout the shop. Moreover, all of this information is acquired and recorded continuously throughout each work shift on a real-time basis.

Figure 2:
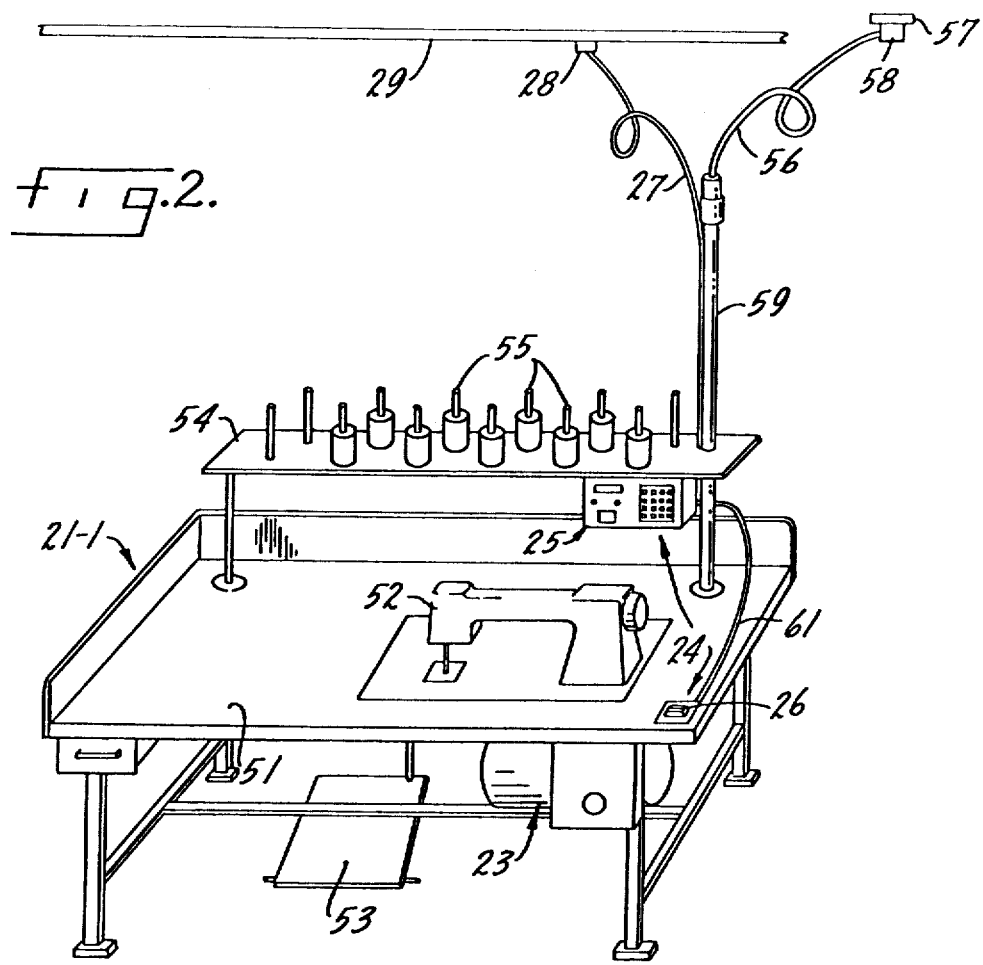
FIG. 2 is a perspective view of a work station in a garment sewing shop, equipped with a data terminal constructed in accordance with a preferred embodiment of the invention.

A specific embodiment of the data acquisition system 20 of FIG. 1 can now be considered, based upon the detailed information presented in FIGS. 2 through 14. FIG. 2 illustrates a typical work station 21-1 in a garment sewing shop. The work station consists of a work table 51 supporting the production apparatus 23, which in this instance constitutes a sewing machine 52 actuated by a treadle 53. A thread shelf 54 mounted at the rear of table 51 provides a plurality of spindles 55 for thread spools containing the various threads that may be used in different garments.

Electrical power for sewing machine 52 is provided through a power cable 56 connected to an overhead bus duct 57 by a suitable connector 58. The power cable 56 extends downwardly through a vertical conduit 59 to sewing machine 52.

In FIG. 2 the scanner 26 is located at the lower right front corner of table 51 and is connected by a three-wire cable 61 to the recorder/transmitter unit 25, which is suspended from shelf 54. The local power/data cable 27 extends from unit 25 upwardly along conduit unit 59; connector 28 is plugged into the main power/data bus 29 at an overhead location.

The main bus 29 for the data acquisition system may be a conventional bus duct, using the same components as the power duct 57. Preferably, however, duct 29 and connectors 28 are sufficiently different from duct 57 and connectors 58 so that local data acquisition system cables 27 cannot be plugged into the power duct 57 and vice versa. The principal requirements for duct 29 are that it afford three conductors, two power/data lines and one ground, preferably with a current capacity equal to or greater than No. 12 wire, with multiple receptacles along its length to afford convenient access at any location throughout the shop. Inexpensive pre-wired electrical feed rails of this general type may be used and are commercially available from a variety of suppliers.

Figure 3:
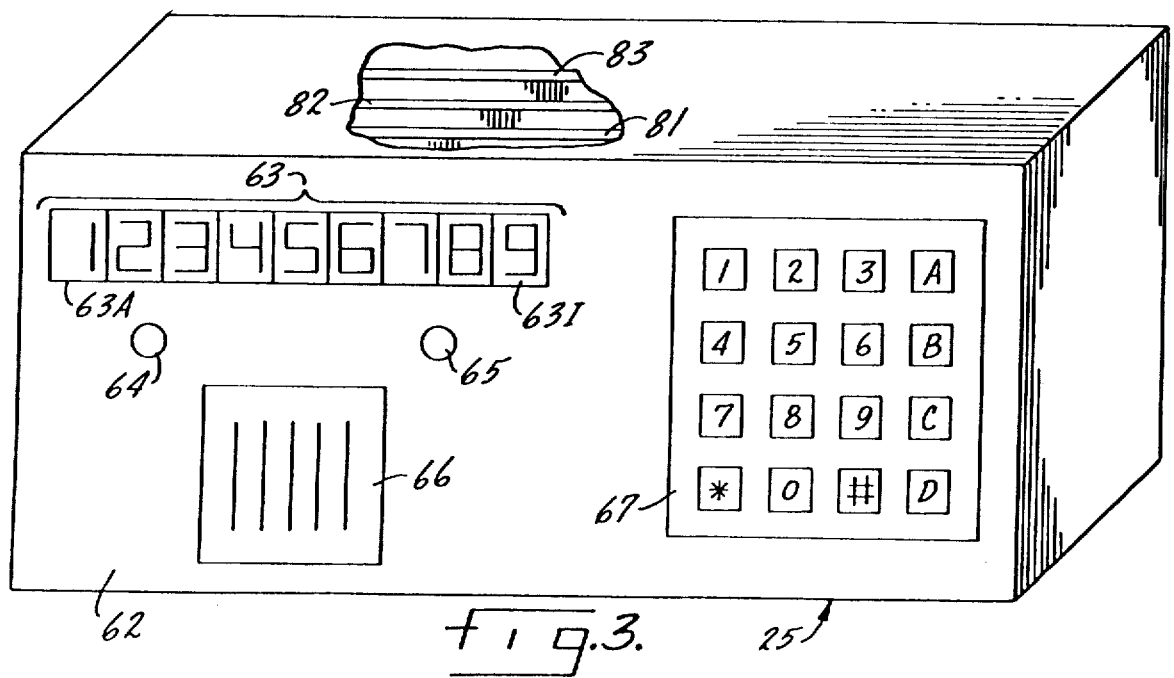
FIG. 3 is a front view of the data recording and transmitting unit for the data terminal of FIG. 2.

As shown in FIGS. 2 and 3, the front 62 of recorder/transmitter unit 25 includes character display 63, including nine individual display units 63A–63I, and two indicator lamps 64 and 65. The indicator lamps 64 and 65 are preferably of different colors; lamp 64 may be red and lamp 65 may be yellow. A small audible signalling device 66 and a keyboard 67 are also mounted on the front of the recorder/transmitter unit 25. Display 63 can present a variety of messages to the operator at work station 21-1. In particular, display 63 is utilized to signal effective data input to system 20 from a good scan of any of the identification cards 37, 41, or 43; the audible signalling device 66 is used as an aid to the same end. Lamp 64 affords an indication that data previously entered in unit 25 has been passed on to the polling processor 33 of the system 20, leaving unit 25 ready for entry of additional data. Lamp 65 responds to polling signals from processor 33 to afford an indication that unit 25 is properly connected in functional relationship to the polling processor 33 (FIG. 1). Keyboard 67 is employed only for entry of specialized data or to request information from the central facilities 33–35; it is not used in routine operation of unit 25.

FIG. 4 illustrates a preferred form for workpiece unit identification member 37, The printed information 38 on member 37, which constitutes an ordinary paper tabulating card, includes the cut number and bundle number for the workpiece; the same information is punched into the card as scannable data 39. In addition, the printed data 38 on card 37 includes much additional information useful to the work station operator, including thread designations, special stitching instructions, collar, pad and lapel instructions, and the like.

The scannable data 39 cut into card 37 is in conventional binary coded decimal notation, and includes special start and end symbols 67 and 68 as well as the coding for the cut number, bundle number, and check digit. The use of distinguishable start and end symbols effectively eliminates errors that might otherwise result if the operator scans data card 37 in the reverse direction. By using separate start and finish codes, the programming of unit 25 can be made to read the cut number and bundle number accurately regardless of the direction of the scan of data 39.

FIGS. 5–7 illustrate the preferred construction for scanner 26. The scanner comprises a molded resin block 69 (nylon is satisfactory) having a longitudinally extending slot 70, the width W of slot 70 being very slightly larger than the thickness T of the individual identification members such as the workpiece unit ID card 37. An infra-red emissive light emitting diode 71 is mounted centrally within block 69 at one side of slot 70, in opposed aligned relation to a phototransistor 72. LED 71 and phototransistor 72 may conveniently constitute a part of a small subassembly 73, commercially available from the General Electric Company as Type H 13B2. The circuit connections for LED 71 and phototransistor 72 are shown in FIG. 7.

The use of scanner 26 by a work station operator is extremely simple. An identification member, such as workpiece identification member 37, is inserted into slot 70 with the leading edge of the identification member located at one end of block 69. The operator then simply pulls the identification card through the scanning slot 70 as indicated by arrow 74 in FIG. 5. The scanning speed is not critical; substantial variation can be tolerated. LED 71 and phototransistor 72 are located, in relation to the bottom of slot 70, so that the data punch apertures 39 in card 37 are sensed in sequence as the identification card passes through the scanner; see FIG. 6. As will be apparent from FIG. 7, the data output from scanner 26 is taken from the emitter of phototransistor 72, the other lines in cable 61 constituting power connections for LED 71 and transistor 72.

The basic form for identification members 41 and 43 (FIG. 1) is the same as for the workpiece unit identification card 37 shown in FIG. 4, so that a more detailed illustration of the shop operation and operator identification members is unnecessary. Because identification members 41 and 43 are of more permanent nature than the workpiece identification member 37, it may be desirable to fabricate cards 41 and 43 from thin, tough plastic stock rather than from paper. In all other respects, however, all of the identification cards are essentially similar in construction.

Figure 9:
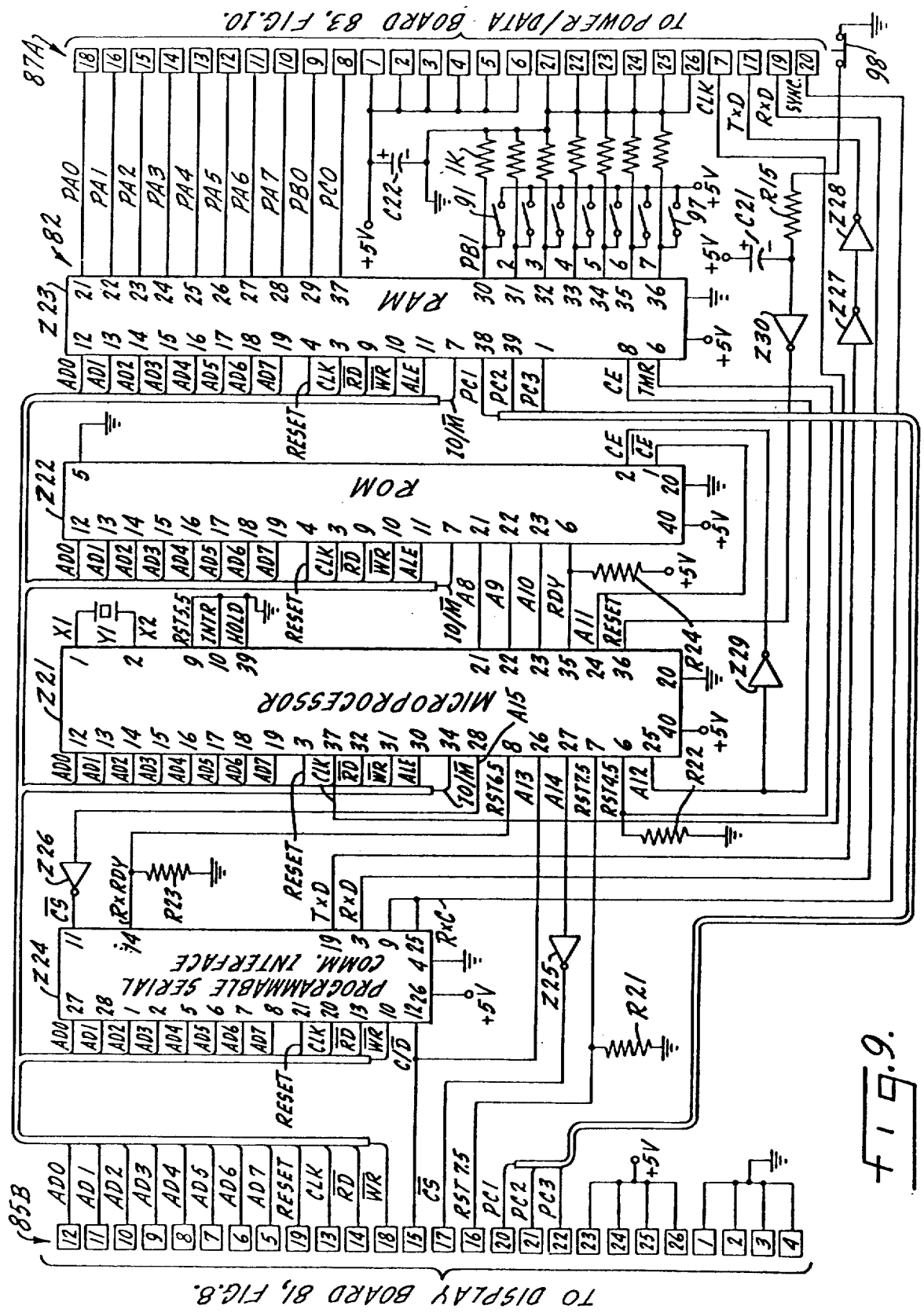

As shown in FIG. 3, the recorder/transmitter 25 that constitutes the main unit of each data terminal 24 includes just three circuit boards, a front board 81, a middle board 82, and a rear board 83; these three boards are shown in FIGS. 8, 9 and 10 respectively. The three circuit boards 81-83 include all of the operational components of unit 25.

The front board 81, FIG. 8, is essentially a display board controlling the character display 63, the indicator lamps 64 and 65, and the audible signal 66. It also affords the necessary electrical connections for the As shown in FIG. 8, display 63 consists of nine digital display elements 63A through 63I. Each of these display elements affords seven character segments plus a decimal point; they are of the LED type with a common cathode for all segments, the displays being configured for multiplex operation. Display elements 63A-63I are all connected to an LED driver unit Z12 that affords current amplification for the segments common to all nine display digits. Driver circuit Z12 is in turn connected to a keyboard/display controller circuit Z11 constituting an interface connecting display 63 and keypad 67 to a microprocessor mounted on the middle board 82 (FIG. 9). Controller Z11 is also connected to a decoder and driver circuit Z13 that decodes the BCD data from controller Z11 to the one-of-nine code used for scanning display 63 and for row scanning of keypad 67. The integrated circuits Z11, Z12 and Z13, keypad 67, and display 63 constitute a conventional data entry and display configuration; accordingly, no further detailed description of the interaction between the circuits is deemed necessary.

The left-hand side of board 81, FIG. 8, includes a twenty-six pin connector 85A employed to connect the circuits of front board 81 with those of middle board 82 (FIG. 9). Pins 1 through 4 afford a ground connection. Pins 23 through 26 afford a +5 volt power supply connection. A capacitor C11 provides for power storage and for filtering with respect to the +5 volt supply, which is used for all of the integrated circuits on the board. Pins 5 through 19 provide for interchange of data signals between the keyboard/display controller Z11 on board 81 and the circuits on board 82.

The front or display board 81 (FIG. 8) also includes an additional integrated circuit, a dual timer Z14. Timer Z14 is connected to the middle board 82 (FIG. 9) through two pins 20 and 21 of connector 85A. The dual timer Z14 is used to actuate indicator lamp 65, which is a light emitting diode, and the audible signal device 66, which constitutes a piezoelectric sound transducer. Thus, in response to an input signal on pin 20 of connector 85A, one-half of dual timer Z14 energizes audible signal device 66 for a predetermined time interval determined by a resistor R12 and a capacitor C13, preferably of the order of one second or less. The other half of time Z14, responding to an input signal from pin 21 of connector 85A, energizes indicator lamp 65 for a different predetermined interval, in this instance approximately ten seconds, determined by a resistor R11 and a capacitor C12. The signals that energize lamp 65 are generated in each polling cycle of the polling processor 33 (FIG. 1) and the timing is such that lamp 65 remains continuously energized so long as the work station terminal is effectively connected in operational relationship to the polling processor.

Indicator lamp 64, again a light emitting diode, is also mounted on front board 81. LED 64 is connected in series with a transistor Q11 having an input connection from pin 22 of connector 85A. Lamp 64 is energized whenever data recorded in the recorder/transmitter 25 has not yet been transmitted to polling processor 33 (FIG. 1).

The middle board 82, FIG. 9, is a data processing board, including programming and appropriate storage. The principal unit on the board is a microprocessor Z21; input and output connections from microprocessor Z21 to the keyboard/display controller Z11 (FIG. 8) are provided through pins 5-19 of the inter-board connector 85B. Microprocessor Z21 includes an internal clock signal source having an operating frequency determined by a crystal Y1. Microprocessor Z21 is also interconnected with a read-only memory (ROM) unit Z22, a random access memory (RAM) unit Z23, and a programmable serial communication interface circuit Z24 of the kind sometimes termed a USART. ROM Z22 stores the operating program for microprocessor Z21. RAM Z23 affords temporary storage for data scanned from the individual identification members of the system, data entered through the keyboard, data received from polling processor 33, and other computational data. RAM Z23, in the configuration illustrated, includes a programmable interval timer that generates an interrupt signal after expiration of a given time delay, and a parallel input/output port for use in conjunction with microprocessor Z21. The input/output operation is parallel and programmable, and consists of two eight-bit ports and one five-bit port. The storage capacity of RAM Z23 is 256 eight-bit bytes. The programmable interface circuit Z24 affords the necessary hardware for serial full-duplex communication with polling processor 33.

RAM Z23 has a number of additional connections both to display board 81 and power/data board 83. Thus, pins 20-22 of connector 85B connect RAM Z23 to dual timer Z14 (FIG. 8). A data input to RAM Z23 from scanner 26 is provided through a connection to pin 10 of a connector 87A that links boards 82 and 83. To identify the work station at which the data terminal is used, a series of address switches 91 through 97 are connected to individual terminals of RAM Z23. Switch 91 is closed at each location and the others are closed on a selective basis, affording a total of sixty-two different work station addresses.

Pins 1 through 6 of connector 87A afford a +5 volt power connection and terminals 21 through 26 provide a ground connection between boards 82 and 83. A capacitor C22 provides power storage and filtering for the power supply. A synchronizing signal input from rear board 83 is supplied from terminal 20 of connector 87A to interface unit Z24. Data received from polling processor 33 (FIG. 1) is applied to interface circuit Z24 through a circuit connection from pin 19 of connector 87A. Data transmission to the polling processor uses a circuit from interface unit Z24 to pin 17 of connector 87A. Additional pins 8, 9, 11-16 and 18 of connector 87A are connected to RAM Z23 for use with scanners of different types (see FIG. 15) but are not utilized in the present configuration.

A normally-closed switch 98, in FIG. 9, has one terminal connected to ground and the other terminal connected through a resistor R15 to a capacitor C21 and to the input of an inverting Schmitt trigger Z30 that is connected to a reset input of microprocessor Z21; capacitor C21 is returned to the +5 volt supply. Components R15, C21 and Z30 provide for automatic reset on power-up; switch 98 affords a separate manually actuatable reset for the data terminal.

FIG. 10 illustrates the circuit for power/data board 83; it includes a connector 87B that mates with connector 87A on board 82 (FIG. 9). In FIG. 9 only those terminals of connector 87B employed in the embodiment are illustrated. A connector 99A provides for all external connections, from recorder/transmitter 25, both to polling processor 33 (FIG. 1) and to scanner 26 (FIGS. 1, 2 and 7).

The connections to scanner 26 from board 83, FIG. 10, include terminals 6, 8 and 9 of connector 99A. Terminal 6 is connected to ground through the series combination of a resistor R40 and a potentiometer R50. Potentiometer R50 is employed to adjust the output level of the LED 71 in scanner 26 (FIG. 7) to assure effective scanning of the identification members used in the system. Pin 8 of connector 99A is connected to the +5 volt supply of board 83, described hereinafter. Pin 9 of connector 99A, affording a connection to the emitter of phototransistor 72 in scanner 26 (FIG. 7), is connected through a diode D40 and a Schmitt trigger circuit Z35 to pin 10 of connector 87B to complete the scan data input circuit to interface unit Z24 on the middle board 82 (FIG. 9). Circuit Z35 (FIG. 10) converts the generally sinusoidal output 104 from scanner 26 to a pulse waveform 105 suitable for use in the data processing circuits of middle board 82.

The work station data terminal does not include a conventional local power supply. Power for all of the data terminals is derived from a central power supply 32 (FIG. 1). As shown in FIG. 1, the main bus 29 and local connector cables 27 each include three conductors 101, 102 and 103. Lines 101 and 102 are employed for transmission of power to all of the data terminals. Line 101 is also used to transmit data from the individual work station data terminals 24 to polling processor 33. Line 102 has the additional function of transmission of data from the polling processor to all of the data terminals. Line 103 affords a ground connection extending throughout the system.

In power/data board 83 (FIG. 10) line 101 is connected to pins 2, 10 and 13 of connector 99A. A jumper between points JP1 and JP2 interconnecting pins 2 and 10 can be removed for adaptation of board 83 to a system variation in which data transmission is segregated from power transmission. Line 103 is connected to pins 3, 7 and 12 of connector 99A. All ground connections in board 83 are returned to this point. Transmission line 102 is connected to pins 1, 4, 5 and 14 of connector 99A. To convert board 83 for use in a system in which power and data are segregated, two jumpers between points JP3 and JP4 and points JP5 and JP6 can be removed. Points JP1 through JP6 are also useful for test and alignment purposes, as are the additional test terminals JP7-JP9.

To facilitate understanding of the circuits of power/data board 83 (FIG. 10) it is desirable to first consider the nature of the power and data signals transmitted through the system on lines 101 and 102, which are illustrated by the waveforms shown in FIG. 11. Power is supplied to all work station data terminals by a series of positive pulses on line 101 and negative pulses on line 102. Thus, the waveform for line 101 includes a series of recurring power pulses 105 of positive polarity. The frequency of power pulses 105 is subject to substantial variation, preferably within a range of 300 to 2000 Hz. Each power pulse 105 has an amplitude of +48 volts. The duty cycle for the power pulses is also subject to substantial variation, preferably within a range of twenty percent to eight-five percent. The power signal on line 102 is similar and consists of a recurring series of power pulses 106. Power pulses 106 are of negative polarity, having an amplitude of −48 volts. The two sets of power pulses 105 and 106 are synchronized with each other (FIG. 11).

As noted above, line 101 transmits data from the individual work station data terminals to the polling processor of the system. Transmission is in the form of a binary signal interposed in the gaps between power pulses 105. For a binary zero, the voltage on line 101 is left to decay normally and goes no lower than zero, as indicated by the intervals 107-0 in FIG. 11. The rate of voltage decay and level reached during the binary zero intervals 107-0 is a function of the overall transmission system capacitance, and may vary substantially for different installations. For a binary one a negative twelve volt pulse is applied to line 101, in an interval between power pulses, as indicated by the pulses 107-1 in FIG. 11.

A corresponding arrangement is used for transmission of data from the polling processor to the individual data terminals along line 102. For intervals between power pulses 106 in which the voltage on the line is allowed to decay in normal fashion, and the voltage on the line remains negative with respect to zero, waveforms 108-0 signifying binary zeros are presented. For binary ones, positive twelve volt pulses are applied to line 102 in the intervals between power pulses, as indicated by pulses 108-1 in FIG. 11. It is thus seen that there is simultaneous time-shared transmission of power and data between the work station terminals 24 and the terminal bus interface units 31 of the system (see FIG. 1) and that there can be simultaneous transmission of data to and from the polling processor 33 and the work station terminals 24 at all times.

Returning to FIG. 10, it is seen that line 101 is connected through a diode D32 to a first voltage regulator RG1 which is in turn connected to a second voltage regulator RG2. Regulator RG1 utilizes the forty-eight volt power pulses 105 from line 101 (FIG. 11) to develop a regulated twelve volt supply of positive polarity. Regulator RG2 is employed to derive a regulated +5 v supply for the circuits of all three boards 81-83. The two regulators in series afford a steady and reliable voltage supply, despite the intermittent nature of the power input from line 101. There is no specific need for a regulated +12 v supply for boards 81-83, but with different electronic implementation it may be a necessity (see FIG. 15). Line 102 is connected through a diode D33 to a voltage regulator RG3 that provides a negative twelve volt output for generation of data pulses 107-1 (FIG. 11) on line 101. An additional regulator RG4 may be used to provide a −5 v supply for a different scanner (see FIG. 15).

Line 102 is also connected through a blocking diode D35 and a resistor R35 to a sync detector 109. Detector 109 includes a photoisolator 110; the cathode of the LED component of photoisolator 110 is connected through a resistor R37 to resistor R35, the common terminal 113 of resistors R35 and R37 being returned to ground through a capacitor C40. A Zener diode D37 is connected from terminal 113 to ground and the anode of the LED in photoisolator 110 is also grounded.

The phototransistor in photoisolator 110 has its emitter connected to system ground and its collector connected to a "sync" pin 20 of connector 87B through the series combination of two Schmitt trigger circuits Z31 and Z32. The collector of the transistor portion of device 107 is also returned to the +5 volt supply through a resistor R39. The output of trigger circuit Z32 is also connected to one input of a NAND gate Z36. A second input to gate Z36 is derived from pin 17 of connector 87B through an inverter Z37. NAND gate Z36 is connected in series with the LEDs in two photoisolators 111 and 112, the circuit being returned to the +5 volt supply through a resistor R46.

The emitter of photoisolator 111 is connected to the collector of a transistor amplifier Q31 and is also connected through a current limiting lamp LP1 and a filter comprising a resistor R33 and a capacitor C35 to the output of the −12 volt regulator RG3. The collector of the transistor element of photoisolator 111 is connected to the base of transitor Q31. A feedback resitor R41 is connected between the emitter and base of transistor Q31. The emitter of transistor Q31 is also connected to the emitter of a second amplifier transistor Q32 that is connected, in a complementary circuit, to photoisolator 112. The collector of transistor amplifier Q32 is connected to line 101 through a blocking diode D31. A line termination resistor R43 is connected from the line 101 connection to ground.

A data detector 114, similar in construction to detector 109 but oppositely polarized, is also connected to transmission line 102 through a blocking diode D34. The collector of the transistor element in the photoisolator 115 of detector 114 is connected to a data output pin 19 of connector 87B through two series connected Schmitt trigger circuits Z33 and Z34.

In considering operation of the circuits of power/data board 83, FIG. 10, sync detector 109 makes a good starting point. Upon the occurrence of each negative-going power pulse 106 on line 102 (see FIG. 11) capacitor C40 is charged negatively and, after a predetermined interval, the LED portion of photoisolator 110 is energized. This produces an output signal from the transistor element of photoisolator 110, a signal that persists for a limited time interval after the end of the input pulse from line 102 due to the stored charge on capacitor C40. The output of photoisolator 110 is converted to a sync pulse of given amplitude and waveform by trigger circuits Z31 and Z32 and supplied to the data processing board 82 via pin 20 of connector 87B.

The same sync pulses are applied to NAND gate Z36; whenever a sync pulse coincides with a data signal from the processing board (pin 17 of connector 87B) gate Z36 goes conductive to energize the LEDs in photoisolators 111 and 112. The two photoisolators actuate the complementary amplifiers Q31 and Q32 to complete a connection from the −12 volt supply, regulator RG3, to line 101, transmitting a negative 12 volt pulse (107-1, FIG. 11) representative of a binary one to the polling processor. When the sync pulse from detector 109 occurs in the absence of a data pulse input to gate Z36, photosiolators 111 and 112 and amplifiers Q31 and Q32 remain inactivated and the signal on line 101 is a binary zero (see pulses 107-0 in FIG. 11).

Detector 114 operates in the same manner as detector 106 except that it entails no time delay and responds only to positive pulses on line 102, these being the pulses 108-1 of FIG. 11. Each time one of these data pulses is received on line 102, it is detected by detector 114 and supplied to the data processing board 82 through the threshold-establishing Schmitt trigger circuits Z33 and Z34 and pin 19 of connector 87B.

FIG. 12 affords a block diagram of one of the terminal bus interface units 31 of system 20 (FIG. 1), adapted for use with the specific circuits and constructions illustrated in FIGS. 2-11. Interface unit 31, in the configuration shown in FIG. 12, comprises three circuit boards 121, 122 and 123 which in many respects correspond to boards 81-83 of the individual data terminal units 25. Thus, board 121 is a keyboard and display unit that may be essentially similar to board 81 (FIG. 8). However, the simple nine-character display 63 employed at the work station data terminal may be replaced by more sophisticated display apparatus, such as a cathode ray tube display, to permit readout of more detailed information than at the work stations.

The data processing board 122 of interface unit 31 (FIG. 12) is basically similar to the data processing board 82 for the individual terminals (FIG. 9), but with some additions. Thus, board 122 comprises a microprocessor Z41 connected to a program storage ROM Z42 and a random access memory Z43. An interface circuit Z44, which can constitute a programmable serial communication interface unit like Z24 or a more conventional USART unit, connects microprocessor Z41 to the power/data board 123 for terminal unit 31. A second USART Z45 is also connected to microprocessor Z41 as an interface to couple the terminal bus interface unit 31 to polling processor 33. Microprocessor Z41 is also connected to a programmable rate generator Z46 constituting the basic sync signal source for the data terminals connected to this terminal bus interface unit 31. Circuit Z46 reduces the operating (sync) frequency whenever microprocessor Z41 ascertains that incoming data from the individual work station terminals exhibits an unduly high level of errors, and increases that frequency, up to a predetermined maximum, whenever the occurrence of errors is reduced to an acceptable level. That is, the programmable rate generator Z46, in conjunction with microprocessor Z41, affords a dynamic transmission control, adjusting the sync (transmission) frequency in relatively small increments, over a substantial range, to provide data transmission at the most rapid rate consistent with an acceptable error level. Thus, in a system in which the normal operating frequency on lines 101-103 is 2000 Hz, a determination by microprocessor Z41 that an undesirably high percentage of the incoming data from the work station terminals is inaccurate, the sync frequency is reduced until the error incidence is no longer excessive. When conditions improve, the sync (transmission) frequency is again increased.

The power/data board 123 that connects terminal bus interface 31 to all of the work station terminals served by the interface (FIG. 12) is illustrated in detail in FIG. 13. As shown therein, the sync signal circuit 129 from programmable rate generator Z46 is connected to the LED portions of four photoisolators 131 through 134 through four trigger circuits Z51 through Z54. The anodes of the LEDs in photoisolators 131-134 are returned to a +5 volt supply through four resistors R75 through R78.

The collector of the phototransistor in device 131 is connected to the collector of a transistor amplifier Q61 and to a +48 volt supply. The emitter of the phototransistor is connected to the base of transistor amplifier Q61. The emitter of transistor amplifier Q61 is connected back to the base through a resitor R71. It will be recognized that this is essentially the same kind of switching circuit as that incorporating the photoisolator 112 in the data terminal power/data board 83 (FIG. 10).

In board 123, FIG. 13, the switching amplifier Q61 is connected through two diodes D61 and D62 to the base electrodes of two power switching transistors Q51 and Q52. The collector of transistor Q51 is connected to a +48 volt line 135 from power supply 32. The emitter of transistor Q51 is connected through a resistor R51 to a power line 137. A resistor R61 connects line 137 back to the base of transistor Q51. The configuration for switching transistor Q52 is the same, incorporating a coupling resistor R52 and a feedback resistor R62.

The circuit for photoisolator 132 is the same as for photoisolator 131 except that it is of complementary configuration as regards transistor amplifier Q62 and power switching transistors Q53 and Q54. The collectors of the power switching transitors Q53 and Q54 are connected to a conductor 138 that is in turn connected to transmission line 101 through a diode D51.

The power switching circuitry for the other data transmission line 102, controlled by photoisolators 133 and 134, amplifiers Q63 and Q64, and power switching transistors Q55 through Q58, is the same as for the positive power supply. In this instance, the power input is from a line 136 connected to power supply 32 and the power connection to line 102 is made through a blocking diode D53.

The circuit for transmitting data from the individual work station terminals through the power/data board 123 of the terminal bus interface, FIG. 13, starts with transmission line 101 and extends through a blocking diode D52 and through a line termination and clamp circuit comprising resistors R91, R92, and R93 and a Zener diode D91 to the LED element of a photoisolator 137. The phototransistor in photoisolator 137 has its collector connected to a +5 volt supply through a resistor R94. The emitter is grounded. The collector is connected through two Schmitt trigger circuits Z59 and Z60, in series, to a data line 201 that connects to the processor board 122 (FIG. 12). It will be recognized that photoisolator 137, FIG. 13, constitutes a detector essentially similar to detector 114 in the data terminal board 83, FIG. 10.

Data transmission from the polling processor to the work station terminals, through the terminal bus interface power/data board 123 of FIG. 13, starts at line 202 from USART Z44 (see FIG. 12). Line 202 constitutes one input to an AND gate Z56, the second input to gate Z56 being the sync pulses from line 129, which are coupled to the AND gate through a Schmitt trigger circuit Z55. The output of AND gate Z56 is connected through two inverter driver circuits Z57 and Z58 to the LED portions of two photoisolators 145 and 146. The LEDs of the two photoisolators are returned to a +5 volt supply through two resistors R85 and R86.

In photoisolator 146, the phototransistor collector is connected to the +48 volt supply and the emitter is connected to the base of a transistor Q66. The collector of transistor Q66 is connected to the +48 volt supply and the emitter is connected to the base of a transistor Q60. The emitter of transistor Q66 is connected back to the base through a resistor R84. The collector of transistor Q60 is connected to the +48 volt supply. The emitter is connected back to the base through a resistor R82. The circuit connected to photoisolator 145 is complementary in construction and includes a first transistor Q65, a second transistor Q59, and two resistors R81 and R83. The emitters of the two transistors Q59 and Q60 are connected together and the collector of transistor Q59 is connected through a blocking diode D54 to the main transmission line 102.

For power transmission to the data terminals, each sync pulse received from rate generator Z46 on line 129 actuates the four photoisolators 131-134 to drive the associated transistor amplifiers Q61 through Q64 to conduction. The outputs of these four amplifiers, in turn, actuate all of the power switching transistors Q51 through Q58 to conductive condition. Accordingly, transmission line 101 is connected to the +48 volt power line 135 through the power switching transistors Q51-Q54 and transmission line 102 is connected to the −48 volt power line 136 through the power switching transistors Q55-Q58.

For data pulses, the circuits of board 123 function in essentially the same manner as those of board 83. Negative-going data pulses received from the work station data terminals on line 101 are passed through diode D52 to the detector comprising photoisolator 137 and trigger circuits Z59 and Z60 and are then transmitted on line 201 to processor board 122 (FIG. 12). Data from the polling processor, received from data board 122 on line 202, actuates AND gate Z56 in synchronism with sync pulses from line 129 and the inverter Z55, connecting line 102 to the positive power supply through the attenuating amplifier comprising transistors Q59, Q60, Q65 and Q66, controlled by inverters Z57 and Z58 and photoisolators 145 and 146.

As an aid to understanding of the operation of the specific data acquisition system shown in FIGS. 2 through 13, the data transmission protocol for the system is set forth in FIG. 14. FIG. 14 shows host-to-unit and unit-to-host operations, including signals broadcast to all data terminal installations, system responses, error responses, and transactions of various lengths. An explanation of the different symbols employed in FIG. 14 for data transmission messages is presented in the following Table I:

TABLE I

| Message | | Binary | Meaning |
|---|---|---|---|
| DATA | | 00...... | Data values: 0000-HEX, 00-BINARY, 00-ASCII-20) |
| CMND | | | Commands: |
| | MACK | 0100 0001 | Unit/Host message received. |
| | MRJT | 0101 0010 | Unit/Host message rejected. |
| | MPND | 0101 0000 | Message pending for terminal. |
| | MBEG | 0100 0010 | Message begins for terminal. |
| | CSTN | 0100 1110 | Host broadcast to all units - response next poll = NO. |
| | CSTY | 0101 1001 | Host broadcast to all units -- response next poll = YES. |
| | QUIT | 0101 0001 | Quit sending until polled. |
| | MAVL | 0101 0110 | Terminal available for host |

TABLE I-continued

DATA TRANSMISSION - MESSAGES

| Message | Binary | Meaning |
|---|---|---|
| STRT } | 10 [terminal number] | message.<br>Start transmitting, terminal No. Terminal message for host. |
| MESS } | | |
| POLL } | 11 [terminal number] | Poll terminal No. __<br>Reject - no message for host. |
| RJCT } | | |

The displays presented to the work station operator, in normal operation of the system of FIGS. 2-14, are set forth in Table II:

TABLE II

DISPLAYS - NORMAL OPERATION

| ID Member Scanned | Display |
|---|---|
| 1. Operator's Card 41 - First Scan | ON -- 76432 |
| 2. Operator's Card 41 - Second Scan | OFF -- 76432 |
| 3. Operation Card 43 | 3 -- 125 |
| 4. Workpiece Unit Card 37 - First Scan | 008712-19 |
| 5. Workpiece Unit Card 37 - Second Scan | END JOB |
| 6. Any erroneous scan, any card | ERROR |

The numbers in displays Nos. 1 and 2 are the individual operator's number. The first number in display No. 3 is the shop (factory) designation; the second number is the process step (operation) identification. In display No. 4, the first number is the garment cut number, the second is the bundle number; see FIG. 4.

Routine operation of the system disclosed in FIGS. 2 through 14 corresponds directly to the preliminary description of operation for system 20 of FIG. 1 as described above, and hence need not be repeated in detail. The operational program for each of the work station data terminals 24, recorded in the ROM Z22 (FIG. 9) at each terminal, is set forth hereinafter. However, some supplementation and clarification of the operating procedure, and some additional features of the system of FIGS. 2-14, merit consideration.

Each time the work station operator scans one of the identification cards 36, 41, or 43, in scanner 26 (FIGS. 2, 5 and 6) the display 63 on the face of the recorder transmitter unit 25 (FIGS. 2 and 3) flashes a message to the operator. The messages, which depend upon the cards scanned and the sequence, are shown in Table I. If the operator pulls the card through scanner 26 too slowly, the "ERROR" display is given and the operator knows that the card must be scanned again. This is equally true with respect to a movement of the card through the scanner that is too rapid. However, as noted above, scanner 26 can accommodate card movements at a variety of speeds. The portion of the program for microprocessor Z22 (FIG. 9) that interprets the card scan is identified by the heading.

The program for the microprocessor also causes the data terminal to display "ERROR" if the operator lifts the card from the scanner before the scan is completed or if any other error in scanning occurs, such as a missed or extra digit.

As noted above, when an operator identification card 41 is scanned at the start of a work period, the operator identification is retained in storage in RAM Z23 until the same operator scans the same identification card on leaving the work station. In the interim, if the operator leaves the work station for a brief period, as to obtain additional workpiece units or for other reasons, another operator might attempt fraudulently to obtain credit for the first operator's work by passing his own ID card 41 through the scanner at the work station of the first operator. This contingency is met in the data terminal program, which rejects any operator identification data once an operator has checked in at the work station and has not checked out. All that happens on scanning of a second operator's identification member 41, after a first operator has already checked in at the work station, is an error determination with appropriate display.

The program for each data terminal also effectively precludes operator entry of at least certain classes of data through keyboard 67. Thus, data entry through keyboard 67 is limited except when a specially coded supervisor's identification card has been passed through scanner 26. By this technique, each data terminal is adapted to supervisory entry of specialized information, such as messages indicating that an operator has been given permission to leave early, an operator has been given permission to work overtime, or a rate or other payment change is to be made due to specialized content of workpiece units or the like, without permitting the entry of such information by the work station operator. The program restricts entry of such specialized data to a foreman or other supervisor.

Each station operator is always informed with respect to effective operation of the data terminal 24 at the work station. Each good entry of data is signalled both by display 63 and by a brief audible signal from device 66. Indicator lamp 64 tells the operator when recorded information has been passed on to the polling processor and the terminal is clear to receive additional information. Indicator lamp 65 tells the operator that the data terminal is on line and functioning properly, being polled appropriately by polling processor 33; if indicator lamp 65 goes out at any time, the operator can report a malfunctioning data terminal promptly to the appropriate supervisory personnel.

Whenever a malfunction of the production apparatus 23 at a given work station (FIG. 1) occurs, a foreman or mechanic can report this situation through keyboard 67, first scanning the special foreman's or mechanic's identification card to enable use of the keyboard for this purpose. The card of a mechanic may be encoded to preclude use of the keyboard for other functions limited to codes intended for use only by a foreman or other supervisory personnel.

The data acquisition system of the invention is especially appropriate and advantageous as applied to a garment sewing shop or other production facility in which the operations at each work station are typically of short duration performed by sedentary operators working on relatively low cost equipment, with a large number of work stations present in the facility. The individual data terminals 24 do not require separate power supplies, all power requirements being met by transmission from the central power supply 32. This permits a substantial reduction in the cost of individual terminals. On the other hand, the forty-eight volt DC power supply 32, with adequate capacity to serve a large number of data terminals, is not particularly expensive because equipment of this kind has long been available for telephone service. Moreover, a standby battery for power supply 32, allowing orderly shutdown of the data acquisition system without data loss in the event of a power failure, can be incorporated in the system at only moderate cost.

The simple three-wire transmission system used by the data acquisition apparatus of the present invention is readily available from a number of sources and is much lower in cost than any arrangement using dedicated wiring, coaxial cable, or the like. This simple transmission arrangement, which handles both power and data, allows any work station to be moved to any location in the shop and immediately connected to the data acquisition system simply by plugging connector 28 into the nearest data system bus 29, provided the capacity of the polling processor is not exceeded. Consequently, relocation of work stations to meet changing work requirements is accommodated by the system in a matter of minutes.

The high amplitude (twelve volts) pulses used for data transmission in the system are of material value in eliminating errors due to field coupling to adjacent electrical equipment and like sources. Any noise entering the system must be of high amplitude, of the proper polarity, and must coincide with the time slots reserved for data transmission in order to produce any errors. The specific system of FIGS. 2-14 affords an overall signal-to-noise ratio high enough so that the loss of significant data is most unlikely. In an extremely noisy facility, even this high level of performance can be improved by increasing the amplitude of the data pulses; an increase to twenty-four volts can be accomplished with little change in the equipment.

Initiation and propagation of error in the system are minimized by appropriate checks, performed locally at the data terminals. These error determinations typically include checks of length, sequence, and presence or absence of check digits in the input data; see the accompanying data terminal program. For analog inputs to the system, as discussed hereinafter, the integrity of the system is maintained by conversion of data to digital at the data terminals prior to any processing. Because there is no keyboard entry of data in normal system operation, and the keyboard is locked out for normal system functions, erroneous data entry through keyboard errors is effectively eliminated.

The data acquisition system of the invention collects complete information on the location and status of all workpiece units, on a real-time basis, continuously through each work shift. Thus, the data supplied to the host computer makes it possible, at any given time, to determine the location of each workpiece unit in the shop. On the other hand, collection of this information requires no exercise of clerical skill on the part of the work station operators. The highly "intelligent" data terminals obtain all essential information, covering work station identity, operator identity and workpiece identity, by simple scanning of inexpensive identification members through procedures requiring no specialized skill on the part of the operators. Complete payroll information as well as workpiece information is continuously maintained by the system on a real-time basis.

One of the highly useful attributes of the system of FIGS. 2-14 is that the basic functions are soft-coded. Hardwired logic, used in many previous systems, is generally eliminated in favor of software as a basis for processing and control. The principal units of the system are not dedicated to a specific function or to a given machine. This adds materially to the versatility of the system. Further system functions can be added by using additional identification members or by adding external inputs, either analog or digital. For example, the system can be of appreciable value in connection with time study operations. Furthermore, the system can be readily adapted to monitoring of a number of other kinds of information and to use of a variety of different input devices as explained more fully hereinafter.

It is not essential that each data terminal include a keyboard 67 (FIGS. 2, 3, 8) because, as noted above, the keyboard is not required for and does not enter into normal system operation. To preserve the capability for entry of special data, while reducing the cost of the individual data terminals, the keyboard may be replaced by a connector at each terminal. Keyboard data entry can then be accomplished by use of a portable keyboard equipped with a mating connector; modern keypads are small and compact enough to be carried in a supervisor's pocket and present no substantial problem in this regard.

Because the invention is primarily concerned with data acquisition, not data processing, no explicit data regarding the internal construction of polling processor 33 or host computer 34 is incorporated herein. Computer 34 may constitute any general purpose computer, suitably programmed, and may encompass the functions of polling processor 33. On the other hand, polling processor 33 may itself be a small general purpose computer. For increased protection against any malfunction at the polling processor, that unit may constitute two or more small general purpose computers, such as Intel model SBC 80/20-4, in a redundant arrangement to protect against system outage.

In order to afford a more complete disclosure of the specific system of FIGS. 2-14, detailed circuit data relating to the system is set forth in Table III. It should be understood that this information is presented merely by way of illustration and in no sense as a limitation on the invention.

TABLE III
COMPONENTS FOR FIGS. 8-10 and 13

| Integrated Circuits, etc. | |
|---|---|
| Z11 | 8279 Intel |
| Z12 | DS8867 National |
| Z13 | DM74145N National |
| Z14 | LM556CN National |
| 63A-63I displays | DL304 Litronix |
| 67 keypad | KL0076 Digitran |
| 66 audible signal | X10P05 Project Unlimited |
| Z21 | 8085 Intel |
| Z22 | 8355 Intel |
| Z23 | 8156 Intel |
| Z24 | 8251A Intel |
| Z25-30 | DM7404N National |
| Y1 | 5.068 MHz |
| Z31-35 | DM7414N National |
| Z36,Z37 | DM7400N National |
| Z51-54, Z57,Z58 | DM7406N National |
| Z55 | DM7404N National |
| Z56 | DM7408N National |
| Z59,60 | DM7414N National |
| Solid State Devices | |
| Q11 transistor | 2N5369 Sprague |
| 110,111,112,115 photoisolators | 4N33 Motorola |
| Q31 transistor | MJE30B Motorola |
| Q32 transistor | MJE29B Motorola |
| D-31-35, D38 diodes | R170 International Rect. |
| D36,D37 diodes | 1N4733 International Rect. |
| Q51, Q52, Q57, Q60 transistors | 2N5686 Motorola |
| Q53-56, Q59 transistors | 2N5684 Motorola |
| Q61, Q64, Q66 transistor amplifiers | 2N6056 Motorola |
| Q62, Q63, Q65 transistor amplifiers | 2N6054 Motorola |
| 131-134, 137, 145, 146 Photoisolators | MOC8050 Motorola |
| D51-54 diodes | 1N 1188A Motorola |
| D61-68 diodes | 1N 4004 Motorola |
| D91 diode | 1N 5337 Motorola |
| Resistors | |

TABLE III-continued

| COMPONENTS FOR FIGS. 8-10 and 13 | |
|---|---|
| R11, R12 | 100 kilohms |
| R13, R14 | 2.2 kilohms |
| R15-R17, R36, R37, R41, R42 | 330 ohms |
| R18, R31-R33, R38, R39, R43, R93 | 1 kilohm |
| R21-R24 | 3 kilohms |
| R25, R34, R35, R44, R45 | 560 ohms |
| R40 | 68 ohms |
| R46, R91 | 100 ohms |
| R50 | 200 ohms |
| R51-R58 | 0.1 ohm |
| R61-R68 | 150 ohms |
| R71-R74, R83, R84 | 400 ohms |
| R75-R78, R85, R86 | 220 ohms |
| R81, R82 | 270 ohms |
| R92 | 120 ohms |
| Capacitors | |
| C11, C22, C34 | 2000 microfarads |
| C12 | 100 microfarads |
| C13 | 5 microfarads |
| C14, C15 | 0.01 microfarads |
| C21 | 15 microfarads |
| C31-C33, C35 | 1000 microfarads |
| C36 | 0.47 microfarads |

Figure 15:
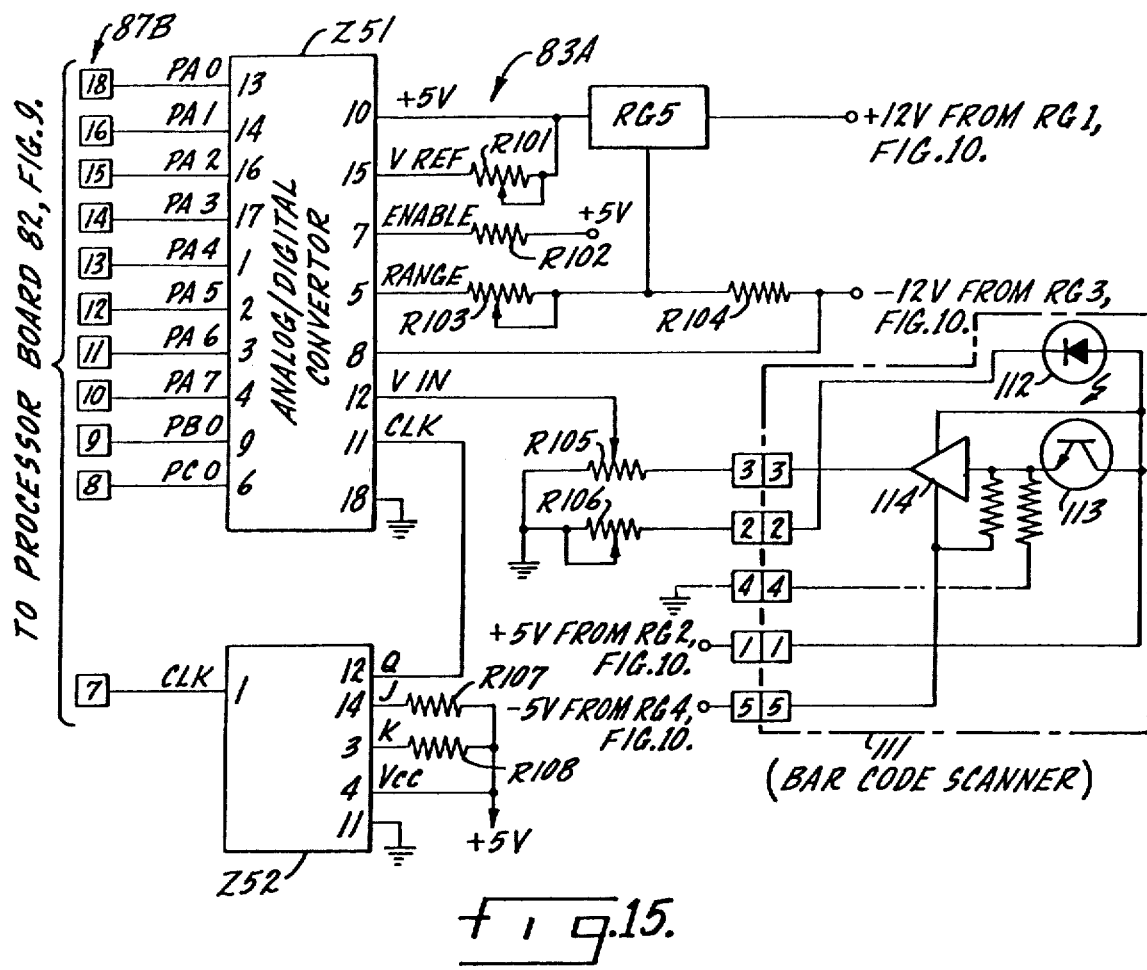
FIG. 15 illustrates a modification of FIG. 10 employed to adapt the data terminal to different types of identification members and other data input devices.

FIG. 15 illustrates a modification of the system of FIGS. 2-13 for use in a system in which the basic input to data terminals 24 (FIG. 1) is derived from a bar code instead of the aperture code used in identification members 38, 41 and 43. A standard two-of-five black and white bar code is assumed. As before, the identification members preferably provide human readable data as well as scannable data. For this modification of the system, the circuits connected between pins 6, 8 and 9 of connector 99A and pin 10 of connector 87B in the power/data board 83, FIG. 10, are all omitted, and board 83 is modified to incorporate the input circuit 83A of FIG. 15.

Circuit 83A, FIG. 15, includes an analog-to-digital converter Z51 having its output terminals connected to the pins 8-16 and 18 of the connector 87B that constitute data input connections to RAM Z23 in processor board 82, FIG. 9. Appropriate constant-voltage inputs to converter Z51 are provided from the +12 volt and −12 volt supplies afforded by regulators RG1 and RG3 (FIG. 10) by means of circuits including the resistors R101 through R104. These supply voltage circuits for converter Z51 include an additional +5 v regulator RG5. Converter Z51 of circuit 83A, FIG. 15, also includes a clock input, based upon the clock signal available from pin 7 of connector 87B. The clock input circuit includes a J-K flip-flop Z52 employed as a frequency divider to afford a clock input to converter Z51 at one-half the frequency of the clock signal from microprocessor Z21, FIG. 9.

An analog input to converter Z51, FIG. 15, is derived through a potentiometer R105 connected, in this instance, to the output of a bar code scanner 111. Scanner 111 may comprise a light pen scanner employing the construction described in U.S. Pat. Nos. 3,784,794 and 3,892,974 and comprises a light emitting diode 112, a phototransistor 113, and an amplifier 114. Connections to scanner 111 are provided through a connector 110A-110B, including appropriate connections to the requisite power supply voltages. Scanner 111, as illustrated in FIG. 15, may comprise the INTERMEC Model 1230 light pen scanner, available from Interface Mechanisms Inc. of Mountlake Terrace, Wash. If desired, the components of that scanner may be mounted within a slotted block or frame as described above for scanner 26 (FIGS. 5 and 6).

In operation, using bar code scanner 111, the input circuit 83A of FIG. 15 provides an analog signal input to converter Z51. The analog signal input is converted to a series of digital output signals that are supplied to random access memory Z23 (FIG. 9) through connector 87B, 87B. Microprocessor Z21, FIG. 9, is appropriately programmed to utilize the digital signals derived from converter Z51 for interpretation of the bar code scanned by scanner 111. Thus, the circuit 83A of FIG. 15 converts the analog signal from scanner 111 to a digital signal that can be effectively processed in the system and allows for a change of identification members from the punched cards described above to black and white bar code identification members. The same circuit 83A can be used, without substantial change, with a magnetic code scanner. Furthermore, the same circuit can be used with a variety of other different analog input devices (e.g., pressure transducers, temperature transducers) to allow for additional data inputs to the data acquisition system. Indeed, the punched card scanner of FIGS. 5-7 can be employed with the conversion circuit 83A of FIG. 15. In each instance, of course, the data terminal microprocessor must be suitably programmed for interpretation and verification of the data supplied to converter Z51.

To provide a more complete disclosure of the conversion circuit 83A, FIG. 15, detailed circuit data is set forth below in Table IV. This information is presented solely for purposes of illustration and in no sense as a limitation on the invention.

TABLE IV

| Components for FIG. 15 | |
|---|---|
| Z51 | MM5357N National |
| Z52 | SN7473 |
| RG5 | LH0071 National |
| R101, R103 | 500 ohms |
| R102, R107, R108 | 330 ohms |
| R104 | 3 kilohms |
| R105 | 5 kilohms |
| R106 | 100 ohms |

FIG. 16 is a simplified block diagram of a point-of-manufacture data acquisition system 220 constructed in accordance with another embodiment of the present invention. System 220 includes many elements corresponding directly to those of the previously described system 20; like system 20, system 220 is utilized in a production facility having a series of work stations with a multiplicity of workpiece units moving through those stations for performance of a sequence of manufacturing or other process operations. FIG. 16 shows a part of one series of work stations 221-1 through 221-8; it should be understood that there are additional work stations in the same series and that system 220 would also include one or more additional series of work stations. As before, each work station includes a production apparatus 23 which, in a garment sewing shop, could be a sewing machine, a buttonhole cutting and sewing apparatus, a press, or other equipment. System 220 employs workpiece, operator, and shop operation identification members 37, 41, and 43 corresponding essentially to those described above (FIGS. 1 and 4).

In system 220, FIG. 16, a scanner 226 is located at each of the work stations. The scanners 226 for the work stations 221-1 through 221-4 are each electrically connected to a recorder/transmitter unit 225A that is in turn connected by a local three-wire power/data cable 27 and a connector plug 28 to a power/data transmission line 29. Similarly, the scanners 226 for the work station 221-5 through 221-8 are each connected to a recorder/transmitter unit 225B that is electrically connected to the three-wire bus 29 by a local cable 27 and connector 28. The main bus 29 is connected to a terminal bus inteface circuit 31; system 220 also includes another main bus 29 connected to a second terminal bus interface circuit 31. The terminal bus interface circuits 31 are connected to a common power supply 32 and to a polling processor 33. Polling processor 33 is coupled to a central computer 34 and to appropriate auxiliary equipment 35. It will be recognized that the portion of system 220 comprising circuits 29 and 31 through 35 is the same as in the previously described embodiment.

The recorder/transmitter units 225A and 225B of system 220 are essentially similar to the recorder/transmitter units 25 of system 20. Units 225A and 225B each should incorporate adequate storage for all of the work station scanners connected thereto, and some form of programming (hardware or software) to distinguish the work stations.

The work station scanners 226 may be essentially similar in construction to the scanner 26 described above in conjunction with FIGS. 5–7. Preferably, however, scanners 226 are each provided with some minimal indicator capability, shown as two indicator lamps 264 and 265. If desired, each scanner 226 may also be equipped with an audible alarm 266, a data display 263, and a keypad 267, or any desired combination of such devices. In system 220, if the scanners provide only the lamps 264,265 for signalling to the work station operator, lamp 264 may be employed to indicate that data previously entered in recorder/transmitter (225A or 225B) from the associated work station has been transmitted to the polling processor 33 so that additional data can be entered. Lamp 265 may be utilized to indicate to the work station operator that scanning of one of the identification members 37,41 or 43 has been effective and has resulted in the entry of valid information in the recorder/transmitter. If all of the devices 263–266 are present at each scanner, their operation may be as described above for devices 63–66. Of course, variations on these indicator functions are readily applicable.

As previously noted, the internal circuitry of recorder/transmitter unit 225A (and the similar unit 225B) may be essentially similar to unit 25 as described above, with the relatively minor addition of internal logic to recognize the individual scanners 226 of the different work stations in the groups 221-1 through 221-4 and perhaps some increase in storage capacity. In effect, therefore, each scanner 226, taken in conjunction with its associated recorder/transmitter unit 225A or 225B, affords a complete data terminal for one of the work stations. Stated differently, each recorder/transmitter unit is common to a group of data terminals for the individual work stations, whereas a separate scanner is provided at each work station.

The operation of system 220, FIG. 16 is essentially the same as described above in detail for system 20. On the other hand, system 220 may be somewhat more economical than system 20 because each recorder/transmitter unit in system 220 severs several work stations. Nevertheless, system 220 allows effective entry, on a real time basis, of operator identity, shop operation identification, and workpiece unit identification, with start and finish of work on each workpiece unit, simply by scanning of the system identification members.

Although each of the recorder/transmitter units 225A and 225B in FIG. 16 is shown as a part of the data terminals for a group of four work stations, that number may vary substantially. The number of stations grouped through one recorder/transmitter unit depends to a large extent on such practical considerations as the space requirements for each work station, the complexity of the information transmitted through the system, and the like; usually, the number of work stations grouped with one recorder/transmitter unit will be eight or less because larger groups require more complex inter-group wiring with consequent minimization of the cost advantage derived from grouping. It may be convenient to provide an additional scanner (not shown), with a keypad, directly associated with each recorder/transmitter, unit such as units 225A and 225B, for use by a supervisor or mechanic, independent of the work station scanners 226.

In either system 20 or system 220, it may be desirable to provide for connection of a supervisory control terminal at various locations around the system; such a terminal may also be used for diagnostic purposes without interrupting system operation. Because the system provides both powder and data transmission over the basic three-wire busses 29, this is a relatively simple matter. The supervisory terminal requires only the same basic circuits as employed in recording/transmitting units 25 and 225, with limited modification to accommodate a more comprehensive display such as a cathode ray tube display.

A typical operating program for the data terminals 24 of system 20, FIGS. 1–14, when using the punched card identification members 38, 41 and 43 (FIG. 1), scanner 26 (FIGS. 5–7) and the unmodified circuit 83 of FIG. 10, is as follows:

```
 1  :*******************************************************************
 2  :
 3  :                 PROGRAM:  DATA ACQUISITION TERMINAL
 4  :                           REVISED 8/01/78
 5  :
 6  :*******************************************************************
 7  :
 8            NAME    PCMO
 9  :
10           PUBLIC   START,BEGIN,CORDY,UCCNT,KBREP,DDREP,VALTH
11           EXTRN    RESET,REOOF,CCMMR,SCAN,CCMMI,KEYIN,DEBUG
12  :
*13  $INCLUDE(:F1:PCMCCM.BEG)
* 14  $EJECT
```

```
         *   15 ;****************************************************************
         *   16 ;       EQUATES
         *   17 ;****************************************************************
         *   18 ;
0090     *   19 DDISP    EQU    90H           ; DISPLAY RAM INITIALIZATION
00C2     *   20 KKCLR    EQU    0C2H          ; CLEAR KB FIFO
0068     *   21 KDCTL    EQU    68H           ; 8279 CONTROL PORT
0048     *   22 KDATA    EQU    48H           ; 8279 DATA PORT
0000     *   23 MASK6    EQU    00H           ; RESET 6.5 ONLY (USART)
001B     *   24 MASK7    EQU    1BH           ; RESET 7.5 ONLY (KB)
0019     *   25 MASKS    EQU    19H           ; MASK 5.5,RESET 6.5 & 7.5
000C     *   26 DEFCS    EQU    0CH           ; PB= INPUT, PC = ALT2 = OUTPUT
0018     *   27 CSR      EQU    18H           ; 8155 COMMAND/STATUS REGISTER ADDRESS
001A     *   28 PORTB    EQU    1AH           ; INPUT: PCMDAS ADDRESS
0018     *   29 PORTC    EQU    18H           ; OUTPUT: HORN & LIGHTS
00CD     *   30 UMODE    EQU    0CDH          ; USART MODE
00A8     *   31 UCTL     EQU    0A8H          ; USART CONTROL PORT
0037     *   32 UCOMD    EQU    37H           ; USART COMMAND WITH ERROR RESET
0088     *   33 UDATA    EQU    88H           ; USART DATA PORT
         *   34 ;
00C0     *   35 POLLC    EQU    0C0H          ; POLL CHARACTER
0080     *   36 STRTC    EQU    80H           ; STRT CHARACTER
0041     *   37 MACKC    EQU    'A'           ; MACK CHARACTER
0052     *   38 MRJTC    EQU    'R'           ; MRJT CHARACTER
0050     *   39 MPNDC    EQU    'P'           ; MPND CHARACTER
0042     *   40 MBEGC    EQU    'B'           ; MBEG CHARACTER
004E     *   41 CSTNC    EQU    'N'           ; CSTN CHARACTER
0059     *   42 CSTYC    EQU    'Y'           ; CSTY CHARACTER
0051     *   43 QUITC    EQU    'Q'           ; QUIT CHARACTER
0056     *   44 MAVLC    EQU    'V'           ; MAVL CHARACTER
0020     *   45 NORMC    EQU    20H           ; NORMAL TRANSMISSION CHARACTER
0022     *   46 REGDC    EQU    22H           ; REGISTER DUMP CHARACTER
0023     *   47 MEMDC    EQU    23H           ; MEMORY DUMP CHARACTER
0026     *   48 CASTC    EQU    26H           ; BROADCAST RESPONSE CHARACTER
002A     *   49 FXTSC    EQU    2AH           ; FIXED LINE TEST CHARACTER
002B     *   50 CYTSC    EQU    2BH           ; CYCLE LINE TEST CHARACTER
002F     *   51 TEXTC    EQU    2FH           ; TEXT COMMAND CHARACTER
0021     *   52 BCASA    EQU    'A'-20H       ; BROADCAST-ACKNOWLEDGE CHARACTER
0032     *   53 BCASR    EQU    'R'-20H       ; BROADCAST-REJECT CHARACTER
0010     *   54 LONGF    EQU    10H           ; LONG FORMAT 'OR' CHARACTER
         *   55 ;
         *   56 ;
         *   57 ;
         *   58 $EJECT
         *   59 ;****************************************************************
         *   60 ;       DATA FIELDS -- TO RESIDE IN RAM
         *   61 ;****************************************************************
         *   62 ;
         *   63         PUBLIC DARAY,CHECK,DTYPE,DATA,SAMPL,HOSTM,TRTYP,BUNDL
         *   64         PUBLIC EMPID,OPSEQ,FWBW,KMODE,STBYT,REDST,MYADR,BCAST,DBUGA
         *   65 ;
         *   66 ;
         *   67         DSEG
         *   68 ;
         *   69 DARAY:                         ; DATA-VALUE ARRAY:
0001     *   70 CHECK: DS    1                 ; CHECK DIGIT (SCAN INPUT ONLY)
0001     *   71 DTYPE: DS    1                 ; DATA-TYPE
000E     *   72 DATA:  DS    14                ; DATA BYTES
0040     *   73 SAMPL: DS    40H               ; READ-SAMPLE ARRAY
         *   74 HOSTM:                         ; HOST-TRANSMITTED MESSAGE AREA:
0001     *   75 TRTYP: DS    1                 ;   TRANSMISSION TYPE: NORMAL = 0
         *   76                                ;                     SYSTEM = FORMAT CHARACTER
000F     *   77        DS    15
0008     *   78 BUNDL: DS    8                 ; PREVIOUSLY SCANNED BUNDLE NUMBER
0005     *   79 EMPID: DS    5                 ; EMPLOYEE ID
0001     *   80 OPSEQ: DS    1                 ; OPERATOR SCAN SEQUENCE:
         *   81                                ;   01=EMPLOYEE SIGNED-ON, 02=SHOP-OPN DEFINED
0001     *   82 FWBW:  DS    1                 ; FWD/BWD SCAN INDICATOR
0001     *   83 KMODE: DS    1                 ; KEYBOARD OPERATING MODE:
         *   84                                ;   0=IDLE, 1=READING FROM KB
0001     *   85 STBYT: DS    1                 ; COMMUNICATIONS STATUS:
         *   86                                ;   00   - NO COMMUNICATION PENDING
         *   87                                ;   01   - UNIT MESSAGE PENDING FOR HOST
         *   88                                ;   02   - UNIT HAS INFORMED HOST OF PENDING MESSAGE
         *   89                                ;   10   - UNIT AVAILABLE TO ACCEPT HOST MESSAGE
         *   90                                ;   20   - UNIT RECEIVING HOST MESSAGE
0001     *   91 REDST: DS    1                 ; RED LED STATUS
0001     *   92 MYADR: DS    1                 ; PCMDAS UNIT ADDRESS
0001     *   93 BCAST: DS    1                 ; HOST BROADCAST INDICATOR
000C     *   94        DS    12
0060     *   95 DBUGA: DS    60H               ; COMMUNICATIONS DEBUG AREA
         *   96 ;
         *   97 ;
         *   98 $EJECT
             99 ;
            100        CSEG
            101 ;
0000 C30000 E 102 START: JMP   RESET          ; RESET SYSTEM ON STARTUP
            103 ;
0003 31CC00 S 104 BEGIN: LXI   SP,STACK       ; RESET STACK POINTER
0006 AF      105        XRA   A
0007 327000 D 106        STA   STBYT          ; RESET COMMUNICATION STATUS BYTE
000A 326F00 D 107        STA   KMODE          ; RESET KEYBOARD STATUS MODE
000D CDC000 E 108        CALL  REDOF          ; TURN OFF RED LED (YELLOW LED & HORN OFF)
            109 ;
```

```
                           110 ;
                           111 ;
                           112 ;
                           113 ;
                           114 ;
                           115 ;
                           116 ;************************************************
                           117 ;     REQUEST PROCESSOR: SCANNER/KEYBOARD/HOST
                           118 ;************************************************
                           119 ;
0010 3A7000     D          120 CDRDY: LDA   STBYT
0013 B7                    121        ORA   A             ; ALREADY COMMUNICATING WITH HOST?
0014 C2C000     E          122        JNZ   CCMMR         ; .. YES: CONTINUE HOST DIALOGUE
0017 3EC2                  123        MVI   A,KKCLR       ; CLEAR KB FIFO & INTERRUPT
0019 D368                  124        OUT   KDCTL
001B 3E19                  125        MVI   A,MASKS
001D 30                    126        SIM                 ; ALLOW EITHER KEYBOARD OR HOST INTERRUPT
                           127 ;
001E DB1A                  128 SCAN?: IN    PORTe         ; READ SCANNER
0020 E601                  129        ANI   1             ; CARD IN READ POSITION?
0022 C2C000     E          130        JNZ   SCAN          ; .. YES: -->EXECUTE SCANNER ROUTINES
                           131 ;
                           132 ;                          ; .. NO: (CARRY RESET)
0025 FB                    133        EI                  ; <ENABLE INTERRUPTS>
0026 7F                    134        MOV   A,A           ; >>
0027 7F                    135        MOV   A,A           ; >> DID USART INTERRUPT?  (CARRY SET?)
0028 F3                    136        DI                  ; <DISABLE INTERRUPTS>
0029 D21E00     C          137        JNC   SCAN?         ; .. NO: TRY AGAIN
                           138 ;
002C 3E0D                  139        MVI   A,MASK6       ; .. YES: ALLOW ONLY HOST COMMUNICATION
002E 30                    140        SIM
002F C3CC00     E          141        JMP   COMM1         ; --> EXECUTE HOST COMMUNICATION ROUTINES
                           142 ;
                           143 ;
                           144 $EJECT
                           145 ;************************************************
                           146 ;     INTERRUPT HANDLERS
                           147 ;************************************************
                           148 ;
0034            C          149 USINT: ORG   START+34H     ; ***** RST6.5 -- USART INTERRUPT HANDLER *****
0034 F3                    150        DI                  ; <DISABLE FURTHER INTERRUPTS>
0035 DB88                  151        IN    LDATA         ; READ BYTE FROM HOST
0037 47                    152        MOV   B,A           ; B = BYTE FROM HOST
0038 C3C000     E          153        JMP   DEBUG         ; AFTER DEBUG ROUTINE, CONTINUE TO PROCESS USART INTERRUPT
                           154 ;
                           155 ;
                           156 ;
                           157 ;
                           158 ;
003C            C          159 KBINT: ORG   START+3CH     ; ***** RST7.5 -- KEYBOARD INTERRUPT HANDLER *****
003C F3                    160        DI                  ; <DISABLE FURTHER INTERRUPTS>
003D C30000     E          161        JMP   KEYIN         ; --> EXECUTE KEYBOARD ENTRY ROUTINES
                           162 ;
                           163 ;
                           164 ;
                           165 ;
                           166 ;
                           167 ;
0040 DBA8                  168 UCONT: IN    UCTL          ; READ USART CONTROL
0042 E610                  169        ANI   10H           ; OVERRUN ERROR?
0044 CA4D00     C          170        JZ    NOERR         ; .. NO
0047 3E37                  171        MVI   A,UCCMD       ; ..YES: RESET ERROR FLAGS
0049 D3A8                  172        OUT   LCTL
004B FB                    173        EI                  ; <ENABLE INTERRUPTS FOR NEXT USART INTERRUPT>
004C C9                    174        RET                 ; ... RETURN WITH CARRY=0
                           175 ;
004D 78                    176 NOERR: MOV   A,B           ; A = BYTE FROM HOST
004E 37                    177        STC                 ; SET CARRY TO INDICATE GOOD READ
004F C9                    178        RET
                           179 ;
                           180 ;
                           181 $EJECT
                           182 ;************************************************
                           183 ;     SYSTEM TABLES
                           184 ;************************************************
                           185 ;
0050 0E                    186 KBREP: DB    14,00,15,13            ; KEYBOARD TRANSLTE TABLE
0051 00
0052 0F
0053 00
0054 01                    187        DB    01,02,03,10
0055 02
0056 03
0057 0A
0058 04                    188        DB    04,05,06,11
0059 05
005A 06
005B 0B
005C 07                    189        DB    07,08,09,12
005D 08
005E 09
005F 0C
                           190 ;
0060 00                    191 DDREP: DB    00DH,041H,07CH,075H    ; 0,1,2,3  DISPLAY TRANSLATE TABLE
0061 41
0062 7C
0063 75
0064 E1                    192        DB    0E1H,0B5H,0BDH,045H    ; 4,5,6,7
0065 B5
0066 BD
0067 45
0068 FD                    193        DB    0FDH,0E5H,0EDH,0B9H    ; 8,9,A,B
0069 E5
006A ED
006B B9
006C 9C                    194        DB    09CH,079H,0BCH,0ACH    ; C,D,E,F
```

```
006D 75
006E BC
006F AC
                                    195 ;
                                    196 ;
                                    197 $EJECT
                                    198 ;***********************************************
                                    199 ;     VALID DATA-LENGTH / DISPLAY-FORMAT TABLE BY DATA-TYPE
                                    200 ;           TYPES 0-3: PROTECTED FROM KEYBOARD ENTRY
                                    201 ;           TYPES E,F: CONSTRUCTED BY SPECIAL M.WILE ROUTINES
                                    202 ;***********************************************
                                    203 ;
0070 05                             204 VALTH: DB    5,0         ; TYPE 0 -- EMPLOYEE(5)
0071 00
0072 03                             205        DB    3,0         ; TYPE 1 -- FOREMAN(3)  (SCANNED PREFIX FOR TYPE E)
0073 00
0074 03                             206        DB    3,0         ; TYPE 2 -- MECHANIC(3)
0075 00
0076 00                             207        DB    0,0         ; TYPE 3 -- UNUSED
0077 00
0078 08                             208        DB    8,2         ; TYPE 4 -- CUT(6)-BUNDLE(2)
0079 02
007A 04                             209        DB    4,3         ; TYPE 5 -- SHOP(1)-OPERATION(3)
007B 03
007C 00                             210        DB    0,0         ; TYPE 6 -- UNUSED
007D 00
007E 00                             211        DB    0,0         ; TYPE 7 -- UNUSED
007F 00
0080 00                             212        DB    0,0         ; TYPE 8 -- UNUSED
0081 00
0082 00                             213        DB    0,0         ; TYPE 9 -- UNUSED
0083 00
0084 01                             214        DB    1,0         ; TYPE A -- HOST REQUEST CODE(1)
0085 00
0086 00                             215        DB    0,0         ; TYPE B -- UNUSED
0087 00
0088 00                             216        DB    0,0         ; TYPE C -- UNUSED
0089 00
008A 04                             217        DB    4,0         ; TYPE D -- DISPLAY MEMORY BYTE GIVEN ADDRESS(4)
008B 0C
008C 05                             218        DB    5,2         ; TYPE E -- FOREMAN(3)-AUTHORIZED STATUS(2)
008D 02
008E 01                             219        DB    1,0         ; TYPE F -- END-BUNDLE ABBREVIATED DATA MESSAGE
008F 00
                                    220 ;
                                    221 ;     *** END ***
                                    222 $EJECT

1        NAME   POM1A
                                    2 ;
                                    3        PUBLIC RESET,SCAN,KEYIN,KEY2
                                    4        EXTRN  BEGIN,SCANR,PARSE,MOD16,MWILE,COMMR,BEGKB,READK
                                    5        EXTRN  CLEAR,LENTH,AUDBL,DSPLY,REDON,DELAY,ERROR
                                    6 ;
                                  * 7 $INCLUDE (:F1:POMCOM)
                                  * 8 $NOLIST
                                  * 54 $LIST
                                    55       CSEG
                                    56 ;
                                    57 ;***********************************************
                                    58 ;     SYSTEM STARTUP PROCEDURE
                                    59 ;***********************************************
0000 F3                             60 RESET: DI              ; <DISABLE INTERRUPTS>
0001 31C000   S                     61        LXI   SP,STACK  ; STACK TOP
0004 3E0C                           62        MVI   A,DEFCS   ; DEFINE 8155 PORT CONFIGURATION
0006 D318                           63        OUT   CSR
0008 3EC0                           64        MVI   A,UMODE   ; FORMAT 8251 - MODE
000A D3AB                           65        OUT   LCTL
000C 3E37                           66        MVI   A,LCCMD   ; FORMAT 8251 - COMMAND
000E D3AB                           67        OUT   LCTL
0010 DB1A                           68        IN    PORTB     ; GET POMOAS UNIT ADDRESS
0012 0F                             69        RRC             ; SHIFT TO LOW ORDER BYTES
0013 E63F                           70        ANI   3FH       ; ASSURE 6-BIT VALIDITY
0015 32C000   E                     71        STA   PYADR     ; STORE IT
0018 CDC000   E                     72        CALL  CLEAR     ; CLEAR DISPLAY
001B AF                             73        XRA   A
001C 320000   E                     74        STA   BCAST     ; INITIALIZE HOST BROADCAST INDICATOR=0
001F 320000   E                     75        STA   OPSEQ     ; INITIALIZE OPERATOR SCAN SEQUENCE
0022 C3C000   E                     76        JMP   BEGIN
                                    77 ;
                                    78 ;
                                    79 $EJECT
                                    80 ;***********************************************
                                    81 ;     MAINLINE SCANNER PROCESSING ROUTINES
                                    82 ;***********************************************
                                    83 ;
0025 CDC000   E                     84 SCAN:  CALL  SCANR     ; INPUT SCANNER DATA, COMPENSATE FOR VELOCITY
0028 CDC000   E                     85        CALL  PARSE     ; PARSE SCANNED DATA, CONVERT TO HEX REPRESENTATION
002B CDC000   E                     86        CALL  MOD16     ; PERFORM MODULO-16 CHECK DIGIT TEST:
                                    87                        ; .. RETURN IF VALID SCAN, ELSE DISPLAY: "ERROR"
002E CDC000   E                     88        CALL  CLEAR     ; CLEAR DISPLAY
                                    89 ;
0031 CDCC00   E                     90 TRYLN: CALL  LENTH     ; PERFORM DATA LENGTH TEST:
                                    91                        ; .. RETURN IF VALID, ELSE DISPLAY: "ERROR"
0034 CDCC00   E                     92        CALL  AUDBL     ; SIGNAL OPERATOR: GOOD DATA
0037 CDCC00   E                     93        CALL  DSPLY     ; DISPLAY DATA FOR OPERATOR
003A CDC000   E                     94        CALL  MWILE     ; TEST FOR SPECIAL M. WILE FUNCTIONS
003D CDCC00   E                     95        CALL  REDON     ; TURN ON RED LED: "VALID DATA PENDING TRANSMISSION"
0040 3E01                           96        MVI   A,1
0042 320000   E                     97        STA   STBYT     ; STBYT = "HAVE DATA TO SEND"
0045 AF                             98        XRA   A
0046 320000   E                     99        STA   TRTYP     ; INITIALIZE TRANSMISSION-TYPE INDICATOR
0049 3E00                           100       MVI   A,MASK6
004B 30                             101       SIM             ; ALLOW ONLY HOST COMMUNICATIONS
004C C3C000   E                     102       JMP   COMMR     ; --> EXECUTE HOST COMMUNICATIONS ROUTINE
                                    103 ;
                                    104 ;
                                    105 $EJECT
```

```
                        106 ;***********************************************************
                        107 ;     MAINLINE KEYBOARD-ENTRY PROCESSING ROUTINES
                        108 ;***********************************************************
                        109 ;
004F 3AC000   E         110 KEYIN: LDA    KMCDE
0052 B7                 111        ORA    A              ; FIRST KB ENTRY?
0053 CA5700   C         112        JZ     KEY1           ; .. YES
0056 D1                 113        POP    D              ; .. NO: (CANCEL DELAY-CALL PUSH)
0057 D1                 114 KEY1:  POP    D              ; (CANCEL INTERRUPT PUSH)
0058 CDC000   E         115        CALL   REDON          ; TURN ON REC LED
005B CDC000   E         116        CALL   BEGKB          ; INITIALIZE KB TRANSACTION IF FIRST KEYED CHARACTER
005E CDC000   E         117        CALL   READK          ; READ KB CHARACTER, PROCESS SPECIAL CHARACTERS
0061 3AC000   E         118        LDA    KMCDE
0064 B7                 119        ORA    A              ; KMCDE=0: KB ENTRY FINISHED?
0065 CA3100   C         120        JZ     TRYLN          ; .. YES: TEST FOR VALID LENGTH
0068 CDCC00   E         121        CALL   DSPLY          ; .. NO: DISPLAY CURRENTLY KEYED CHARACTERS
006B 3E1B              122 KEY2:  MVI    A,MASK7        ; RESET KB INTERRUPT
006D 30                 123        SIM                   ; /AND ALLOW ONLY KB INTERRUPTS UNTIL EOF KB ENTRY
006E FB                 124        EI                    ; <ENABLE KB INTERRUPT>
                        125 ;
006F 0E0C              126 TIMAX: MVI    C,12           ; 10-SECOND MAXIMUM DELAY PERMITTED
0071 110000             127        LXI    D,0            ; /BETWEEN SUCCESSIVE KB ENTRIES
0074 CDCC00   E         128        CALL   DELAY          ; KB INTERRUPT SHOULD OCCUR BEFORE END OF DELAY
                        129                              ; .. RETURN IF TOO MUCH TIME AND... DISPLAY: "ERROR"
                        130 ;
                        131 ;      *** END ***
                        132 $EJECT
                          1        NAME   PDM1B
                          2 ;
                          3        PUBLIC ERROR,LENTH,CLEAR,DELAY,AUDBL,YELOW,SIGNL,REDON,REDOF
                          4        PUBLIC DSPLY,DSPTX,DSPT1
                          5        PUBLIC CLRDP,ERRDP,SONDP,SOFDP,SCODP,ENJDP,ONDP,OFFDP
                          6 ;
                          7        EXTRN  BEGIN,VALTH,DDREP
                          8 ;
                    =     9 $INCLUDE (:F1:PCMCOM)
                    =    10 $NOLIST
                    =    56 $LIST
                         57        CSEG
                         58 ;
                         59 ;***********************************************************
                         60 ;     DISPLAY "ERROR" AND BEGIN AGAIN
                         61 ;***********************************************************
                         62 ;
0000 218700   C          63 ERROR: LXI    H,ERRDP
0003 CD9900   C          64        CALL   DSPTX          ; DISPLAY: "ERROR"
0006 C3C000   E          65        JMP    BEGIN
                         66 ;
                         67 ;
                         68 ;
                         69 ;***********************************************************
                         70 ;     VERIFY VALID DATA LENGTH FOR SPECIFIED DATA-TYPE
                         71 ;***********************************************************
                         72 ;
0009 11CC00   E          73 LENTH: LXI    D,VALTH        ; POINTER: VALID DATA-LENGTHS BY DATA-TYPE
000C 3AC000   E          74        LDA    CTYPE          ; A = DATA-TYPE BYTE
000F 07                  75        RLC                   ; 2 BYTES/ARRAY ENTRY
0010 83                  76        ADD    E
0011 5F                  77        MOV    E,A
0012 1A                  78        LDAX   D              ; A = VALID LENGTH OF DATA +2
0013 3C                  79        INR    A
0014 3C                  80        INR    A
0015 BD                  81        CMP    L              ; EQUAL TO EOF BYTE ADDRESS?
0016 C8                  82        RZ                    ; .. YES
0017 C3C000   C          83        JMP    ERROR          ; .. NO: DISPLAY: "ERROR"
                         84 ;
                         85 ;
                         86 ;
                         87 ;***********************************************************
                         88 ;     CLEAR DISPLAY
                         89 ;***********************************************************
                         90 ;
001A E5                  91 CLEAR: PUSH   H              ; SAVE HL
001B 21AC00   C          92        LXI    H,CLRDP
001E CD9C00   C          93        CALL   DSPT1          ; BLANK DISPLAY
0021 E1                  94        POP    H              ; RESTORE HL
0022 C9                  95        RET
                         96 ;
                         97 ;
                         99 ;***********************************************************
                        100 ;     SOFTWARE DELAY ROUTINE
                        101 ;***********************************************************
                        102 ;
0023 1B                 103 DELAY: DCX    D              ; DE = INITIAL VALUE
0024 7A                 104        MOV    A,D
0025 B3                 105        ORA    E
0026 C22300   C         106        JNZ    DELAY
0029 0D                 107        DCR    C              ; C = LOOP COUNTER
002A C22300   C         108        JNZ    DELAY
002D C9                 109        RET
                        110 ;
                        111 ;
```

```
                    112 ;***************************************************
                    113 ;      SIGNAL OPERATOR AUDIBLY
                    114 ;***************************************************
                    115 ;
002E C5             116 AUDBL: PUSH   B              ; SAVE BC
002F 0602           117        MVI    B,02H          ; HORN BIT
0031 C33700    C    118        JMP    SIGNL
                    119 ;
                    120 ;***************************************************
                    121 ;      TURN ON YELLOW LED
                    122 ;***************************************************
                    123 ;
0034 C5             124 YELOW: PUSH   B              ; SAVE BC
0035 06C4           125        MVI    B,04H          ; YELLOW LED BIT
                    126 ;
0037 3AC000    E    127 SIGNL: LDA    REDST          ; PRESERVE RED LED STATUS
003A A8             128        XRA    B
003B D31B           129        OUT    PORTC          ; SET SIGNAL BIT
003D A8             130        XRA    B
003E D31B           131        OUT    PORTC          ; RESET SIGNAL BIT
0040 C1             132        POP    B              ; RESTORE BC
0041 C9             133        RET
                    134 ;
                    135 ;
                    136 ;***************************************************
                    137 ;      TURN ON RED LED
                    138 ;***************************************************
                    139 ;
0042 3E0E           140 REDON: MVI    A,0EH          ; RED LED  ON, YELLOW LED & HORN OFF
0044 C34900    C    141        JMP    RF1
                    142 ;
                    143 ;
                    144 ;***************************************************
                    145 ;      TURN OFF RED LED
                    146 ;***************************************************
                    147 ;
0047 3E06           148 REDOF: MVI    A,06H          ; RED LED OFF, YELLOW LED & HORN OFF
0049 320000    E    149 RF1:   STA    REDST          ; SET RED LED STATUS BYTE
004C D31B           150        OUT    PORTC
004E C9             151        RET
                    152 ;
                    153 $EJECT
                    154 ;***************************************************
                    155 ;   DISPLAY -DARAY- FIELD UNTIL EOF, FORMATTED ACCORDING TO DATA-TYPE
                    156 ;***************************************************
                    157 ;
004F 45             158 DSPLY: MOV    B,L            ; (HL = ADDRESS OF BYTE FOLLOWING DATA)
0050 05             159        DCR    B
0051 05             160        DCR    B              ; B = L-2 = # BYTES TO BE DISPLAYED
0052 C26300    C    161        JNZ    DS1            ; .. > 0 (DATA-TYPE BYTE)
0055 3AC000    E    162        LDA    KMCDE
0058 87             163        ORA    A              ; KB ENTRY?
0059 C8             164        RZ                    ; .. NO: ONLY DISPLAY DATA-TYPE BYTE FOR KB ENTRY
005A 3E91           165        MVI    A,DDISP+1
005C D368           166        OUT    KDCTL
005E 2B             167        DCX    H              ; DISPLAY KB-ENTERED DATA-TYPE
005F 04             168        INR    B              ; /AT LEFT SIDE OF DISPLAY
0060 C38200    C    169        JMP    DS3
                    170 ;
0063 60             171 DS1:   MOV    H,B            ; H = # DISPLAY POSITIONS REQUIRED
0064 110100    E    172        LXI    D,VALTH+1      ; POINTER DISPLAY-FORMAT BY DATA-TYPE
0067 3AC000    E    173        LDA    CTYPE          ; A = DATA-TYPE
006A 07             174        RLC                   ; 2 BYTES/TABLE ENTRY
006B 83             175        ADD    E
006C 5F             176        MOV    E,A
006D 1A             177        LDAX   D              ; A = POSITION OF '-' FROM RHS OF DISPLAY
006E 4F             178        MOV    C,A
006F 1B             179        DCX    D
0070 1A             180        LDAX   D              ; A = TOTAL LENGTH OF DISPLAYED DATA
0071 91             181        SUB    C
0072 4F             182        MOV    C,A            ; C = # DISPLAYED CHARACTERS BEFORE '-'
0073 B8             183        CMP    B              ; ENOUGH TO DISPLAY BEFORE '-' ?
0074 F27800    C    184        JP     DS2            ; .. NO
0077 24             185        INR    H              ; .. YES: LEAVE SPACE FOR '-'
0078 3E0A           186 DS2:   MVI    A,10
007A 94             187        SUB    H
007B F690           188        ORI    DDISP
007D D368           189        OUT    KDCTL          ; SET DISPLAY-RAM TO START POSITION
007F 210000    E    190        LXI    H,DATA         ; POINTER: DATA-VALUE ARRAY--BYPASS CHECK & DATA-TYPE DIGITS
                    191 ;
0082 7E             192 DS3:   MOV    A,M
0083 23             193        INX    H              ; NEXT DATA-VALUE BYTE
0084 11CC00    E    194        LXI    D,DDREP        ; TRANSLATE BINARY TO DISPLAY CHARACTER
0087 83             195        ADD    E
0088 5F             196        MOV    E,A
0089 1A             197        LDAX   D              ; A = DISPLAY REPRESENTATION OF DATA-VALUE CHARACTER
008A D348           198        OUT    KDATA          ; DISPLAY IT
008C 05             199        DCR    B              ; FINISHED?
008D C8             200        RZ                    ; .. YES
                    201 ;
008E 0D             202        DCR    C              ; DISPLAY POSITION FOR '-' ?
008F C28200    C    203        JNZ    DS3            ; .. NO
0092 3E20           204        MVI    A,20H
0094 D348           205        OUT    KDATA          ; .. YES: DISPLAY '-'
0096 C38200    C    206        JMP    DS3
                    207 ;
                    208 ;
```

```
                210 ;*********************************************************
                211 ;     DISPLAY TEXT ROUTINE WITH OPTIONAL ENTRY POINT TO CLEAR DISPLAY
                212 ;*********************************************************
                213 ;
0099 CD1A00  C  214 DSPTX: CALL   CLEAR       ; CLEAR DISPLAY
                215 ;
009C 3E90       216 DSPT1: MVI    A,DDISP
009E 86         217        ADD    M
009F D368       218        OUT    KDCTL       ; SET DISPLAY RAM TO STARTING POSITION
00A1 23         219        INX    H
00A2 46         220        MOV    B,M         ; B = CHARACTER COUNTER
00A3 23         221 DSPT2: INX    H           ; NEXT CHARACTER TO BE DISPLAYED
00A4 7E         222        MOV    A,M
00A5 D348       223        OUT    KDATA       ; DISPLAY IT
00A7 05         224        DCR    B           ; FINISHED?
00A8 C2A300  C  225        JNZ    DSPT2       ; .. NOT YET
00AB C9         226        RET                ; .. YES
                227 ;
                228 ;
                229 ;*********************************************************
                230 ;     TEXT DISPLAY FORMATS
                231 ;*********************************************************
                232 ;
00AC 01         233 CLRDP: DB     1,9         ; START=1, LENGTH=9
00AD 09
00AE 00         234        DB     0,0,0,0     ; DISPLAY: -BLANKS-
00AF 00
00B0 00
00B1 00
00B2 00         235        DB     0,0,0,0
00B3 00
00B4 00
00B5 00
00B6 00         236        DB     0
                237 ;
00B7 05         238 ERRDP: DB     5,5         ; START=5, LENGTH=5
00B8 05
00B9 8C         239        DB     08CH,28H    ; DISPLAY: "ERROR"
00BA 28
00BB 28         240        DB     28H,39H,28H
00BC 39
00BD 28
                241 ;
                242 $EJECT
00BE 03         243 SONDP: DB     3,7         ; START=3, LENGTH=7
00BF 07
00C0 85         244        DB     085H,88H    ; DISPLAY: "SIGN ON"
00C1 88
00C2 9D         245        DB     9DH,0CDH,0
00C3 CD
00C4 00
00C5 CD         246        DB     0DDH,0CDH
00C6 CD
                247 ;
00C7 02         248 SOFDP: DB     2,8         ; START=2, LENGTH=8
00C8 08
00C9 85         249        DB     085H,88H    ; DISPLAY: "SIGN OFF"
00CA 88
00CB 9D         250        DB     9DH,0CDH,0
00CC C0
00CD 00
00CE DD         251        DB     0DDH,0ACH,0ACH
00CF AC
00D0 AC
                252 ;
00D1 02         253 SCODP: DB     2,8         ; START=2, LENGTH=8
00D2 08
00D3 85         254        DB     085H,9CH    ; DISPLAY: "SCAN OPN"
00D4 9C
00D5 ED         255        DB     0EDH,0CDH,0
00D6 CD
00D7 00
00D8 DD         256        DB     0DDH,0ECH,0C0H
00D9 EC
00DA C0
                257 ;
00DB 03         258 ENJDP: DB     3,7         ; START=3, LENGTH=7
00DC 07
00DD BC         259        DB     0BCH,29H    ; DISPLAY: "END JOB"
00DE 29
00DF 79         260        DB     79H,0
00E0 00
00E1 59         261        DB     59H,39H,089H
00E2 39
00E3 89
                262 ;
00E4 01         263 ONDP:  DB     1,4         ; START=1, LENGTH=4
00E5 04
00E6 DD         264        DB     0DDH,0CDH   ; DISPLAY: "ON--" XXXXX
00E7 CD
00E8 20         265        DB     20H,20H
00E9 20
                266 ;
00EA 01         267 OFFDP: DB     1,4         ; START=1, LENGTH=4
00EB 04
00EC DD         268        DB     0DDH,0ACH   ; DISPLAY: "OFF-" XXXXX
00ED AC
00EE AC         269        DB     0ACH,20H
00EF 20
                270 ;
                271 ;     *** END ***
                272 $EJECT
```

For the modification illustrated in FIG. 15, using a bar code scanner, the portion of the foregoing program designated POM2 is modified as follows:

```
              1.           NAME    POM2
              2 ;
              3            PUBLIC  SCANR,PARSE,MOD16
              4            EXTRN   ERROR
              5 ;
           *  6 $INCLUDE(:F1:POMCOM)
           *  7 $NOLIST
           * 53 $LIST
             54 ;
             55            CSEG
             56 ;
             57 ;*****************************************************
             58 ;        INPUT SCANNED DATA, COMPENSATE FOR VELOCITY
             59 ;*****************************************************
             60 ;
0000 0E01    61 SCANR:  MVI   C,1           ; INITIALIZE READ F/F: 1->C
             62                              ;   (PUNCH=0 GAP=1)
0002 1608    63         MVI   D,8           ; INITIALIZE SCAN DELAY COUNTER
0004 21FFFF E 64         LXI   H,SAMPL-1     ; POINTER: READ-SAMPLE ARRAY
0007 3E0F    65         MVI   A,0FH
0009 320000 E 66         STA   FWBW          ; INITIALIZE FWD/BWD SCAN INDICATOR=0F
             67 ;
000C 23      68 SCAN0:  INX   H             ; NEXT READ-SAMPLE ARRAY CELL
000D 7D      69         MOV   A,L
000E FE00  E 70         CPI   LOW HOSTM     ; DID SCAN OVERRUN READ-SAMPLE ARRAY?
0010 CA0000 E 71         JZ    ERROR         ; .. YES: DISPLAY: "ERROR"
0013 3600    72         MVI   M,0           ; .. NO: INITIALIZE NEXT READ SAMPLE COUNT
0015 34      73 SCANS:  INR   M             ; INCREMENT READ-SAMPLE COUNT
0016 42      74         MOV   B,D           ; > B=INITIAL OR VELOCITY-COMPENSATED DELAY FACTOR
0017 C5      75 SC1:    PUSH  B             ; >>
0018 C1      76         POP   B             ; >>> SHORT DELAY BETWEEN SCANS
0019 05      77         DCR   B             ; >>
001A C21700 C 78         JNZ   SC1           ; >
001D DB1A    79 SC2:    IN    PORTB         ; READ SCANNER
001F E601    80         ANI   1
0021 B9      81         CMP   C             ; CHANGED SCAN STATE?
0022 CA4700 C 82         JZ    SAME          ; .. NO
             83 ;
0025 4F      84 DIFF:   MOV   C,A           ; NEW READ STATE->READ F/F
0026 3E11    85         MVI   A,11H         ; LO-ORDER 1'ST BYTE OF READ-SAMPLE ADDRESS
0028 BD      86         CMP   L             ; FIRST PUNCH READ SAMPLE?
0029 C20C00 C 87         JNZ   SCAN0         ; .. NO
002C 1640    88         MVI   D,40H         ; INITIALIZE DELAY COUNTER FOR SHIFTS
002E 7E      89 DF1:    MOV   A,M
002F 17      90         RAL                 ; READ-SAMPLE OVERFLOW ON SHIFT?
0030 DA3A00 C 91         JC    DF2           ; .. YES: FOUND MOST SIGNIFICANT BIT
0033 77      92         MOV   M,A           ; STORE SHIFTED PATTERN
0034 7A      93         MOV   A,D
0035 1F      94         RAR                 ; SHIFT DELAY COUNTER CORRESPONDINGLY
0036 57      95         MOV   D,A           ;
0037 C32E00 C 96         JMP   DF1           ; AGAIN
             97 ;
003A 7E      98 DF2:    MOV   A,M           ; SHIFT READ-SAMPLE BACK TO
003B E6F8    99         ANI   0F8H          ; /NORMALIZED POSITION
003D 1F     100         RAR
003E 1F     101         RAR
003F 1F     102         RAR
0040 77     103         MOV   M,A           ; /AND STORE IT
0041 23     104         INX   H             ; NEXT READ-SAMPLE ARRAY CELL
0042 3601   105         MVI   M,1           ; INITIALIZE IT
0044 C31D00 C 106        JMP   SC2           ; NEXT READ
            107 ;
0047 7E     108 SAME:   MOV   A,M           ; LOAD READ-SAMPLE COUNT
0048 B1     109         ORA   C
0049 A9     110         XRA   C             ; TEST FOR PUNCH &
004A 3C     111         INR   A             ; /MAXIMUM READ-SAMPLE COUNT=255
004B C21500 C 112        JNZ   SCANS         ; .. NO: RESCAN
004E 2B     113         DCX   H             ; POINTER=SPACE FOLLOWING LAST VALID PUNCH
004F 7D     114         MOV   A,L
0050 FE10 E 115         CPI   LOW SAMPL+16  ; DID SCAN UNDERRUN READ-SAMPLE ARRAY?
0052 FA0000 E 116        JM    ERROR         ; .. YES: DISPLAY: "ERROR"
0055 36FF   117         MVI   M,0FFH        ; MARK END-OF-SCAN = FF
0057 C9     118         RET
            119 ;
            120 ;
            121 $EJECT
            122 ;*****************************************************
            123 ;       PARSE SCANNED DATA, CONVERT TO HEX REPRESENTATION
            124 ;*****************************************************
            125 ;
0058 210100 E 126 PARSE:  LXI   H,SAMPL+1     ; POINTER: READ-SAMPLE ARRAY
005B 7E     127         MOV   A,M           ; PUNCH(1) SAMPLE COUNT
005C 4E     128         MOV   C,M           ; SAVE IN C
005D 23     129         INX   H             ; SPACE(1)
005E BE     130         CMP   M             ; SPACE(1) < PUNCH(1)?
005F FA7000 C 131        JM    BSCAN         ; .. NO: BWD SCAN
            132 ;
            133                              ;****************************
            134                              ; FORWARD SCAN
            135                              ;****************************
0062 46     136 FSCAN:  MOV   B,M           ; B = GAP = SPACE(1) SAMPLE COUNT
0063 110000 E 137        LXI   D,DARAY       ; POINTER: DATA-VALUE ARRAY BEGINNING
0066 AF     138         XRA   A             ; INDICATE FWD SCAN = 0
0067 320000 E 139        STA   FWBW
006A 3E08   140         MVI   A,08H         ; INITIAL BIT-PATTERN FLAG - FWD
006C 12     141         STAX  D             ; STORE IN DATA-VALUE ARRAY
006D C38300 C 142        JMP   NEXTP
            143 ;
            144                              ;****************************
            145                              ; BACKWARD SCAN
            146                              ;****************************
0070 7E     147 BSCAN:  MOV   A,M           ; PUNCH(1) + 2 GAPS
0071 91     148         SUB   C             ;           2 GAPS
0072 1F     149         RAR                 ;           1 GAP
0073 47     150         MOV   B,A           ; B = COMPUTED GAP SAMPLE COUNT
0074 110F00 E 151        LXI   D,DARAY+15    ; POINTER: DATA-VALUE ARRAY END
```

```
0077 3EFF            152         MVI    A,0FFH    ; MARK END-OF-DATA
0079 12              153         STAX   D         ; FIRST DATA BYTE
007A 1B              154         DCX    D
007B 3E01            155         MVI    A,1       ; INDICATE BWD SCAN = 1
007D 320000  E       156         STA    FWBW
0080 3E10            157         MVI    A,10H     ; INITIAL BIT-PATTERN FLAG - BWD
0082 12              158         STAX   D         ; STORE IN DATA-VALUE ARRAY
                     159 ;
0083 23              160 NEXTP: INX    H         ; PUNCH(I) SAMPLE COUNT
0084 7E              161         MOV    A,M
0085 80              162         ADD    B
0086 4F              163         MOV    C,A       ; C=PUNCH(I) + SPACE(I)
0087 AF              164         XRA    A         ; CARRY = 0
0088 CDAE00  C       165         CALL   PUTO      ; FORMAT 0-BIT
008B 23              166         INX    H         ; SPACE(I)
008C 3EFF            167         MVI    A,0FFH
008E BE              168         CMP    M         ; END OF SCAN?
008F CAD600  C       169         JZ     BACK?     ; .. YES
                     170 ;
0092 7E              171         MOV    A,M       ; A = SPACE(I) SAMPLE COUNT
0093 90              172         SUB    B         ; REDUCE BY COMPUTED GAP
0094 DA9800  C       173         JC     SINGL     ; WENT MINUS: CLEARLY A SINGLE SPACE
0097 B8              174         CMP    B         ; POSITIVE: WITHIN SINGLE-SPACE TOLERANCE?
0098 D29F00  C       175         JNC    SEVRL     ; .. NO: ANALYSE SAMPLE WIDTH
                     176 ;
                     177                          ;*********************************
                     178                          ; SINGLE-SPACE ROUTINE
                     179                          ;*********************************
009B 46              180 SINGL: MOV    B,M       ; UPDATE B = SINGLE SPACE(I)
009C C38300  C       181         JMP    NEXTP     ; DONE: ANALYSE NEXT READ SAMPLE
                     182 ;
                     183                          ;*********************************
                     184                          ; SEVERAL-SPACE ROUTINE
                     185                          ;*********************************
009F 91              186 SEVRL: SUB    C         ; REDUCE RESIDUE BY PUNCH(I) + SPACE(I)
00A0 D2A700  C       187         JNC    PUT1      ; CLEARLY A NON-PUNCH = 1-BIT
00A3 80              188         ADD    B         ; WITHIN SINGLE-SPACE TOLERANCE?
00A4 D28300  C       189         JNC    NEXTP     ; .. NO: DONE: ANALYZE NEXT READ SAMPLE
                     190                          ; .. YES: FINAL NON-PUNCH = 1-BIT
00A7 37              191 PUT1:  STC              ; CARRY=1
00A8 CDAE00  C       192         CALL   PFWBW
00AB C39F00  C       193         JMP    SEVRL     ; TEST FOR ANY MORE 1'S
                     194 ;
                     195 PUTO:                    ; CARRY=0
                     196 ;
00AE F5              197 PFWBW: PUSH   PSW       ; SAVE A
00AF F5              198         PUSH   PSW       ; SAVE CARRY-BIT
00B0 3A0000  E       199         LDA    FWBW      ; TEST FWD/BWD SCAN INDICATOR:
00B3 B7              200         ORA    A
00B4 C2C400  C       201         JNZ    BWARD     ; BACKWARD MODE = 1
                     202 ;
                     203 $EJECT
                     204                          ;*********************************
                     205                          ; CONSTRUCT PARSED BIT PATTERN FOR FORWARD SCAN
                     206                          ;*********************************
00B7 F1              207 FWARD: POP    PSW       ; RESTORE CARRY-BIT
00B8 1A              208         LDAX   D         ; LOAD PARTIAL BIT PATTERN
00B9 17              209         RAL              ; SHIFT IN:  0 OR 1 CARRY BIT
                     210                          ; SHIFT OUT: BIT PATTERN FLAG = 1?
00BA D2D300  C       211         JNC    PT1       ; .. NO:  BYTE NOT COMPLETELY FORMATTED
00BD 12              212         STAX   D         ; .. YES: BYTE COMPLETED
00BE 13              213         INX    D         ; NEXT DATA-VALUE BYTE
00BF 3E10            214         MVI    A,10H     ; BIT PATTERN FLAG = 4 BITS/BYTE (FWD)
00C1 C3D300  C       215         JMP    PT1
                     216 ;
                     217                          ;*********************************
                     218                          ; CONSTRUCT PARSED BIT PATTERN FOR BACKWARD SCAN
                     219                          ;*********************************
00C4 F1              220 BWARD: POP    PSW       ; RESTORE CARRY-BIT
00C5 1A              221         LDAX   D         ; LOAD PARTIAL BIT PATTERN
00C6 1F              222         RAR              ; SHIFT IN:  0 OR 1 CARRY BIT
                     223                          ; SHIFT OUT: BIT PATTERN FLAG = 1?
00C7 D2D300  C       224         JNC    PT1       ; .. NO:  BYTE NOT COMPLETELY FORMATTED
00CA B7              225         ORA    A         ; .. YES: BYTE COMPLETED -- CLEAR CARRY
00CB 1F              226         RAR
00CC 1F              227         RAR
00CD 1F              228         RAR
00CE 1F              229         RAR              ; SHIFT RIGHT 4 BITS
00CF 12              230         STAX   D         ; STORE COMPLETED BIT PATTERN
00D0 1B              231         DCX    D         ; PREV DATA-VALUE BYTE
00D1 3E08            232         MVI    A,08H     ; BIT PATTERN FLAG = 4 BITS/BYTE (BWD)
                     233 ;
00D3 12              234 PT1:   STAX   D         ; STORE IN DATA-VALUE ARRAY
00D4 F1              235         POP    PSW       ; RESTORE A
00D5 C9              236         RET
                     237 ;
00D6 12              238 BACK?: STAX   D         ; MARK END-OF-DATA = FF
00D7 3A0000  E       239         LDA    FWBW
00DA B7              240         ORA    A         ; BACKWARD SCAN?
00DB C8              241         RZ               ; .. NO: SHIFTING UNNECESSARY
                     242 ;
00DC EB              243 SHIFT: XCHG             ; HL = POINTER: START OF DATA
00DD 110000  E       244         LXI    D,DARAY   ; DE = POINTER: DATA-VALUE ARRAY
00E0 23              245 SH1:   INX    H         ; NEXT HI VALUE ADDRESS
00E1 7E              246         MOV    A,M
00E2 12              247         STAX   D         ; SHIFT BYTE ALONG DATA-VALUE ARRAY
00E3 FEFF            248         CPI    0FFH      ; FINISHED?
00E5 C8              249         RZ               ; .. YES
00E6 13              250         INX    D         ; NEXT LO-VALUE ADDRESS
00E7 C3E000  C       251         JMP    SH1
                     252 ;
                     253 ;
                     254 $EJECT
```

```
                    1           NAME    POM3
                    2  ;
                    3           PUBLIC  BEGKB,READK
                    4           EXTRN   CLEAR,DELAY,ERROR,KBREP,VALTH
                    5  ;
                =   6  $INCLUDE(:F1:PCMCCM)
                =   7  $NOLIST
                =  53  $LIST
                   54  ;
                   55           CSEG
                   56  ;
                   57  ;*********************************************************
                   58  ;       INITIALIZE KB TRANSACTION IF FIRST KEYED CHARACTER
                   59  ;*********************************************************
                   60  ;
0000 3AC000    E   61  BEGKB:   LDA     KMCDE
0003 B7            62           ORA     A               ; KMCDE = 0?
0004 C0            63           RNZ                     ; .. NO: ALREADY KB TRANSACTION
0005 3C            64           INR     A
0006 320C00    E   65           STA     KMCDE           ; ..YES: KMODE=1: BEGIN KB TRANSACTION
0009 210000    E   66           LXI     H,DTYPE         ; POINTER: DATA-VALUE ARRAY--SKIPPING CHECK DIGIT
000C CDC000    E   67           CALL    CLEAR           ; CLEAR DISPLAY
000F C9            68           RET
                   69  ;
                   70  ;
                   71  $EJECT
                   72  ;*********************************************************
                   73  ;       READ KEYED ENTRY, TEST FOR SPECIFIC CHARACTERS
                   74  ;*********************************************************
                   75  ;
0010 DB48          76  READK:   IN      KDATA           ; KB -> B
0012 47            77           MOV     B,A
0013 3EC2          78  RD1:     MVI     A,KKCLR         ; CLEAR KB
0015 D368          79           OUT     KDCTL
0017 0E01          80           MVI     C,1             ; EXECUTE: SINGLE
0019 110010        81           LXI     D,1000H         ;         / SHORT
001C CDC000    E   82           CALL    DELAY           ;         / DEBOUNCE DELAY
001F DB68          83           IN      KDCTL
0021 E60F          84           ANI     0FH             ; CLEARED?
0023 C21300    C   85           JNZ     RD1             ; .. NOT YET
0026 78            86           MOV     A,B             ; REDUCE TO KB REPRESENTATION
0027 0F            87           RRC
0028 E60C          88           ANI     0CH             ; BITS 3,2
002A 4F            89           MOV     C,A
002B 78            90           MOV     A,B
002C E603          91           ANI     03H             ; BITS 1,0
002E B1            92           ORA     C               ; KB REP -> BINARY
002F 110000    E   93           LXI     D,KBREP
0032 83            94           ADD     E
0033 5F            95           MOV     E,A             ; OFFSET INTO KBREP
0034 1A            96           LDAX    D               ; LOAD BINARY KB REP
                   97  ;
                   98  $EJECT
                   99  ;*********************************************************
                  100  ;       TEST KB ENTRY FOR ERROR CONDITIONS
                  101  ;*********************************************************
                  102  ;
0035 FE0E         103           CPI     0EH             ; ERROR-CHARACTER 'E' KEYED?
0037 CAC000    E  104           JZ      ERROR           ; .. YES -- DISPLAY: "ERROR"
003A F25F00    C  105           JP      EOFKB           ; .. NO: JUMP IF EOF-CHARACTER 'F' KEYED
                  106  ;
003D 77           107           MOV     M,A             ; STORE KEYED ENTRY (0-D) IN DATA-VALUE BYTE
003E 7D           108           MOV     A,L
003F FE01         109           CPI     1               ; KB ENTRY = DATA-TYPE CHARACTER?
0041 C25500    C  110           JNZ     MAXKB           ; .. NO
0044 7E           111           MOV     A,M             ; A = DATA-TYPE
0045 FE04         112           CPI     4               ; DATA-TYPE < 4? (0-3: PROTECTED FROM KB ENTRY)
0047 FAC000    E  113           JM      ERROR           ; .. YES -- DISPLAY: "ERROR"
                  114  ;
004A 11C000    E  115           LXI     D,VALTH         ; TEST FOR DEFINED DATA-TYPE ENTRY:
004D 07           116           RLC                     ; 2 BYTES/ARRAY ENTRY
004E 83           117           ADD     E               ; COMPUTE OFFSET INTO VALID DATA-TYPE TABLE
004F 5F           118           MOV     E,A
0050 1A           119           LDAX    D
0051 B7           120           ORA     A               ; LENGTH DEFINED FOR DATA-TYPE?
0052 CAC000    E  121           JZ      ERROR           ; .. NO -- DISPLAY: "ERROR"
                  122  ;
0055 7D           123  MAXKB:   MOV     A,L             ; TEST FOR MAXIMUM KB ENTRIES:
0056 FE0A         124           CPI     10              ; > LAST VALID DATA-VALUE BYTE?
0058 CAC000    E  125           JZ      ERROR           ; .. YES -- DISPLAY: "ERROR"
                  126  ;
                  127                                   ;**********************************
                  128                                   ; END OF KB VALIDITY TESTS
                  129                                   ;**********************************
                  130  ;
005B 23           131           INX     H               ; NEXT DATA-VALUE BYTE
005C 36FF         132           MVI     M,0FFH          ; MARK CURRENT EOF
005E C9           133           RET
                  134  ;
005F AF           135  EOFKB:   XRA     A
0060 32C000    E  136           STA     KMCDE           ; EOF: RESET KMCDE: NOTHING PENDING
0063 C9           137           RET
                  138  ;
                  139  ;        *** END ***
                  140  $EJECT
                    1           NAME    PCM4A
                    2  ;
                    3           PUBLIC  COMMR,CCMM1
                    4           EXTRN   MTEXT,CORDY,XMITM,BEGIN,YELOW,RJCT,URJT,MESS,MAVL
                    5  ;
                =   6  $INCLUDE(:F1:PCMCCM)
                =   7  $NOLIST
                =  53  $LIST
                   54  ;
                   55           CSEG
                   56  ;
```

```
      57 ;*********************************************************
      58 ;     HOST COMMUNICATION HANDLER AND ROUTINES
      59 ;*********************************************************
      60 ;
      61 ;
0000 AF           62 READU: XRA   A            ; RESET CARRY
0001 FB           63        EI                 ; <ALLOW USART INTERRUPTS>
0002 7F           64 RU1:   MOV   A,A          ; >>
0003 7F           65        MOV   A,A          ; >> DID USART INTERRUPT OCCUR? (CARRY SET?)
0004 020200  C   66        JNC   RU1          ; .. NC: WAIT FOR INTERRUPT
0007 C9           67        RET                ; ... RETURN TO CALLING ROUTINE
      68 ;
      69 ;
      70 ;
      71 ;
      72 ;
0008 CDCC00  C   73 COMMR: CALL  READU        ; READ CHARACTER FROM HOST
      74 ;
000B 3ECC         75 COMM1: MVI   A,0C0H
000D A0           76        ANA   B
000E CA0000  E   77        JZ    HTEXT        ; .. NC: PROCESS HOST TEXT
0011 F21A00  C   78        JP    TWOBY        ; ..YES: 2-BYTE MESSAGE FORMAT WHEN HI-ORDER-BIT = 0
      79 ;
0014 4F           80 ONEBY: MOV   C,A          ; C= 1-BYTE MESSAGE PREFIX
0015 A8           81        XRA   B
0016 47           82        MOV   B,A          ; B=UNIT ADDRESS PORTION OF 1-BYTE MESSAGE
0017 C31E00  C   83        JMP   CM1
      84 ;
001A 48           85 TWOBY: MOV   C,B          ; C= 2-BYTE MESSAGE CHARACTER
001B CD0000  C   86        CALL  READU        ; B= UNIT ADDRESS
      87 ;
001E 58           88 CM1:   MOV   E,B          ; CHECKSUM ACCUMULATOR -- FOR HOST-TO-UNIT MESSAGES
001F 3ACC00  E   89        LDA   MYADR
0022 B8           90        CMP   B            ; SPECIFIC MESSAGE FOR ME?
0023 CA2C00  C   91        JZ    YELED        ; .. YES
0026 3E3F         92        MVI   A,3FH
0028 B8           93        CMP   B            ; BROADCAST MESSAGE FOR EVERYONE?
0029 C2CC00  E   94        JNZ   CDRDY        ; .. NO: NOT MY MESSAGE
      95 ;
002C CDC000  E   96 YELED: CALL  YELOW        ; TURN ON YELLOW LED
      97 ;
      99 ;*********************************************************
     100 ;     HOST-TO-UNIT MESSAGE HANDLING ROUTINES
     101 ;*********************************************************
     102 ;
002F 79          103        MOV   A,C          ; A = HOST MESSAGE CHARACTER
0030 FEC0        104        CPI   PCLLC
0032 CA6C00  C  105        JZ    PCLL         ; PCLL - NORMAL POLL
0035 FE80        106        CPI   STRTC
0037 CA7200  C  107        JZ    STRT         ; STRT - START TRANSMITTING UNIT MESSAGE
003A FE41        108        CPI   MACKC
003C CA8000  C  109        JZ    MACK         ; MACK - HOST ACKNOWLEDGEMENT OF PROPERLY RECEIVED UNIT MESSAGE
003F FE52        110        CPI   MRJTC
0041 CA8700  C  111        JZ    MRJT         ; MRJT - HOST REJECTION OF GARBLED UNIT MESSAGE
0044 FE50        112        CPI   MPNDC
0046 CA8A00  C  113        JZ    MPND         ; MPND - HOST MESSAGE PENDING FOR UNIT
0049 FE42        114        CPI   MBEGC
004B CA9700  C  115        JZ    MBEG         ; MBEG - HOST MESSAGE TRANSMISSION BEGINNING
004E FE4E        116        CPI   CSTNC
0050 CAEF00  C  117        JZ    BCST         ; CSTN - HOST BROADCAST: NO RESPONSE REQUIRED
0053 FE59        118        CPI   CSTYC
0055 CAEF00  C  119        JZ    BCST         ; CSTY - HOST BROADCAST: RESPONSE REQUIRED NEXT POLL
0058 FE51        120        CPI   CUITC
005A CAC500  C  121        JZ    CUIT         ; QUIT - NO UNIT MESSAGE UNTIL SPECIFICALLY POLLED
005D C3CC00  E  122        JMP   LRJT         ; ERROR: SOME NON-DEFINED HOST MESSAGE
     123 ;
     124 ;
     125 SEJECT
0060 3A0000  E  126 PCLL:  LDA   STBYT
0063 B7          127        ORA   A            ; STATUS-BYTE = 0 ?
0064 CACC00  E  128        JZ    RJCT         ; ..YES: SEND REJECT RESPONSE: "NO MESSAGE FOR HOST"
0067 E630        129        ANI   30H          ; HOST TRANSMISSION SEQUENCE IN PROGRESS?
0069 C2C000  E  130        JNZ   LRJT         ; .. YES: ERROR RESPONSE
006C CDC000  E  131        CALL  MESS         ; .. NC: INFORM HOST: "MESSAGE AVAILABLE"
006F C3C800  C  132        JMP   CCMMR        ; AWAIT HOST RESPONSE
     133 ;
0072 3ACC00  E  134 STRT:  LDA   STBYT
0075 E6C2        135        ANI   2            ; STATUS-BYTE = 2 ?
0077 CACC00  E  136        JZ    LRJT         ; .. NC: ERROR RESPONSE
007A CCCC00  E  137        CALL  XMITM        ; ..YES: SEND MESSAGE TO HOST
007D C30800  C  138        JMP   CCMMR        ; AWAIT HOST RESPONSE
     139 ;
0080 AF          140 MACK:  XRA   A
0081 32CC00  E  141        STA   BCAST        ; RESET BROADCAST INDICATOR
0084 C3C000  E  142        JMP   BEGIN        ; DIALOGUE FINISHED--(RESET STATUS-BYTE=0)
     143 ;
0087 C30800  C  144 MRJT:  JMP   CCMMR        ; PRESERVE STATUS-BYTE = 2 AND AWAIT RETRANSMISSION
     145 ;
008A 3AC000  E  146 MPND:  LDA   STBYT
008D B7          147        ORA   A            ; STATUS-BYTE = 0 ?
008E C2CC00  E  148        JNZ   LRJT         ; .. NO: ERROR RESPONSE
0091 CDC000  E  149        CALL  MAVL         ; ..YES: INFORM HOST THAT UNIT AVAILABLE TO RECEIVE MESSAGE
0094 C30800  C  150        JMP   CCMMR
     151 ;
0097 3A0000  E  152 MBEG:  LDA   STBYT
009A E610        153        ANI   10H          ; STATUS-BYTE = 10H ?
009C CAC000  E  154        JZ    LRJT         ; .. NO: ERROR RESPONSE
009F 21C000  E  155 MBG0:  LXI   H,HOSTM      ; POINTER: HOST-MESSAGE AREA
00A2 CCC000  C  156        CALL  READL        ; B = LENGTH/FORMAT BYTE
00A5 AB          157        XRA   E
00A6 5F          158        MOV   E,A          ; BUILD UP CHECKSUM
00A7 3E20        159        MVI   A,20H
00A9 32C000  E  160        STA   STBYT        ; STATUS-BYTE = 20H: HOST TRANSMISSION IN PROGRESS
00AC AC          161        ANA   B            ; NORMAL DATA COMING?
00AD C2A400  C  162        JNZ   MBG1         ; .. NC: SYSTEM TRANSMISSION
00B0 77          163        MOV   M,A          ; ..YES: TRANSMISSION-TYPE = NORMAL = 0
00B1 C3A000  C  164        JMP   MBG2
```

```
                      165 ;
0084 70               166 MBG1:   MOV    M,B          ; TRANSMISSION-TYPE = SYSTEM = FORMAT CHARACTER1
0085 CDC000   C       167         CALL   READU        ; B = DATA-LENGTH OF HOST TRANSMISSION
0088 AB               168         XRA    E
0089 5F               169         MOV    E,A          ; BUILD UP CHECKSUM
008A 04               170 MBG2:   INR    B
008B 48               171         MOV    C,B          ; C = COUNTER: DATA-LENGTH + 1
008C C30800   C       172         JMP    CCMMR        ; AWAIT NEXT HOST TRANSMISSION
                      173 ;
008F 32CC00   E       174 BCST:   STA    BCAST        ; SET BROADCAST-MESSAGE INDICATOR = CSTN/CSTY
00C2 C39F00   C       175         JMP    MBG0
                      176 ;
00C5 C3CC00   E       177 QLIT:   JMP    BEGIN        ; *** QUIT ROUTINE ***
                      178 ;
                      179 ;      *** END ***
                      180 $EJECT
                        1         NAME   POM4B
                        2 ;
                        3         PUBLIC HTEXT,XMITM,MESS,MAVL,RJCT,URJT
                        4         EXTRN  CORDY,COMMR,BEGIN,AUDBL,CLEAR,DSPLY,DSPTX,SONDP
                        5         EXTRN  START,SYSTR,XMIT,WRITC,WRITK,CAST
                        6 ;
                   -    7 $INCLUDE(:F1:POMCOM)
                   -    8 $NOLIST
                   -   54 $LIST
                       55 ;
                       56         CSEG
                       57 ;
                       58 ;**********************************************************
                       59 ;       TEST FOR, AND PROCESS, HOST TEXT
                       60 ;**********************************************************
                       61 ;
0000 3A0000   E        62 HTEXT:  LDA    STBYT        ; (HL ORIGINALLY SET TO HOSTM IN MBEG)
0003 E620              63         ANI    20H          ; HOST TRANSMISSION IN PROGRESS?
0005 CA0000   E        64         JZ     CORDY        ; .. NO: HOST TEXT NOT FOR ME
0008 23                65         INX    H
0009 70                66         MOV    M,B          ; ..YES: STORE DATA IN NEXT HOST-MESSAGE BYTE
000A 78                67         MOV    A,B
000B AB                68         XRA    E
000C 5F                69         MOV    E,A          ; BUILD UP CHECKSUM
000D 0D                70         DCR    C            ; END-OF-MESSAGE?
000E C20000   E        71         JNZ    COMMR        ; ..NOT YET
0011 36FF             72         MVI    M,0FFH       ; ..YES: MARK EOM
0013 B7               73         ORA    A            ; VALID CHECKSUM?
0014 C20F00   C       74         JNZ    URJT         ; .. NO: REJECT HOST MESSAGE
0017 CDC200   C       75         CALL   UACK         ; ..YES: ACKNOWLEDGE VALID RECEIPT OF MESSAGE
                     76 ;
                     77 ;
                     78 $EJECT
                     79 ;**********************************************************
                     80 ;       PARSE HOST MESSAGE TO DETERMINE PROPER DISPOSITION/RESPONSE
                     81 ;**********************************************************
                     82 ;
001A 110000   E      83         LXI    D,HOSTM       ; POINTER: HOST-MESSAGE AREA
001D 1A             84         LDAX   D
001E B7             85         ORA    A
001F CA4300   C     86         JZ     NORMH         ; TRANSMISSION-TYPE = NORMAL?
0022 FE20           87         CPI    NORMC         ; .. YES
0024 CA4600   C     88         JZ     SILNT         ; .. NO: FORMAT-CHARACTER = NORMAL DATA -- NO HORN?
0027 FE2F           89         CPI    TEXTC         ; .. YES
0029 CA5B00   C     90         JZ     TXTDP         ; .. NO: FORMAT-CHARACTER = TEXT-DISPLAY COMMAND?
002C 3A0000   E     91         LDA    BCAST         ; .. YES
002F B7             92         ORA    A             ; BROADCAST MESSAGE?
0030 CA3B00   C     93         JZ     OTHER         ; .. NO
0033 3E01           94         MVI    A,1
0035 320000   E     95         STA    STBYT         ; ..YES: STATUS-BYTE=01
0038 C30000   E     96         JMP    COMMR         ; RESPOND TO HOST NEXT POLL
                   97 ;
003B 3E02           98 OTHER:  MVI    A,2           ; PROCESS OTHER SYSTEM REQUESTS
003D 320000   E     99         STA    STBYT         ; STATUS-BYTE = 02 (AWAITING -POLL- OR -STRT- FROM HOST)
0040 C30000   E    100         JMP    COMMR         ; AWAIT HOST POLL
                  101 ;
                  102 ;
0043 CD0000   E   103 NORMH:  CALL   AUDBL         ; NORMAL DATA TRANSMISSION -- SIGNAL OPERATOR
0046 210000   E   104 SILNT:  LXI    H,DARAY       ; POINTER: DATA-VALUE ARRAY
0049 13          105 SIL1:   INX    D
004A 23          106         INX    H
004B 1A          107         LDAX   D
004C 77          108         MOV    M,A           ; MOVE DATA FROM HOST-MESSAGE AREA TO DATA-VALUE ARRAY
004D FEFF        109         CPI    0FFH          ; EOM?
004F C24900   C  110         JNZ    SIL1          ; .. NOT YET
                 111                              ; ..YES: (HL=ADDRESS OF EOM BYTE FOR DSPLY ROUTINE)
0052 CD0000   E  112         CALL   CLEAR         ; CLEAR DISPLAY
0055 CD0000   E  113         CALL   DSPLY         ; DISPLAY HOST MESSAGE
0058 C30000   E  114         JMP    BEGIN
                 115 ;
                 116 ;
005B 13          117 TXTDP:  INX    D
005C 1A          118         LDAX   D             ; A = TEXT-DISPLAY COMMAND NUMBER
005D FE01        119         CPI    1
005F CA6500   C  120         JZ     SINON         ; COMMAND=1: "SIGN ON"
0062 C30000   E  121         JMP    BEGIN
                 122 ;
                 123 ;
0065 210000   E  124 SINON:  LXI    H,SONDP
0068 CD0000   E  125         CALL   DSPTX         ; DISPLAY: "SIGN ON"
006B C30000   E  126         JMP    BEGIN
                 127 ;
                 128 ;
                 129 $EJECT
                 130 ;**********************************************************
                 131 ;       UNIT-TO-HOST MESSAGE HANDLING ROUTINES
                 132 ;**********************************************************
                 133 ;
006E 1E00        134 XMITM:  MVI    E,0           ; E = CHECKSUM ACCUMULATOR
0070 CD0000   E  135         CALL   WRITC         ; OUTPUT: B = UNIT ADDRESS
0073 3A0000   E  136         LDA    BCAST
```

```
0076 B7             137         ORA     A         ; BROADCAST-RESPONSE TRANSMISSION?
0077 C20000   E     138         JNZ     CAST      ; .. YES
007A 3A0000   E     139         LDA     TRTYP
007D B7             140         ORA     A         ; TRANSMISSION-TYPE = NORMAL?
007E C20000   E     141         JNZ     SYSTR     ; .. NO: SYSTEM TRANSMISSION
                    142 ;
                    143 ;************************************************
                    144 ;       NORMAL SCANNED/KEYED DATA TRANSMISSION
                    145 ;             ( DATA FROM DARAY)
                    146 ;************************************************
                    147 ;
0081 210000   E     148         LXI     H,DTYPE
0084 3EFF           149         MVI     A,0FFH
0086 23             150 XM1:    INX     H         ; SCAN DATA-VALUE ARRAY FOR EOM
0087 BE             151         CMP     M
0088 C28600   C     152         JNZ     XM1
008B 2B             153         DCX     H
008C 45             154         MOV     B,L       ; B = DATA LENGTH
008D CD0000   E     155         CALL    WRITC     ; OUTPUT: DATA LENGTH
                    156 ;
0090 48             157         MOV     C,B       ; C = DATA-LENGTH COUNTER
0091 210000   E     158         LXI     H,DTYPE
0094 46             159 XM2:    MOV     B,M
0095 CD0000   E     160         CALL    WRITC     ; OUTPUT: DATA
0098 23             161         INX     H
0099 0D             162         DCR     C         ; FINISHED DATA TRANSMISSION?
009A C29400   C     163         JNZ     XM2       ; .. NOT YET
009D CD0000   E     164         CALL    WRITK     ; ..YES: OUTPUT: CHECKSUM
00A0 C9             165         RET
                    166 ;
                    167 ;
00A1 3E80           168 MESS:   MVI     A,20H     ; CONSTRUCT -MESS- RESPONSE:
00A3 80             169         ORA     B
00A4 47             170         MOV     B,A
00A5 CD0000   E     171         CALL    WRITC     ; OUTPUT: (-MESS- & UNIT#)
00A8 3E02           172         MVI     A,2
00AA 320000   E     173         STA     STBYT     ; STATUS-BYTE = 02
00AD C9             174         RET
                    175 ;
                    176 ;
00AE 0656           177 MAVL:   MVI     B,MAVLC
00B0 CD0000   E     178         CALL    XMIT      ; TRANSMIT: (-MAVL- + UNIT#)
00B3 3E10           179         MVI     A,10H
00B5 320000   E     180         STA     STBYT     ; STATUS-BYTE=10H
00B8 C9             181         RET
                    182 ;
                    183 ;
00B9 79             184 RJCT:   MOV     A,C       ; CONSTRUCT -RJCT- RESPONSE:
00BA 80             185         ORA     B
00BB 47             186         MOV     B,A
00BC CD0000   E     187         CALL    WRITC     ; OUTPUT: (-RJCT- & UNIT#)
00BF C30000   E     188         JMP     BEGIN
                    189 ;
                    190 ;
00C2 3A0000   E     191 UACK:   LDA     BCAST
00C5 FE59           192         CPI     CSTYC
00C7 CAD900   C     193         JZ      UACK2     ; BROADCAST REQUIRING RESPONSE=ACKNOWLEDGE NEXT POLL?
00CA FE4E           194         CPI     CSTNC     ; .. YES
00CC CAD400   C     195         JZ      UACK1     ; BROADCAST NOT REQUIRING A RESPONSE?
00CF 0641           196         MVI     B,MACKC   ; .. YES
00D1 CD0000   E     197         CALL    XMIT      ; FOR NON-BROADCAST: TRANSMIT: (-MACK- + UNIT#)
                    198 ;
00D4 AF             199 UACK1:  XRA     A
00D5 320000   E     200         STA     BCAST     ; RESET BROADCAST INDICATOR
00D8 C9             201         RET
                    202 ;
00D9 3E21           203 UACK2:  MVI     A,BCASA
00DB 320000   E     204         STA     BCAST     ; BROADCAST-ACKNOWLEDGE = 'A' (ASCII-20H)
00DE C9             205         RET
                    206 ;
                    207 ;
00DF 3A0000   E     208 URJT:   LDA     BCAST
00E2 FE59           209         CPI     CSTYC     ; BROADCAST REQUIRING RESPONSE=REJECT NEXT POLL?
00E4 CA0701   C     210         JZ      URJT2     ; .. YES
00E7 FE4E           211         CPI     CSTNC     ; BROADCAST NOT REQUIRING A RESPONSE?
00E9 CA0001   C     212         JZ      URJT1     ; .. YES
00EC 0652           213         MVI     B,MRJTC
00EE CD0000   E     214         CALL    XMIT      ; FOR NON-BROADCAST: TRANSMIT: (-MRJT- + UNIT#)
00F1 AF             215         XRA     A
00F2 320000   E     216         STA     BCAST     ; RESET BROADCAST INDICATOR
00F5 3A0000   E     217         LDA     STBYT
00F8 E603           218         ANI     3         ; DOES UNIT HAVE MESSAGE FOR HOST?
00FA C20000   E     219         JNZ     COMMR     ; .. YES: AWAIT HOST POLL
00FD C30000   E     220         JMP     BEGIN     ; .. NO: RESET STATUS-BYTE=0
                    221 ;
0100 AF             222 URJT1:  XRA     A
0101 320000   E     223         STA     BCAST     ; RESET BROADCAST INDICATOR
0104 C30000   E     224         JMP     BEGIN     ; RESET STATUS-BYTE=0
                    225 ;
0107 3E32           226 URJT2:  MVI     A,BCASR
0109 320000   E     227         STA     BCAST     ; BROADCAST-REJECT = 'R' (ASCII-20H)
010C 3E01           228         MVI     A,1
010E 320000   E     229         STA     STBYT     ; STATUS-BYTE = 01
0111 C30000   E     230         JMP     COMMR     ; AWAIT HOST POLL
                    231 ;
                    232 ;       *** END ***
                    233 $EJECT
                    1           NAME    POM4C
                    2 ;
                    3           PUBLIC  SYSTR,CAST,COMBN,XMIT,WRITC,WRITK
                    4           EXTRN   URJT
                    5 ;
    =               6 $INCLUDE(:F1:POMCOM)
    =               7 $NOLIST
    =              53 $LIST
                   54 ;
                   55          CSEG
                   56 ;
```

```
                57 ;*******************************************************
                58 ;       SYSTEM TRANSMISSION ROUTINES
                59 ;*******************************************************
                60 ;
0000 FE22       61 SYSTR: CPI    REGDC           ; REGISTER DUMP
0002 CA1700  C  62        JZ     REGDP
0005 FE23       63        CPI    MEMDC           ; MEMORY DUMP
0007 CA3A00  C  64        JZ     MEMDP
000A FE2A       65        CPI    FXTSC           ; FIXED LINE TEST
000C CA4700  C  66        JZ     FXTST
000F FE2B       67        CPI    CYTSC           ; CYCLE LINE TEST
0011 CADA00  C  68        JZ     CYTST
0014 C30000  E  69        JMP    URJT            ; ERROR: UNDEFINED HOST MESSAGE
                70 ;
                71 ;
                72 SEJECT
                73                               ;********************************
                74                               ; DUMP REGISTERS TO HOST
                75                               ;********************************
0017 47         76 REGDP: MOV    B,A
0018 CD2401  C  77        CALL   WRITC           ; OUTPUT -REGDUMP- FORMAT BYTE
001B E5         78        PUSH   H               ; HL ->
001C 210000     79        LXI    H,0
001F 39         80        DAD    SP
0020 E5         81        PUSH   H               ; SP ->
0021 D5         82        PUSH   D               ; DE ->
0022 C5         83        PUSH   B               ; BC ->
0023 F5         84        PUSH   PSW             ; A+FLAGS ->
0024 210000     85        LXI    H,0
0027 39         86        DAD    SP              ; POINTER: START OF PUSHED REGISTERS
0028 0E0A       87        MVI    C,10            ; C = CHARACTER COUNTER
002A 41         88        MOV    B,C
002B CD2401  C  89        CALL   WRITC           ; OUTPUT: CHARACTER LENGTH = 10
002E CDF600  C  90        CALL   NIBBL           ; OUTPUT: REGISTERS IN SUCCESSIVE HEX-NIBBLE FORMAT
0031 CD2301  C  91        CALL   WRITK           ;; OUTPUT: CHECKSUM
0034 F1         92        POP    PSW             ; -> A+FLAGS
0035 C1         93        POP    B               ; -> BC
0036 D1         94        POP    D               ; -> DE
0037 E1         95        POP    H               ; (DUMMY SP)
0038 E1         96        POP    H               ; -> HL
0039 C9         97        RET                    ; ... RETURN TO STRT ROUTINE
                98 ;
                99 ;
                100 SEJECT
                101                              ;********************************
                102                              ; DUMP SPECIFIED MEMORY REGION TO HOST
                103                              ;********************************
003A 210000  E  104 MEMDP: LXI   H,HOSTM         ; POINTER: HOST MESSAGE AREA
003D CD0F01  C  105        CALL  COMBN
0040 47         106        MOV   B,A             ; B = HI-ORDER START ADDRESS
0041 CD0F01  C  107        CALL  COMBN
0044 4F         108        MOV   C,A             ; C = LO-ORDER START ADDRESS
0045 C5         109        PUSH  B               ; SAVE: BEGINNING DUMP ADDRESS
0046 23         110        INX   H
0047 23         111        INX   H
0048 CD0F01  C  112        CALL  COMBN
004B 3C         113        INR   A
004C 91         114        SUB   C
004D 4F         115        MOV   C,A             ; C = DUMP-LENGTH (<256)
004E FE1E       116        CPI   30              ; C >= 30 BYTES  (DUMP= 2*30+4 = 64 BYTES)
0050 F25F00  C  117        JP    MLONG           ; .. YES: PROCESS LONG-DUMP FORMAT
                118 ;
0053 07         119 MSHRT: RLC
0054 C604       120        ADI   4
0056 6F         121        MOV   L,A             ; L = LENGTH BYTE = 2(DUMP-LENGTH) + 4
0057 0623       122        MVI   B,MEMDC
0059 CD2401  C  123        CALL  WRITC           ; OUTPUT: -MEMDUMP- (SHORT FORMAT)
005C C37400  C  124        JMP   MBOTH
                125 ;
005F 2600       126 MLONG: MVI   H,0             ; CONSTRUCT DOUBLE 6-BIT LENGTH BYTES:
0061 6F         127        MOV   L,A
0062 23         128        INX   H
0063 23         129        INX   H
0064 29         130        DAD   H               ; HL = 2(DUMP-LENGTH) + 4
0065 3E3F       131        MVI   A,3FH
0067 A5         132        ANA   L               ; A = 2'ND LENGTH BYTE
0068 29         133        DAD   H
0069 29         134        DAD   H
006A 6F         135        MOV   L,A             ; HL = HI/LO 6-BIT LENGTH BYTES
006B 0633       136        MVI   B,MEMDC OR LONGF
006D CD2401  C  137        CALL  WRITC           ; OUTPUT: -MEMDUMP- (LONG FORMAT)
0070 44         138        MOV   B,H
0071 CD2401  C  139        CALL  WRITC           ; OUTPUT: 1'ST LENGTH BYTE
                140 ;
0074 45         141 MBOTH: MOV   B,L
0075 CD2401  C  142        CALL  WRITC           ; OUTPUT: (2'ND) LENGTH BYTE
0078 210100  E  143        LXI   H,HOSTM+1       ; OUTPUT: MEMORY START ADDRESS
007B 1604       144        MVI   D,4
007D 46         145 MB1:   MOV   B,M
007E CD2401  C  146        CALL  WRITC
0081 23         147        INX   H
0082 15         148        DCR   D
0083 C27D00  C  149        JNZ   MB1             ; .. NOT YET
0086 E1         150        POP   H               ; RESTORE: BEGINNING DUMP ADDRESS
0087 CDF600  C  151        CALL  NIBBL           ; OUTPUT: MEMORY DUMP IN SUCCESSIVE HEX-NIBBLE FORMAT
008A CD2301  C  152        CALL  WRITK           ; OUTPUT: CHECKSUM
008D C9         153        RET                   ; ... RETURN TO STRT ROUTINE
                154 ;
                155 ;*******************************************************
                156 ;       RESPONSE TO HOST BROADCAST REQUIRING AN ANSWER
                157 ;*******************************************************
                158 ;
008E 0626       159 CAST:  MVI   B,CASTC
0090 CD2401  C  160        CALL  WRITC           ; OUTPUT: BROADCAST RESPONSE CHARACTER -- FORMAT
0093 0601       161        MVI   B,1
0095 CD2401  C  162        CALL  WRITC           ; OUTPUT: CHARACTER LENGTH = 1
```

```
0098 3A0000  E  163        LDA   BCAST
009B 47         164        MOV   B,A
009C CD2401  C  165        CALL  WRITC     ; OUTPUT: BROADCAST RESPONSE -- ACK/REJ
009F CD2301  C  166        CALL  WRITK     ; OUTPUT: CHECKSUM
00A2 AF         167        XRA   A
00A3 320000  E  168        STA   BCAST     ; RESET BROADCAST INDICATOR
00A6 C9        169         RET             ; ... RETURN TO STRT ROUTINE
                170 ;
                171 SEJECT

172 ;
                173                        ;*********************************
                174                        ; FIXED LINE TEST ROUTINE
                175                        ;*********************************
00A7 47         176 FXTST: MOV  B,A        ; B = -FIXTEST- (SHORT FORMAT)
00A8 210000  E  177        LXI  H,HOSTM
00AB CD0F01  C  178        CALL COMBN      ; COMBINE TEST CHATACTER NIBBLES INTO 8-BIT BYTE
00AE 57         179        MOV  D,A        ; D = TEST BYTE FOR TRANSMISSION
00AF 23         180        INX  H
00B0 7E         181        MOV  A,M
00B1 0F         182        RRC
00B2 0F         183        RRC
00B3 4F         184        MOV  C,A        ; C = A = 1'ST REPETITION BYTE SHIFTED TO HI-ORDER BITS
00B4 B7         185        ORA  A          ; REPETITION >= 64 BYTES?
00B5 C2BE00  C  186        JNZ  FLONG      ; .. YES: LONG FORMAT REQUIRED
                187 ;
00B8 CD2401  C  188 FSHRT: CALL WRITC      ; OUTPUT: -FIXTEST- (SHORT FORMAT)
00BB C3C700  C  189        JMP  FBOTH
                190 ;
00BE 063A       191 FLONG: MVI  B,FXTSC OR LONGF
00C0 CD2401  C  192        CALL WRITC      ; OUTPUT: -FIXTEST- (LONG FORMAT)
00C3 46         193        MOV  B,M
00C4 CD2401  C  194        CALL WRITC      ; OUTPUT: 1'ST LENGTH BYTE
                195 ;
00C7 23         196 FBOTH: INX  H
00C8 46         197        MOV  B,M
00C9 CD2401  C  198        CALL WRITC      ; OUTPUT: (2'ND) LENGTH BYTE
00CC B1         199        ORA  C          ; CONSTRUCT REPETITION BYTE
00CD 4F         200        MOV  C,A        ; C = REPETITION COUNTER
00CE 42         201        MOV  B,D        ; B = TEST BYTE FOR TRANSMISSION
00CF CD2401  C  202 FXOUT: CALL WRITC      ; OUTPUT: TEST BYTE
00D2 0D         203        DCR  C          ; FINISHED?
00D3 C2CF00  C  204        JNZ  FXOUT      ; .. NOT YET
00D6 CD2301  C  205        CALL WRITK      ; .. YES: OUTPUT: CHECKSUM
00D9 C9         206        RET             ; ... RETURN TO STRT ROUTINE
                207 ;
                208 ;
                209 ;
                210 ;
                211                        ;*********************************
                212                        ; CYCLE LINE TEST ROUTINE
                213                        ;*********************************
00DA 0638       214 CYTST: MVI  B,CYTSC OR LONGF
00DC CD2401  C  215        CALL WRITC      ; OUTPUT: -CYCLETEST- (LONG FORMAT)
00DF 0603       216        MVI  B,03H
00E1 CD2401  C  217        CALL WRITC      ; OUTPUT: 1'ST LENGTH BYTE >
00E4 063F       218        MVI  B,3FH      ;                           >> LENGTH = 255 BYTES
00E6 CD2401  C  219        CALL WRITC      ; OUTPUT: 2'ND LENGTH BYTE >
00E9 0601       220        MVI  B,1        ; B = FIRST CYCLE TEST VALUE
00EB CD2401  C  221 CYOUT: CALL WRITC      ; OUTPUT: CYCLE TEST VALUE
00EE 04         222        INR  B          ; B = NEXT CYCLE TEST VALUE
00EF C2EB00  C  223        JNZ  CYOUT      ; .. NOT YET FINISHED
00F2 CD2301  C  224        CALL WRITK      ; .. FINISHED: OUTPUT: CHECKSUM
00F5 C9         225        RET             ; ... RETURN TO STRT ROUTINE
                226 ;
                228 ;***********************************************************
                229 ;     OUTPUT MEMORY/REGISTERS IN SUCCESSIVE HEX-NIBBLE FORMAT
                230 ;***********************************************************
                231 ;
00F6 3E0F       232 NIBBL: MVI A,0FH       ; RHS
00F8 A6         233        ANA  M
00F9 57         234        MOV  D,A
00FA 3EF0       235        MVI  A,0F0H     ; LHS
00FC A6         236        ANA  M
00FD 0F         237        RRC
00FE 0F         238        RRC
00FF 0F         239        RRC
0100 0F         240        RRC
0101 47         241        MOV  B,A
0102 CD2401  C  242        CALL WRITC      ; OUTPUT: HI-ORDER NIBBLE
0105 42         243        MOV  B,D
0106 CD2401  C  244        CALL WRITC      ; OUTPUT: LO-ORDER NIBBLE
0109 23         245        INX  H          ; NEXT OUTPUT BYTE
010A 0D         246        DCR  C          ; FINISHED?
010B C2F600  C  247        JNZ  NIBBL      ; .. NOT YET
010E C9         248        RET
                249 ;
                250 ;
                251 ;***********************************************************
                252 ;     COMBINE TWO NIBBLE-BYTES INTO ONE HEX-BYTE
                253 ;***********************************************************
                254 ;
010F 23         255 COMBN: INX  H
0110 7E         256        MOV  A,M
0111 07         257        RLC
0112 07         258        RLC
0113 07         259        RLC
0114 07         260        RLC
0115 23         261        INX  H
0116 86         262        ADD  M
0117 C9         263        RET
                264 ;
                265 ;
                266 SEJECT
```

```
                267 ;***********************************************************
                268 ;      TRANSMIT: (-FORMAT CHARACTER- & -ADDRESS-) TO HOST
                269 ;***********************************************************
                270 ;
0118 CD2401  C  271 XMIT:  CALL   WRITC      ; OUTPUT: FORMAT CHARACTER TO HOST
011B 3A0000  E  272         LDA    MYADR
011E 47         273         MOV    B,A
011F CD2401  C  274         CALL   WRITC      ; OUTPUT: UNIT ADDRESS
0122 C9         275         RET
                276 ;
                277 ;
                278 ;***********************************************************
                279 ;      WRITE CHARACTER IN REG-B TO HOST
                280 ;***********************************************************
                281 ;
0123 43         282 WRITK: MOV    B,E        ; B = CHECKSUM ACCUMULATOR FOR OUTPUT
0124 DBA8       283 WRITC: IN     UCTL
0126 E601       284         ANI    1          ; USART READY FOR TRANSMISSION TO HOST?
0128 CA2401  C  285         JZ     WRITC      ; .. NOT YET
012B 78         286         MOV    A,B
012C D3A8       287         OUT    UDATA      ; ..YES: OUTPUT DATA
012E AB         288         XRA    E
012F 5F         289         MOV    E,A        ; BUILD UP CHECKSUM
0130 C9         290         RET
                291 ;
                292 ;      *** END ***
                293 $EJECT
                  1         NAME   POM5
                  2 ;
                  3         PUBLIC MWILE,DEBUG
                  4         EXTRN  ONDP,OFFOP,SOFOP,SCOOP,SONDP,DSPTX,ENJOP,DSPT1,BEGIN,KEY2,START
                  5         EXTRN  COMBN,CLEAR,DSPLY,UCONT
                  6 ;
              =   7 $INCLUDE(:F1:POMCOM)
              =   8 $NOLIST
              =  54 $LIST
                 55 ;
                 56         CSEG
                 57 ;
                 58 ;***********************************************************
                 59 ;      SPECIAL M. WILE ROUTINES FOR PROCESSING SPECIFIC DATA-TYPES
                 60 ;***********************************************************
                 61 ;
0000 210000  E   62 MWILE: LXI    H,DTYPE    ; POINTER: DATA-TYPE
0003 7E          63         MOV    A,M
0004 FE00        64         CPI    0
0006 CA1E00  C   65         JZ     SPCL0      ; TYPE-0: EMPLOYEE SCAN
0009 FE01        66         CPI    1
000B CA6100  C   67         JZ     SPCL1      ; TYPE-1: FOREMAN SCAN PREFIX
000E FE04        68         CPI    4
0010 CA6000  C   69         JZ     SPCL4      ; TYPE-4: BUNDLE SCAN/KB
0013 FE05        70         CPI    5
0015 CA8500  C   71         JZ     SPCL5      ; TYPE-5: SHOP-OPERATION SCAN
0018 FE0D        72         CPI    0DH
001A CAC200  C   73         JZ     SPCLD      ; TYPE-D: DISPLAY MEMORY BYTE
001D C9         74         RET
                 75 ;
                 76 ;
                 77 ;***********************************************************
                 78 ;      TYPE-0:  (1) ALLOW ONLY VALID EMPLOYEE SCAN
                 79 ;               (2) INDICATE OPERATOR SIGN ON/OFF
                 80 ;               (3) REQUIRE PROPER SIGN-OFF BEFORE ANOTHER EMPLOYEE MAY SIGN ON
                 81 ;***********************************************************
                 82 ;
001E 110000  E   83 SPCL0: LXI    D,EMPID    ; POINTER: EMPLOYEE ID
0021 0605        84         MVI    B,5
0023 3A0000  E   85         LDA    OPSEQ
0026 E601        86         ANI    1          ; OPERATOR ALREADY SIGNED ON?
0028 C24200  C   87         JNZ    SP02       ; .. YES
                 88 ;
                 89                           ;******************************
                 90                           ; NOBODY SIGNED ON YET
                 91                           ;******************************
002B 23         92 SP01:  INX    H
002C 7E          93         MOV    A,M
002D 12          94         STAX   D          ; STORE EMPLOYEE ID
002E 13          95         INX    D
002F 05          96         DCR    B
0030 C22B00  C   97         JNZ    SP01
                 98 ;
0033 3A0000  E   99         LDA    OPSEQ
0036 F601       100         ORI    1          ; INDICATE THAT EMPLOYEE SIGNED ON
0038 320000  E  101         STA    OPSEQ
                102 ;
003B 210000  E  103         LXI    H,ONDP
003E CD0000  E  104         CALL   DSPT1      ; APPEND "ON-" TO EMPLOYEE SCAN
0041 C9        105         RET
                106                           ;******************************
                107                           ; SOMEBODY IS SIGNED ON
                108                           ;******************************
0042 1A        109 SP02:  LDAX   D
0043 23        110         INX    H
0044 BE        111         CMP    M          ; COMPARE SCANNED EMPLOYEE ID WITH STORED ID
0045 C25800  C  112         JNZ    SP03       ; UNEQUAL: DIFFERENT EMPLOYEE
0048 13        113         INX    D
0049 05        114         DCR    B
004A C24200  C  115         JNZ    SP02
                116                           ;******************************
                117                           ; EQUAL: PROPER EMPLOYEE SIGNING OFF
                118                           ;******************************
004D AF        119         XRA    A          ; INDICATE EMPLOYEE SIGNED OFF AND SHOP/OPN UNDEFINED
004E 320000  E  120         STA    OPSEQ
                121 ;
0051 210000  E  122         LXI    H,OFFOP
0054 CD0000  E  123         CALL   DSPT1      ; APPEND "OFF-" TO EMPLOYEE SCAN
0057 C9        124         RET
```

```
                        125             ;************************************
                        126             ; IMPROPER EMPLOYEE ATTEMPTING TO SIGN ON
                        127             ;************************************
005B 210000    E        128 SP03:  LXI    H,SOFOP
005B CD0000    E        129        CALL   DSPTX         ; DISPLAY: "SIGN OFF"
005E C30000    E        130        JMP    BEGIN
                        131 ;
                        132 ;
                        133 ;************************************************
                        134 ;      TYPE-1:  ALLOW KEYED AUTHORIZATION CODE TO BE APPENDED TO
                        135 ;                       SCANNED FOREMAN NUMBER
                        136 ;************************************************
                        137 ;
0061 32C000    E        138 SPCL1: STA    KMODE         ; KMODE=1: ALLOW KB DATA ENTRY
0064 360E               139        MVI    M,0EH         ; CONVERT TO DATA-TYPE -E- FOR FOREMAN-AUTHORIZATION CODE
0066 C1                 140        POP    B             ; (CANCEL MWILE-CALL PUSH)
0067 210400    E        141        LXI    H,DTYPE+4     ; REPOSITION POINTER TO END OF SCANNED DATA
006A C30000    E        142        JMP    KEY2          ; APPEND KB AUTHORIZATION CODE TO FOREMAN NUMBER
                        143 ;
                        144 ;
                        145 $EJECT
                        146 ;************************************************
                        147 ;      TYPE-4:  (1) ALLOW BUNDLE SCAN ONLY AFTER EMPLOYEE & SHOP-OPN DEFINED
                        148 ;               (2) DISPLAY "END JOB" UPON SECOND SCANNING OF BUNDLE
                        149 ;************************************************
                        150 ;
006D 3A0000    E        151 SPCL4: LDA    OPSEQ
0070 1F                 152        RAR                  ; IS EMPLOYEE ALREADY SIGNED ON?
0071 027E00    C        153        JNC    SP41          ; .. NO
0074 1F                 154        RAR                  ; IS SHOP-OPN DEFINED?
0075 DA8700    C        155        JC     SP43          ; .. YES
0078 210000    E        156        LXI    H,SCOOP       ; .. NO: DISPLAY: "SCAN OPN"
007B C38100    C        157        JMP    SP42
007E 210000    E        158 SP41:  LXI    H,SONOP       ; DISPLAY: "SIGN ON"
0081 CD0000    E        159 SP42:  CALL   DSPTX
0084 C30000    E        160        JMP    BEGIN
                        161 ;
0087 110000    E        162 SP43:  LXI    D,BUNDL       ; POINTER: PREVIOUSLY-SCANNED BUNDLE
008A 0608               163        MVI    B,8
008C 1A                 164 SP44:  LDAX   D             ; COMPARE FIELDS FOR EQUALITY
008D 23                 165        INX    H
008E BE                 166        CMP    M
008F C2AC00    C        167        JNZ    NEWB          ; UNEQUAL: NEWLY SCANNED BUNDLE
0092 13                 168        INX    D
0093 05                 169        DCR    B
0094 C28C00    C        170        JNZ    SP44
                        171 ;
0097 210000    E        172        LXI    H,DTYPE       ; EQUAL: SETUP ABBREVIATED END-BUNDLE MESSAGE
009A 3E0F               173        MVI    A,0FH
009C 77                 174        MOV    M,A           ; DATA-TYPE = F
009D 23                 175        INX    H
009E 77                 176        MOV    M,A           ; DATA = F
009F 3EFF               177        MVI    A,0FFH
00A1 23                 178        INX    H
00A2 77                 179        MOV    M,A           ; EOF
00A3 1B                 180        DCX    D
00A4 12                 181        STAX   D             ; DESTROY BUNDLE FIELD EQUALITY
00A5 210000    E        182        LXI    H,ENJOP
00A8 CD0000    E        183        CALL   DSPTX         ; DISPLAY: "END JOB"
00AB C9                 184        RET
                        185 ;
00AC 7E                 186 NEWB:  MOV    A,M           ; STORE NEWLY-SCANNED BUNDLE
00AD 12                 187        STAX   D
00AE 13                 188        INX    D
00AF 23                 189        INX    H
00B0 05                 190        DCR    B
00B1 C2AC00    C        191        JNZ    NEWB
00B4 C9                 192        RET
                        193 ;
                        194 ;
                        195 $EJECT
                        196 ;************************************************
                        197 ;      TYPE-5:  INDICATE SHOP-OPN HAS BEEN SCANNED
                        198 ;************************************************
                        199 ;
00B5 3A0000    E        200 SPCL5: LDA    OPSEQ
00B8 1F                 201        RAR                  ; IS EMPLOYEE SIGNED ON?
00B9 D27E00    C        202        JNC    SP41          ; .. NO: DISPLAY: "SIGN ON"
00BC 3E03               203        MVI    A,3           ; ..YES: INDICATE (EMPLOYEE,) SHOP-OPN DEFINED
00BE 320000    E        204        STA    OPSEC
00C1 C9                 205        RET
                        206 ;
                        207 ;
                        208 ;************************************************
                        209 ;      TYPE-0: DISPLAY MEMORY BYTE OF KEYED ADDRESS
                        210 ;************************************************
                        211 ;
00C2 CD0000    E        212 SPCLD: CALL   COMBN
00C5 47                 213        MOV    B,A           ; B = HI-ORDER BEGINNING MEMORY ADDRESS
00C6 CD0000    E        214        CALL   COMBN
00C9 4F                 215        MOV    C,A           ; C = LO-ORDER BEGINNING MEMORY ADDRESS
                        216 ;
00CA 210100    E        217        LXI    H,DTYPE+1     ; SPACE PAST DISPLAY TYPE
00CD 1604               218        MVI    D,4           ; STORE 4 BYTES OF ADDRESSED MEMORY
00CF 0A                 219 SPD1:  LDAX   B             ; A = CONTENTS OF MEMORY ADDRESS
00D0 E6F0               220        ANI    0F0H
00D2 0F                 221        RRC
00D3 0F                 222        RRC
00D4 0F                 223        RRC
00D5 0F                 224        RRC
00D6 77                 225        MOV    M,A           ; STORE HI-ORDER NIBBLE OF CONTENTS
00D7 0A                 226        LDAX   B
00D8 E60F               227        ANI    0FH
00DA 23                 228        INX    H
00DB 77                 229        MOV    M,A           ; STORE LO-ORDER NIBBLE OF CONTENTS
00DC 23                 230        INX    H
```

```
000D 03           231        INX    B            ; NEXT MEMORY BYTE
00DE 15           232        DCR    D            ; FINISHED?
00DF C2CF00   C   233        JNZ    SPD1         ; .. NOT YET
                  234 ;
00E2 36FF         235        MVI    M,0FFH       ; INDICATE EOM
00E4 CD0000   E   236        CALL   DSPLY        ; DISPLAY CONTENTS OF MEMORY BYTES
00E7 C30000   E   237        JMP    BEGIN
                  238 ;
                  239 ;
                  240 SEJECT
                  241 ;***************************************************
                  242 ;        COMMUNICATION DEBUG ROUTINE
                  243 ;***************************************************
                  244 ;
00EA E5           245 DEBUG: PUSH   H            ; SAVE WORKING REGISTERS
00EB D5           246        PUSH   D
00EC C5           247        PUSH   B
00ED 0E58         248        MVI    C,58H        ; MEMORY SHIFT COUNTER
00EF 210000   E   249        LXI    H,DBUGA      ; POINTER: BEGINNING OF DEBUG AREA
00F2 110800   E   250        LXI    D,DBUGA+8    ; POINTER: OFFSET INTO DEBUG AREA
00F5 1A           251 DBG1:  LDAX   D
00F6 77           252        MOV    M,A          ; SHIFT MEMORY DOWN 8 BYTES
00F7 13           253        INX    D
00F8 23           254        INX    H
00F9 0D           255        DCR    C
00FA C2F500   C   256        JNZ    DBG1         ; .. NOT YET
00FD 70           257        MOV    M,B          ; ..YES: STORE USART DATA
00FE 23           258        INX    H
00FF DBA8         259        IN     UCTL
0101 77           260        MOV    M,A          ; STORE USART CONTROL BYTE
0102 23           261        INX    H
0103 3A0000   E   262        LDA    STBYT
0106 77           263        MOV    M,A          ; STORE STATUS BYTE
0107 23           264        INX    H
0108 20           265        RIM
0109 77           266        MOV    M,A          ; STORE INTERRUPT MASK
010A C1           267        POP    B            ; RESTORE BC, DE
010B D1           268        POP    D
010C 210000       269        LXI    H,0
010F 39           270        DAD    SP
0110 23           271        INX    H
0111 23           272        INX    H
0112 225C00   E   273        SHLD   DBUGA+5CH    ; STORE CURRENT VALUE OF STACK POINTER
0115 E1           274        POP    H            ; RESTORE HL
0116 E3           275        XTHL
0117 225E00   E   276        SHLD   DBUGA+5EH    ; STORE ADDRESS OF CALLING ROUTINE
011A E3           277        XTHL
011B C30000   E   278        JMP    UCONT        ; ... CONTINUE PROCESSING USART INTERRUPT
                  279 ;
                  280 ;
                  281 ;      *** END ***
                  282 SEJECT

00A3          KEYBD   EQU     0A3H         ; BECKMAN/KEYBOARD TEST PORT
0080          VDLAY   EQU     80H          ; INTERCHARACTER DISPLAY DELAY
00A0          MYADR   EQU     0A0H         ; POMDAS UNIT ADDRESS PORT
00F5          HOSTC   EQU     0F5H         ; USART CONTROL PORT
00F4          HOSTD   EQU     0F4H         ; USART DATA PORT
00A1          PORT5   EQU     0A1H         ; USART KEYPAD PORT
00A0          PORT6   EQU     0A0H         ; VISUAL DISPLAY PORT
00F7          PORT7   EQU     0F7H         ; USART CONTROL PORT
00A2          PEN     EQU     0A2H         ; PEN INPUT PORT
0037          DLNTH   EQU     55           ; DATA FIELD LENGTH
6400                  ORG     6400H
6400                  DS      10H
              STACK:
6410          DATA:   DS      DLNTH
6447          DAREA:  DS      11           ; DISPLAY AREA
6452          STBYT:  DS      1            ; COMMUNICATION STATUS BYTE
6453          TRGLV:  DS      2            ; TRIGGER WHT/BLK PEN LEVELS
6455          MAXWT:  DS      1            ; MAXIMUM WHT READ LEVEL
6456          MINBL:  DS      1            ; MINIMUM BLK READ LEVEL
              ;
6000                  ORG     6000H        ; INITIALIZATION:
6000 AF               XRA     A
6001 325264           STA     STBYT        ; .. CLEAR STATUS BYTE
6004 21281E           LXI     H,1E28H      ; .. BLK=H=1E  WHT=L=28
6007 225364           SHLD    TRGLV
              ;
600A 21007F   BEGIN:  LXI     H,7F00H      ; .. RESTORE WHT/BLK LEVEL ACCUMS
600D 225564           SHLD    MAXWT
6010 211064           LXI     H,STACK      ; .. BEGINNING DATA POINTER
6013 F9               SPHL                 ;    & STACK POINTER
6014 014764           LXI     B,DAREA      ; .. BEGINNING DISPLAY AREA BYTE
6017 C5               PUSH    B            ; .. SAVE IT
6018 3A5264           LDA     STBYT        ; CHECK STATUS:
601B B7               ORA     A            ;   ACTION PENDING?
601C C27F61           JNZ     COMMP        ; .. YES
```

```
6O1F 0E6E            MVI   C,DLNTH+2  ; .. C=DATA FIELD END COUNTER
6021 1600            MVI   D,0        ; .. D=0
6023 5A              MOV   E,D        ; .. E=0 -- CCFF
6024 34       RDPEN: INR   M          ; INCREMENT PEN-SAMPLE COUNT
6025 E5              PUSH  H          ; SAVE DATA POINTER
6026 3E01            MVI   A,1        ; INITIALIZE FOR PEN READ
6028 D3A2            OUT   PEN
602A 00              NOP
602B 00              NOP              ; TIMING
602C AF              XRA   A
602D D3A2            OUT   PEN
602F AF       PENIN: XRA   A
6030 DBA2            IN    PEN        ; READ PEN A/D VALUE --> A
6032 1F              RAR              ; VALID READ YET?
6033 D22F60          JNC   PENIN      ; .. NO
6036 42              MOV   B,D        ; RESET COLOR INDICATOR
6037 2A5364          LHLD  TRGLV      ; BLK=H WHT=L
603A BD              CMP   L          ; MAXWHT < PEN: DEFINITE WHITE?
603B F24460          JP    WHITE      ; .. YES
603E BC              CMP   H          ; MINBLK > PEN: DEFINITE BLACK?
603F FA4560          JM    BLACK      ; .. YES
6042 43              MOV   B,E        ; CROSSOVER RANGE:
6043 05              DCR   B          ; .. CCFF --> SAME COLOR AS BEFORE
6044 04       WHITE: INR   B          ; WHITE: B=1
6045 215664   BLACK: LXI   H,MINBL    ; BLACK: B=0
6048 BE              CMP   M          ; PEN < MINBLK LEVEL?
6049 F24D60          JP    $+4        ; .. NO
604C 77              MOV   M,A        ; .. YES: PEN -> MINBLK
604D 2B              DCX   H
604E BE              CMP   M          ; PEN > MAXWHT LEVEL?
604F FA5360          JM    $+4        ; .. NO
6052 77              MOV   M,A        ; YES: PEN -> MAXWHT
6053 E1              POP   H          ; RESTORE DATA POINTER
6054 7B              MOV   A,E        ; CCFF --> A
6055 90              SUB   B          ; COMPARE TO COLOR JUST READ
6056 C27560          JNZ   CHANG      ; .. DIFFERENT
6059 7E              MOV   A,M        ; .. SAME:
605A B0              ORA   B
605B A8              XRA   B          ; BLACK & OVERFLOW (COUNT=255) ??
605C 3C              INR   A
605D C22460          JNZ   RDPEN      ; .. NO: RESCAN
6060 79              MOV   A,C        ; .. YES
6061 1F              RAR
6062 4F              MOV   C,A        ; C=DATA COUNT REMAINING
6063 FE2D            CPI   DLNTH-10   ; WELL INTO DATA?
6065 F20061          JP    KEYIN      ; .. NO: GO TO KEYPAD ROUTINE
6068 5A              MOV   E,D        ; E=# CHAR'S LESS THAN MAX=10
6069 1C       CHARS: INR   E          ; 1 LESS CHARACTER
606A D605            SUI   5          ; 5 BYTES PER CHARACTER
606C CA7C60          JZ    ?SWOP      ; MOD(DATA COUNT,5)=0
606F FA0061          JM    KEYIN      ; MOD(DATA COUNT,5)>0
6072 C36960          JMP   CHARS
6075 58       CHANG: MOV   E,B        ; FLIP CCFF
6076 19              DAD   D          ; WHITE: HL=NEXT DATA BYTE
                                      ; BLACK: HL=SAME DATA BYTE
6077 72              MOV   M,D        ; INITIALIZE COUNT=0
6078 0D              DCR   C          ; MAXIMUM END OF DATA FIELD?
6079 C22460          JNZ   RDPEN      ; .. NO
              ;
607C 3E0A     ?SWOP: MVI   A,10       ; 10 CHARS MAX
607E 93              SUB   E
607F 324764          STA   DAREA      ; SAVE # VALID CHARACTERS
6082 2B              DCX   H          ; LAST STOP CHARACTER
6083 7E              MOV   A,M
6084 86              ADD   M          ; 2 * STOP #2
6085 2B              DCX   H
6086 96              SUB   M          ; STOP #1 > 2 * STOP #2 ???
6087 FA9E60          JM    PARSE      ; .. NO (LEFT TO RIGHT READ)
              ;
```

```
608A 3E37          MVI   A,DLNTH   ; MAXIMUM DATA LENGTH
608C 91            SUB   C         ; LESS: DATA REMAINING
608D 1F            RAR             ; / 2
608E 5F            MOV   E,A       ; = VALID DATA LENGTH FOR SWOPPING
608F 011164        LXI   B,DATA+1  ; 1'ST DATA CHAR
6092 23            INX   H         ; LAST DATA CHAR
6093 56     SWOP:  MOV   D,M
6094 0A            LDAX  B
6095 77            MOV   M,A
6096 7A            MOV   A,D
6097 02            STAX  B
6098 03            INX   B
6099 2B            DCX   H
609A 1D            DCR   E         ; FINISHED SWOPPING?
609B C29360        JNZ   SWOP      ; NO
                   ;
609E CDF260 PARSE: CALL  DOTRG     ; RECOMPUTE WHT/BLK TRIGGER LEVELS
                   ;
60A1 014764        LXI   B,DAREA   ; BC=DECODE AREA
60A4 211364        LXI   H,DATA+3  ; FIRST DATA BYTE PAST START CHARS
60A7 0A            LDAX  B         ; # VALID CHARACTERS
60A8 5F            MOV   E,A
60A9 C5     NXTCH: PUSH  B         ; STORE DECODE BYTE
60AA 1605         MVI   D,5       ;   5 ELEMENTS/CHARACTER
60AC AF            XRA   A         ; A=0
60AD E5            PUSH  H         ; SAVE 1'ST DATA BYTE OF CHARACTER
60AE 86     NXTV1: ADD   M         ; ADD IN DATA VALUE
60AF 23            INX   H         ; NEXT DATA BYTE
60B0 15            DCR   D         ; 5'TH VALUE?
60B1 C2AE60        JNZ   NXTV1     ; .. NO
60B4 E6FC          ANI   0FCH      ; PREPARE FOR SHIFT
60B6 0F            RRC
60B7 0F            RRC             ; SUM/4 = TRIGGER VALUE
60B8 47            MOV   B,A       ; B = TEMP STORAGE -- TRIGGER VALUE
60B9 E1            POP   H         ; RESTORE 1'ST DATA BYTE OF CHARACTER
60BA 1605          MVI   D,5       ; 5 ELEMENTS/CHARACTER
60BC 0E00          MVI   C,0       ; INIT BINARY CHAR REPRESENTATION
60BE 78     NXTV2: MOV   A,B       ; TRIGGER VALUE --> A
60BF BE            CMP   M         ; COMPARE DATA BYTE TO TRIGGER VALUE
60C0 79            MOV   A,C
60C1 17            RAL             ; CARRY BIT: 0=NARROW 1=WIDE
60C2 4F            MOV   C,A       ; SHIFT INTO C
60C3 23            INX   H         ; NEXT DATA BYTE
60C4 15            DCR   D         ; 5'TH VALUE?
60C5 C2BE60        JNZ   NXTV2     ; .. NO
                   ;
                   ;
60C8 C1     DCODE: POP   B         ; RESTORE POINTER TO DECODE AREA
60C9 E5            PUSH  H         ; SAVE POINTER TO NEXT CHARACTER
60CA 21DB60        LXI   H,CODES   ; HL = BAR CODE REPRESENTATION AREA
60CD 1609          MVI   D,9       ; 9 DIGIT CODES + ZERO
60CF BE     NXTCD: CMP   M         ; CODE MATCHES BINARY REPRESENTATION?
60D0 CAE560        JZ    STORE     ; .. YES
60D3 15            DCR   D
60D4 FA7F61        JM    COMMR     ; .. NO
60D7 23            INX   H         ; TRY NEXT CODE
60D8 C3CF60        JMP   NXTCD
                   ;
60DB 0A     CODES: DB    0AH       ; 9
60DC 12            DB    12H       ; 8
60DD 03            DB    03H       ; 7
60DE 0C            DB    0CH       ; 6
60DF 14            DB    14H       ; 5
60E0 05            DB    05H       ; 4
60E1 18            DB    18H       ; 3
60E2 09            DB    09H       ; 2
60E3 11            DB    11H       ; 1
60E4 06            DB    06H       ; 0
                   ;
```

```
60E5  E1              STORE:  POP   H          ; RESTORE POINTER TO NEXT CHARACTER
60E6  7A                      MOV   A,D        ; DECODED VALUE --> A
60E7  C630                    ADI   30H        ; BINARY -> ASCII
60E9  02                      STAX  B          ; STORE IN DECODE AREA
60EA  03                      INX   B          ; NEXT DECODE BYTE
60EB  1D                      DCR   E          ; LAST CHARACTER?
60EC  C2A960                  JNZ   NXTCH      ; .. NO
60EF  C34961                  JMP   DSPLA
                    ;
                    ;
60F2  2A5564  DOTRG:  LHLD  MAXWT              ; NEW WHT/BLK TRIGGER LEVELS:
60F5  7D              MOV   A,L
60F6  94              SUB   H
60F7  1F              RAR                      ; (MAXWHT - MINBLK) / 2
60F8  6F              MOV   L,A                ; = WHITE TRIGGER LEVEL
60F9  D60A            SUI   10                 ; - 10
60FB  67              MOV   H,A                ; = BLACK TRIGGER LEVEL
60FC  225364          SHLD  TRGLV
60FF  C9              RET
                    ;
                    ;
```

The foregoing program is based upon a standard two of five code as sensed by scanner 111. It will be recognized that the foregoing programs may be modified for use with other transducer inputs, including transducers for sensing temperatures, pressures, or other quantities.

For all modifications of the system, local "intelligent" terminals, kept highly versatile through use of software programming for individual microprocessors, are employed. Mixed data systems are readily achieved, with different kinds of input data handled accurately and efficiently; one or two lead digits can be assigned to identify different kinds of data such as workpiece unit identification, operator identification, supervisor identification, machine data, etc. Local verification of data type, length, and sequence, achieved again through software programming, reduces the burden on the polling processor and allows economical redundancy for that part of the system. Data terminals are readily relocated by a simple plug-in procedure to the combined power/data bus. Operator requirements, for training and skill, are negligible.

We claim:

1. A point-of-manufacture data acquisition system for a production facility of the kind comprising a series of work stations through which a multiplicity of workpiece units are transferred for performance of a sequence of production operations, for collecting and recording data for each station, on a real-time basis, representative of operator identity and time present, and workpiece unit identity and time of processing, the system comprising:

a multiplicity of workpiece unit identification members each bearing scannable data identifying an associated workpiece unit;

a plurality of operator identification members, each bearing scannable data identifying an operator;

a series of data terminals, one for each work station, each data terminal comprising scanning means at the work station for scanning the data on the identification members, and recording/transmitting means including work station identification means and data storage means for storing the data from each identification member scan;

polling processor means, for repetitively polling the recording/transmitting means of all of the data terminals for data stored therein, the polling processor means including means for recording that data;

transmission means, comprising only two transmission lines connected to all of the data terminals;

a central power supply;

and terminal bus interface means connecting the polling processor means and the central power supply to the transmission means to transmit power continuously from the central power supply to all of the data terminals on a synchronous time-share basis with the transmission of digital information data signals from the data terminals to the polling processor and of digital interrogation and verification data signals from the polling processor to the data terminals;

the system providing complete compilation of the aforesaid data requirements in response to scanning of the identification members, with no additional inputs.

2. A point-of-manufacture data acquisition system according to claim 1, which further collects and records data representative of the production operation performed at each station, the system further comprising a number of production operation identification members each bearing scannable data identifying a particular production operation.

3. A point-of-manufacture data acquisition system according to claim 1 in which both lines continuously transmit power to the data terminals on a synchronous shared-time basis with the digital data signals, the polarities for power transmission being opposite on the two lines, the polarities for data transmission being opposite on the two lines, and the data and power polarities being opposite on each line.

4. A point-of-manufacture data acquisition system according to claim 3 in which the data transmission amplitude on each line is of the order of twelve volts or more, in which the duty cycle for power transmission exceeds twenty percent, and in which the power transmission amplitude is substantially greater than the data transmission amplitude on each line.

5. A point-of-manufacture data acquisition system according to claim 4 in which the transmission means constitutes a three-line electrical bus extending throughout the production facility, the third line being at ground potential, the bus having spaced connector receptacles throughout its length to permit rapid location and relocation of data terminals at varying locations within the production facility.

6. A point-of-manufacture data acquisition system according to claim 3 in which the recording/transmitting means for each data terminal comprises:

microprocessor means, connected to the data storage means and the scanning means, for controlling entry of data into and retrieval of data from the storage means;

and program means, connected to the microprocessor means, for programming the microprocessor means to:

verify validity and sequence of presentation of the scanned data;

preclude transmission of unverified data to the polling processor means; and preclude effective transmission to the polling processor means of identification data for a second operator at the work station whenever identification data for a first operator is already recorded in the storage means for that work station.

7. A point-of-manufacture data acquisition system according to claim 6, in which the program means for each data terminal further programs the microprocessor means to:

transmit to the polling processor only an abbreviated general message indicating completion of work on a workpiece unit upon a second scan of a given workpiece unit identification member at the work station.

8. A point-of-manufacture data acquisition system according to claim 6, in which each data terminal includes keypad means for entry of data into the storage means independently of the identification members;

in which the system further comprises at least one supervisor identification member bearing scannable data identifying a supervisor;

and in which the program means further programs the microprocessor means to:

enable entry of at least some types of data into the storage means from the keypad means only when supervisor identification data has previously been recorded in the storage means.

9. A point-of-manufacture data acquisition system according to claim 1 in which the recording/transmitting means for each data terminal comprises:

microprocessor means, connected to the data storage means and the scanning means, for controlling entry of data into and retrieval of data from the storage means;

and program means, connected to the microprocessor means, for programming the microprocessor means to:

verify validity and sequence of presentation of the scanned data;

preclude transmission of unverified data and out-of-sequence data to the polling processor means; and preclude transmission of identification data for a second operator to the polling processor whenever identification data for a first operator is already recorded in the storage means for that data terminal.

10. A point-of-manufacture data acquisition system according to claim 9 in which the program means for each data terminal further programs the microprocessor means to cause transmission of only an abbreviated general message signifying completion of work on a workpiece unit in response to a second scan of any workpiece unit identification member at the work station.

11. A point-of-manufacture data acquisition system according to claim 1, in which each data terminal includes keypad means for entry of data into the storage means independently of the identification members, the system further comprises at least one supervisor identification member bearing scannable data identifying a supervisor and in which the recording/transmitting means for each data terminal comprises:

microprocessor means, connected to the data storage means, for controlling entry of data into and retrieval of data from the storage means;

and program means, connected to the microprocessor means, for programming the microprocessor means to permit entry of at least some types of data into the storage means from the keypad means only from supervisor identification data has previously been recorded in the storage means for that data terminal.

12. A point-of-manufacture data acquisition system according to claim 11 in which the program means further programs the microprocessor means to preclude effective transmission to the polling porcessor means of identification data for a second operator whenever identification data for a first operator is already recorded in the storage means for that data terminal.

13. A point-of-manufacture data acquisition system according to claim 1, claim 3, or claim 9, in which each identification member constitutes a card bearing human-readable data in addition to the scannable data, in which the scannable data of each identification member constitutes a row of apertures aligned with and spaced a predetermined distance from one edge of the card, in which the scannable data is scanned by being moved manually through the scanning means, and in which the scanning means for each data terminal comprises a single light source and a single photosensor mounted in a scanner body having a slot only slightly wider than the card thickness, the light source and photosensor being located on opposite sides of the slot and spaced from the bottom of the slot by said predetermined distance.

14. A point-of-manufacture data acquisition system according to claim 13 in which the scannable data of each card includes distinctive start and end codes to permit scanning in either direction without loss of data.

15. A point-of-manufacture data acquisition system according to claim 1, claim 3, or claim 9, including a number of groups of data terminals, each group including a plurality of scanning means connected to the data storage means in a recording/transmitting means that constitutes a part of all of the data terminals in the group.

16. A data acquisition system for a multi-station work facility comprising:

a series of data terminals, each data terminal comprising data input means, terminal identification means, data storage means, and display means;

polling processor means for periodically polling the data terminals for data stored therein;

first and second transmission lines, each connected to all of the data terminals, the first transmission line transmitting digital interrogation and verification data signals from the polling processor to the terminals and the second transmission line transmitting digital information data signals from the terminals to the polling processor;

a central DC power supply;

and terminal bus interface means, connecting the polling processor to the transmission lines and connecting the central power supply to at least one of the transmission lines, for continuously transmitting power to all of the data terminals on a synchronous shared-time basis with the digital data signals on that line, the power transmission constituting a series of constant frequency power pulses of given polarity affording continuous power for the data terminals, and the data transmissions being of opposite polarity from the power pulses.

17. A point-of-manufacture data acquisition system according to claim 16 in which the terminal bus interface means connects the central power supply to both transmission lines, continuously transmitting power to all data terminals on a synchronous shared-time basis with the digital data signals on both lines, the polarities for power transmission being opposite on the two lines, and the data signal and power polarities being opposite on each line.

18. A point-of-manufacture data acquisition system according to claim 17 in which the data transmission amplitude on each line is of the order of twelve volts or more, and in which the power transmission amplitude is substantially greater than the data transmission amplitude on each line.

19. A point-of-manufacture data acquisition system according to claim 18 in which the power transmission voltages are approximately +48 v and −48 v.

20. A point-of-manufacture data acquisition system according to claim 17 in which the transmission means includes a third line at ground potential connecting the terminal bus interface to all data terminals, in which the duty cycle for power transmission exceeds twenty percent, and in which the power transmission amplitude is substantially greater than the data transmission amplitude.

21. A point-of-manufacture data acquisition system according to claim 20 in which the transmission means constitutes a three-wire electrical bus extending throughout the production facility, the bus having spaced connector receptacles throughout its length to permit rapid location and relocation of data terminals at varying locations within the production facility.

22. A point-of-manufacture data acquisition system according to claim 17 in which the system further comprises a plurality of operator identification members each bearing scannable data identifying an operator and a multiplicity of workpiece unit identification members each bearing scannable data identifying a workpiece unit;

in which the data input means for each data terminal comprises scanning means for scanning the data on the identification members;

and in which each data terminal further comprises a microprocessor, connected to the data storage means and the scanning means, and program means connected to the microprocessor to program the microprocessor to verify validity and sequence of presentation of the scanned data and to preclude transmission of unverified data to the pulling processor means.

23. A point-of-manufacture data acquisition system according to claim 22 in which the program means programs the microprocessor to perform the following functions:

preclude effective transmission to the polling processor means of identification data for a second operator whenever identification data for a first operator is already recorded in the storge means for the data terminal; and preclude effective entry into the storage means of workpiece unit identification data unless operator identification data has previously been recorded in the storage means for the data terminal.

24. A point-of-manufacture data acquisition system according to claim 22 in which the program means programs the microprocessor to cause transmission of only an abbreviated general message signifying completion of work on a workpiece unit in response to a second scan of any workpiece unit identification member.

25. A point-of-manufacture data acquisition system according to claim 22 in which:

each identification member is a card, the card being scanned by being moved manually relative to the scanning means;

in which the scannable data on each card includes distinctive start and end codes to permit scanning in either direction without loss of data;

and in which the program means programs the microprocessor to interpret the can data from the scanning means, scanning in either direction, over a substantial range of variations in the rate at which the card is moved through the scanning means.

26. A point-of-manufacture data acquisition system according to claim 25 in which:

the scannable data on each identification member comprises a row of apertures aligned with and spaced a predetermined distance from one edge of the card;

and in which the scanning means for each data terminal comprises a single light source and a single photosensor mounted in a scanner body having a slot only slightly wider than the card thickness, the light source and the photosensor being located on opposite sides of the slot and spaced from the bottom of the slot by said predetermined distance.

27. A point-of-manufacture data acquisition system according to claim 25, in which:

the scannable data on each identification member comprises a printed bar code;

and the scanning means comprises a single light source and a single photosensor.

28. A point-of-manufacture data acquisition system according to claim 25 in which the transmission means constitutes three-wire electrical bus extending throughout the production facility, the bus having spaced connector receptacles throughout its length to permit rapid relocation of each work station data terminal at any location within the production facility.

29. A data acquisition system for a multi-station work facility comprising:

a series of data terminals, each data terminal comprising data input means and data storage means;

polling processor means for polling the data terminals for data stored therein;

first and second transmission lines, each connected to all of the data terminals, the first transmission line transmitting signal interrogation data signals from the polling processor to the terminals and the second transmission line transmitting digital information data signals from the terminals to the polling processor;

terminal bus interface means, connecting the polling processor to the transmission lines, including synchronizing means for continuously transmitting synchronizing signals of predetermined constant frequency to the data terminals on a shared-time basis with the digital data signals on one of the transmission lines;

the terminal bus interface means further comprising:

interface data storage means for temporary storage of the information data signals from the data terminals;

an interface microprocessor connected to the transmission lines, the interface data storage means, and the polling processor; and interface program means for programming the interface microprocessor to monitor the validity of information data signals from the data terminals;

and the synchronizing means including a programmable rate generator, connected to the one transmission line and to the interface microprocessor, for varying the synchronizing signal frequency in accordance with changes in the validity of data signals received from the data terminals, reducing the synchronizing signal frequency whenever the occurrence rate of invalid data signals monitored by the interface microprocessor is excessive and increasing that frequency, up to a preselected maximum, when that occurrence rate is minimal.

30. A data acquisition system according to claim 29 in which the terminal bus interface means further comprises a central DC power supply, and in which the synchronizing signals are power pulses of opposite polarity and much greater amplitude as compared to the data signals on the one transmission line.

31. A data acquisition system according to claim 30 in which the terminal bus interface means connects the central power supply to both transmission lines, transmitting power to all data terminals on an information shared-time basis with the data signals on both lines, the polarities for power transmission being opposite on the two lines, and the data signal and power polarities being opposite on each line.

32. A point-of-manufacture data acquisition system according to claim 31 in which the transmission means includes a third line at ground potential connecting the terminal bus interface to all data terminals, in which the duty cycle for power/sync transmission exceeds twenty percent, and in which the power/sync transmission amplitude is substantially greater than the data transmission amplitude.

33. A point-of-manufacture data acquisition system according to claim 32 in which the transmission means constitutes a three-wire electrical bus extending throughout the work facility, the bus having spaced connector receptacles throughout its length to permit rapid relocation of each data terminal at any location within the work facility.

34. A data terminal for a multi-station point-of-manufacture data acquisition system connected to a central data processor remote from the data terminals, the system being based upon a multiplicity of identification cards each bearing scannable identification data, the identification cards forming a plurality of groups with each group bearing scannable data different in significance from the other groups, complete data for normal operations being entered into the system through scanning of the cards, the data terminal comprising:

scanning means, comprising a single sensor, for scanning the identification data on a card and generating a sequence of raw data signals when the scanning means and the card are manually moved, one past the other, with the identification data on the card in predetermined alignment with the sensor;

data storage means, connected to the scanning means, for recording the data signals, the data storage means having a capacity sufficient for simultaneous storage of the data from at least two cards from different groups;

a microprocessor, connected to the data storage means and to the scanning means;

program means, connected to the microprocessor, for programming the microprocessor to:

a. interpret the data signals from the scanning means over a substantial range of variations in the speed at which the card traverses the scanning means, and b. verify validity and sequence of presentation of the scanned data and preclude continued storage of unverified data;

signalling means for signalling to a data terminal operator that effective recording of verified data from an identification card has been accomplished; and connecting circuit means for connecting the data terminal to a data transmission line for transmission of verified data in digital form from the storage means to a remote central processing location, the connecting circuit means comprising a power/data separation circuit having an input/output connection to link the terminal to a time share power and data transmission line, the power/data separation circuit interleaving the digital data transmissions with a series of constant frequency power pulses of given polarity on the line, the data transmissions being of opposite polarity from the power pulses so that data and power transmission are separated on the basis of both polarity and timing, continuous power for operation of the data terminal being derived from the power pulses on the data transmission line.

35. A data terminal for a point-of-manufacture data acquisition system, according to claim 34, in which the connecting circuit means further comprises a second power/data separation circuit having an input/output connection to a second transmission line, the polarities for both data transmissions and power transmissions being reversed for the second separation circuit relative to the first.

36. A data terminal for a point-of-manufacture data acquisition system, according to claim 34, in which the scannable identification data on each identification card constitutes a single row of apertures aligned with and spaced a predetermined distance from one edge of the card, and in which the scanning means includes a single light source and a single photosensor mounted in a scanner body having a slot only slightly wider than the card thickness through which the card is moved manually to scan the identification data, the light source and photosensor being located on opposite sides of the slot and spaced from the bottom of the slot by said predetermined distance.

37. A data terminal for a point-of-manufacture data acquisition system, according to claim 36, in which the light source is a light-emitting diode emitting light in the infra-red range and the photosensor is resposnive to infra-red radiation.

38. A data terminal for a point-of-manufacture data acquisition system, according to claim 34, in which the scannable data constitutes a printed bar code, and in which the scanning means comprises a single photosensor, and further comprising a high frequency sampling analog-to-digital converter interposed between the sensor and the data storage means.

39. A data terminal for a point-of-manufacture data acquisition system according to claim 34, claim 36, or claim 38, in which the scannable data includes distinctive start and end codes, and in which the program means further programs the microprocessor to accept data signals scanned in either of two opposed directions.

40. A data terminal for a point-of-manufacture data acquisition system according to claim 34, claim 36, or claim 38, in which the program means comprises a read-only memory connected to the microprocessor, and in which the program means further programs the microprocessor to preclude effective entry of data into the storage means from an identification card of one group unless data from an identification card of a specific other group has previously been recorded in the storage means.

41. A data terminal for a point-of-manufacture data acquisition system according to claim 40, and further comprising:
   keypad means for entry of data into the storage means independently of the identification cards;
   and in which the program means further programs the microprocessor to perform the following additional functions:
   preclude effective entry of at least some types of data into the storage means from the keypad means; and
   enable entry of data into the storage means from the keypad means whenever predetermined data from an identification card of a given group has previously been recorded in the storage means.

42. A data terminal for a point-of-manufacture data acquisition system, according to claim 34, claim 36, or claim 38, in which the signalling means further includes means for signalling to the terminal operator the completion of transmission of data, from one card, from the data terminal to the remote central processing station.

43. A data terminal for a point-of-manufacture data acquisition system, according to claim 34, claim 36, or claim 38, in which the program means includes means for recording a terminal identification code to distinguish that terminal from all other terminals in the system.

44. A data terminal for a point-of-manufacture data acquisition system, according to claim 34, claim 36, or claim 38, in which the program means further programs the microprocessor to cause transmission of only an abbreviated message signifying completion of a given operation in response to a second scan of an identification card from one group.

* * * * *